United States Patent
Yamauchi et al.

(10) Patent No.: US 9,806,534 B2
(45) Date of Patent: Oct. 31, 2017

(54) NON-CONTACT POWER FEEDING APPARATUS AND NON-CONTACT POWER FEEDING METHOD

(71) Applicant: Nissan Motor Co., Ltd., Kanagawa (JP)

(72) Inventors: Yuuya Yamauchi, Kanagawa (JP); Yuusuke Minagawa, Kanagawa (JP); Throngnumchai Kraisorn, Kanagawa (JP); Toshihiro Kai, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 432 days.

(21) Appl. No.: 14/385,098

(22) PCT Filed: Mar. 5, 2013

(86) PCT No.: PCT/JP2013/055932
§ 371 (c)(1),
(2) Date: Sep. 12, 2014

(87) PCT Pub. No.: WO2013/137054
PCT Pub. Date: Sep. 19, 2013

(65) Prior Publication Data
US 2015/0028691 A1 Jan. 29, 2015

(30) Foreign Application Priority Data
Mar. 13, 2012 (JP) .................................. 2012-055749

(51) Int. Cl.
*H01F 37/00* (2006.01)
*H02J 5/00* (2016.01)
(Continued)

(52) U.S. Cl.
CPC ............. *H02J 5/005* (2013.01); *B60L 11/182* (2013.01); *H02J 7/025* (2013.01);
(Continued)

(58) Field of Classification Search
CPC ......... H02J 5/005; H02J 7/025; B60L 11/182; B60L 11/1831; Y02T 10/7005;
(Continued)

(56) References Cited

U.S. PATENT DOCUMENTS 8,290,531 B2* 10/2012 Wakamatsu ............ G06F 1/266
455/41.1
2009/0271048 A1 10/2009 Wakamatsu
2012/0056580 A1 3/2012 Kai et al.

FOREIGN PATENT DOCUMENTS

JP 2011-045195 A 3/2011

OTHER PUBLICATIONS

International Search Report issued in PCT/JP2013/055932 mailed on Jun. 11, 2013 (3 pages).
(Continued)

*Primary Examiner* — Hal Kaplan
(74) *Attorney, Agent, or Firm* — Osha Liang LLP

(57) ABSTRACT

A non-contact power feeding apparatus transmits, by at least magnetic coupling, an electric power in a non-contact manner to a power reception coil from a power transmission coil. The transmission coil is electrically connected to an alternating-current power source. The non-contact power feeding apparatus outputs an electric power to a load electrically connected to the power reception coil. The non-contact power feeding apparatus includes a coupling state estimator configured to estimate a coupling state between the power transmission coil and the power reception coil. The non-contact power feeding apparatus also includes an available output power calculator configured to calculate an available output power that can be output to the load, based on a limit value of a circuit element of a power feeding circuit including the power transmission coil and the power reception coil and on the coupling state.

18 Claims, 41 Drawing Sheets

(51) Int. Cl.
*B60L 11/18* (2006.01)
*H02J 7/02* (2016.01)

(52) U.S. Cl.
CPC ........ *B60L 11/1831* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ... Y02T 10/7072; Y02T 90/12; Y02T 90/121; Y02T 90/122; Y02T 90/125; Y02T 90/14
USPC ........................................................ 307/104
See application file for complete search history.

(56) References Cited

OTHER PUBLICATIONS

Written Opinion of the International Searching Authority issued in PCT/JP2013/055932 mailed on Jun. 11, 2013 (3 pages).

\* cited by examiner

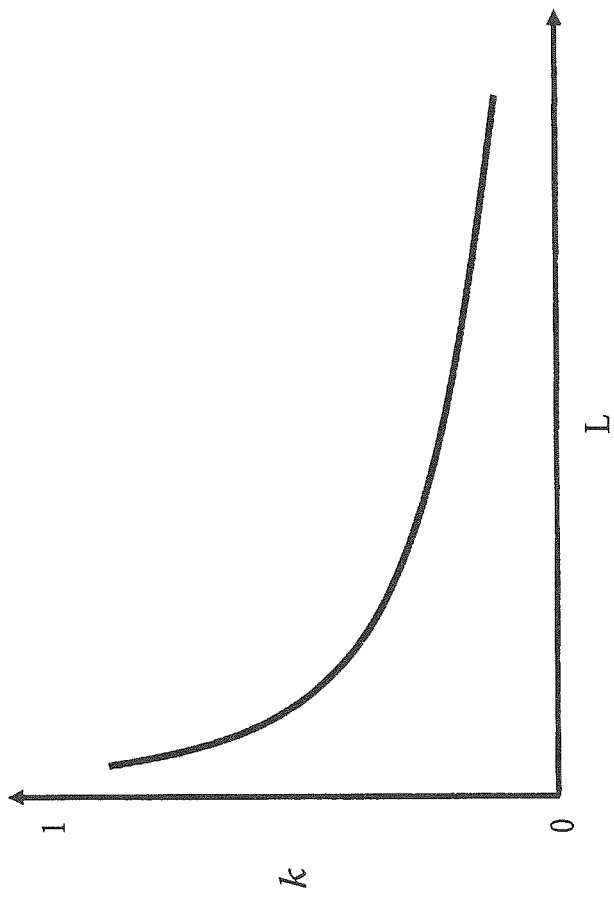

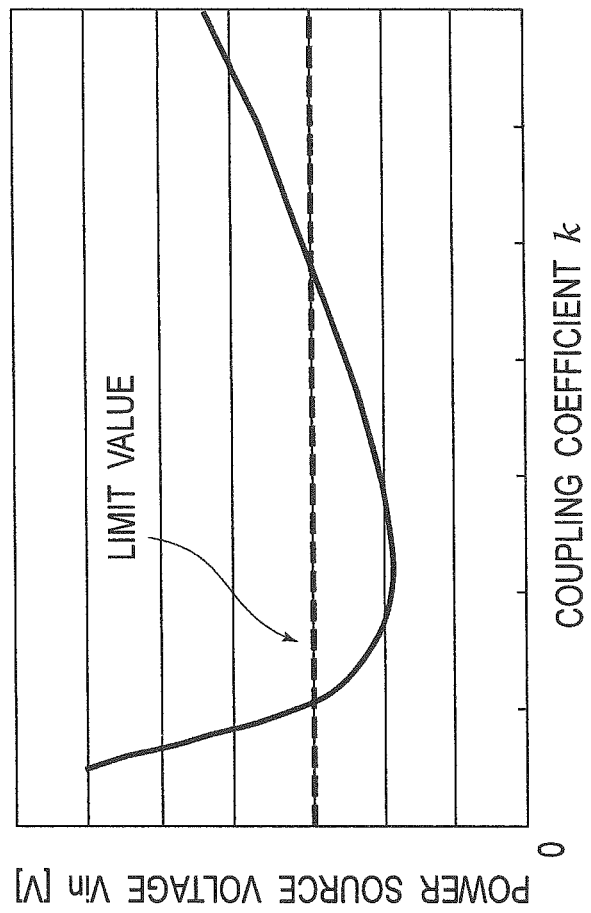

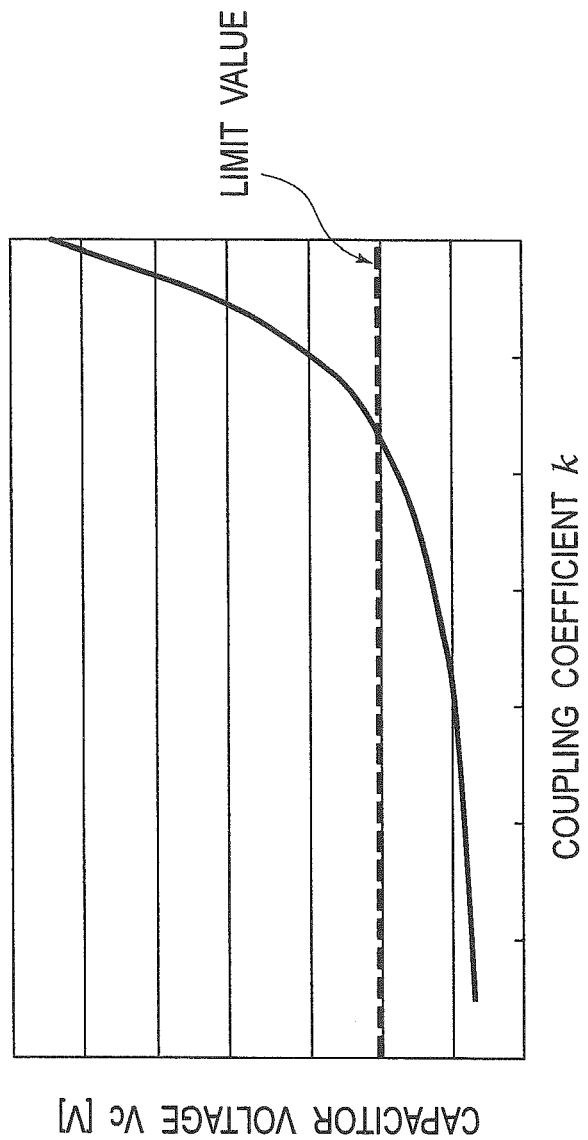

FIG. 23

| PRIMARY SIDE CAPACITOR CONFIGURATION | | SECONDARY SIDE CAPACITOR CONFIGURATION | | |
|---|---|---|---|---|
| | | PARALLEL | SERIES | |
| PARALLEL | | (a) | (b) | RESONANCE CONDITION ON PRIMARY SIDE: COUPLING COEFFICIENT $k$ |
| SERIES | | (c) | (d) | RESONANCE CONDITION ON PRIMARY SIDE: NONE |
| | | RESONANCE CONDITION ON SECONDARY SIDE: LOAD R | RESONANCE CONDITION ON SECONDARY SIDE: NONE | |

FIG. 32

|  | COIL | | CAPACITOR | |
| --- | --- | --- | --- | --- |
|  | VOLTAGE | CURRENT | VOLTAGE | CURRENT |
| LIMIT VALUE | 1200V | 30A | 600V | 500A |
| DETECTION VALUE | 200V | 25A | 100V | 25A |
| USAGE RATE | 17% | 83% | 17% | 5% |

NON-CONTACT POWER FEEDING APPARATUS AND NON-CONTACT POWER FEEDING METHOD

CROSS-REFERENCE TO RELATED APPLICATIONS

This application is a National Stage application of International Patent Application No. PCT/JP2013/055932, filed on Mar. 5, 2013, which claims priority to Japanese Patent Application No. 2012-055749, filed on Mar. 13, 2012. Both Japanese Patent Application No. 2012-055749 and International Patent Application No. PCT/JP2013/055932 are hereby incorporated by reference in their entirety.

TECHNICAL FIELD

The present invention relates to non-contact power feeding apparatuses and non-contact power feeding methods.

BACKGROUND ART

Prior to feeding an electric power to a load device, the load device is electrically separated, a passive element is connected in parallel, and the output voltage of a variable voltage high-frequency power source is set to a lower voltage Vm for measurement, and then an output current value Im of the variable voltage high-frequency power source is measured. Using these Vm and Im, a voltage VIN of the variable voltage high-frequency power source is calculated for setting to a target value the output voltage of a secondary coil or of a rectifier when the load device is connected to the secondary coil. A non-contact power feeding apparatus is known, which controls, without exchanging information between the primary side and the secondary side by a communication device, the voltage of a variable voltage high-frequency power source 1 so as to set the voltage of the secondary coil or the output voltage of the rectifier to a target value (Patent Literature 1).

CITATION LIST

Patent Literature

Patent Literature 1: Japanese Laid-Open Patent Publication No. 2011-45195

SUMMARY OF INVENTION

Technical Problem

However, the above-described non-contact power feeding apparatus has a problem that because the output voltage is set without taking into consideration the withstand voltage or withstand current of the secondary coil, capacitor, or the like, the voltage control takes time in setting the output power to an available output power from the secondary coil based on the withstand voltage or the like, and the time until the output power reaches the relevant available output power increases.

The present invention provides a non-contact power feeding apparatus and non-contact power feeding method capable of reducing the control time for the output power to reach an available output power to a load that is electrically connected to a power reception coil.

Solution to Problem

According to an aspect of the present invention, the above described problem is solved by estimating a coupling state between a power transmission coil and a power reception coil, and calculating an available output power that can be output to a load, based on a limit value of a circuit element of a power feeding circuit including the power transmission coil and the power reception coil and on this coupling state.

Advantageous Effects of Invention

According to an aspect of the present invention, in accordance with the estimated coupling state, an available output power to the load taking into consideration the limit value of a circuit element is determined by calculation, and therefore the control time until the output power reaches the available output power can be reduced.

BRIEF DESCRIPTION OF DRAWINGS

FIG. 4 is a view illustrating changes in the coupling coefficient with respect to the shift in the height direction of the secondary winding of FIG. 1.

FIG. 6a is a graph illustrating the voltage characteristic of an input voltage ($V_{in}$) to the primary side of a non-contact power feeding section 10 with respect to the coupling coefficient (k), in a non-contact power feeding section according to a variant of the present invention.

FIG. 7a is a graph illustrating the characteristic of a voltage ($V_c$) of a capacitor 202 with respect to the coupling coefficient (k), in a non-contact power feeding section according to the variant of the present invention.

FIG. 23 is a view for illustrating the relationship between the typical circuit configuration and resonance condition of the non-contact power feeding section of FIG. 22.

FIG. 32 is a view illustrating the relationship between the applied voltage, current, limit value, detection value, and usage rate of each of the primary winding and the capacitor of FIG. 31.

DESCRIPTION OF EMBODIMENTS

Hereinafter, embodiments of the present invention will be described with reference to the accompanying drawings.

First Embodiment

As one example of a non-contact power feeding apparatus according to an embodiment of the present invention, a non-contact power feeding apparatus used with a battery for vehicles, such as an electric vehicle, and with a power load is described.

Figure 1:
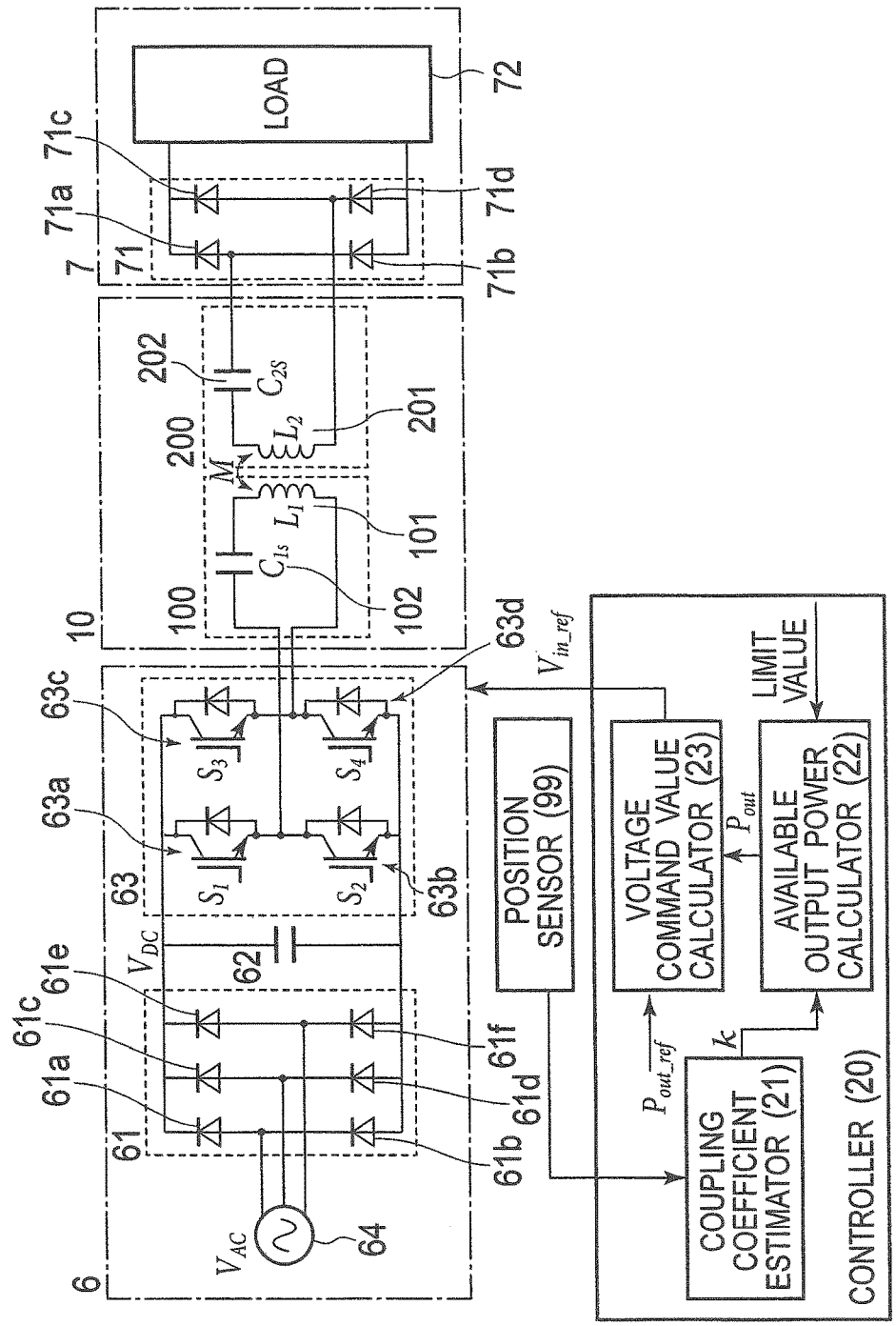
FIG. 1 is an electric diagram of a non-contact power feeding apparatus of this example.

FIG. 1 illustrates an electric diagram of the non-contact power feeding apparatus. The non-contact power feeding apparatus according to the embodiment includes: a high frequency alternating-current power source 6; a non-contact power feeding section 10 configured to feed an electric power, which is output from the high frequency alternating-current power source 6, in a non-contact manner; and a load section 7 to which an electric power is supplied by the non-contact power feeding section 10.

The high frequency alternating-current power source 6 includes a three-phase alternating-current power source 64, a rectifier 61 that is connected to the three-phase alternating-current power source 64 and rectifies a three-phase alternating current to a direct current, and a voltage type inverter 63 that is connected to the rectifier 61 via a smoothing capacitor 62 and reversely converts the rectified direct current to a high-frequency power. The rectifier 61 has a diode 61a and diode 61b, a diode 61c and diode 61d, and a diode 61e and diode 61f connected in parallel to each other. The outputs of the three-phase alternating-current power source 64 are connected to the intermediate connection points between the diode 61a and diode 61b, between the diode 61c and diode 61d, and between the diode 61e and diode 61f, respectively. The voltage type inverter 63 has a series circuit of a switching element 63a and a similar switching element 63b, each of the switching elements having a MOS FET type power transistor or the like and a diode connected in anti-parallel to each other and a series circuit of a similar switching element 63c and switching element 63d connected in parallel, and is connected to the rectifier 61 via the smoothing capacitor 62. Then, the intermediate connection point between the switching element 63a and switching element 63b and the intermediate connection point between the switching element 63c and switching element 63d are connected to a power transmission circuit section 100 that is on the primary side of the non-contact power feeding section 10, respectively. The voltage type inverter 63 supplies an alternating-current power of approximately several kHz to 100 kHz to the non-contact power feeding section 100.

The non-contact power feeding section 10 includes the power transmission circuit section 100 that is on the input side of a transformer, and a power reception circuit section 200 that is on the output side of the transformer. The power transmission circuit section 100 includes a primary winding ($L_1$) 101 and a capacitor ($C_{1s}$) 102 connected in series to the primary winding 101, while the power reception circuit section 200 includes a secondary winding ($L_2$) 201 and a capacitor ($C_{2s}$) 202 connected in series to the secondary winding 201.

The load section 7 includes a rectifier 71 that rectifies an alternating-current power supplied from the non-contact power feeding section 10 to a direct-current power, and a load 72 connected to the rectifier 71. The rectifier 71 has a diode 71a and diode 71b, and a diode 71c and diode 71d connected in parallel to each other. The outputs of the power reception circuit section 200 are connected to the intermediate connection points between the diode 71a and diode 71b and between the diode 71c and diode 71d, respectively. Then, the output of the rectifier 71 is connected to the load 72. The load 72 is a load, such as a battery.

The controller 20 is a controller that controls the whole of the non-contact power feeding apparatus of this example, and includes a coupling coefficient estimator 21, an available output power calculator 22, and a voltage command value calculator 23. The coupling coefficient estimator 21 estimates a coupling state between the primary winding 101 and the secondary winding 201 by estimating a coupling coefficient (k) between the primary winding 101 and the secondary winding 201 from a detection value of a position sensor 99. The coupling coefficient estimator 21 transmits the estimated coupling coefficient (k) to the available output power calculator 22.

The available output power calculator 22 calculates an available output power ($P_{out}$) that can be output to the load section 7, based on the limit values of the voltage, current, and the like and the coupling coefficients (k) of the primary winding 101 and the like included in the non-contact power feeding section 10, and transmits the available output power ($P_{out}$) to the voltage command value calculator 23.

Here, the limit value and the available output power ($P_{out}$) are described. The limit value is the value determined in advance by the withstand voltage and withstand current of each element forming the non-contact power feeding section 10, the breakdown voltage of each element of the inverter 63, or the power source capacity and the like of the alternating-current power source 64. For example, the withstand voltages of the primary winding 101 and secondary winding 201 are the values determined by the safety code for high voltage, and the withstand current is the value determined by the diameter, thickness, and the like of the coil. Moreover, the withstand voltages of the capacitors 102 and 202 are determined by the allowable breakdown voltage of each of the capacitors, and the withstand voltage or withstand current of the inverter 63 is determined in advance by the element breakdown voltage and element allowable current of each of the transistors 63a to 63d.

Then, the available output voltage (Pout) indicates the maximum power that can be output to the load section 7 from the non-contact power feeding section 10 while suppressing the voltage or current applied to each circuit element of the non-contact power feeding section 10 and each circuit element of the inverter 63 to the above-described limit value or less, during driving of the non-contact power feeding apparatus. In other words, the available output voltage (Pout) is an output power of the non-contact power feeding section 10 in the case where the voltage or current of at least one circuit element, among the circuit elements included in the non-contact power feeding section 10 and inverter 63, corresponds to the limit value. Note that, the case where the voltage or current of the relevant circuit element corresponds to the limit value includes a case where the voltage or current of the circuit element is equal to the limit value or a case where the voltage or current of the circuit element is equal to a value that is set lower than the limit value so as to have a margin with respect to the limit value.

The voltage command value calculator 23 generates a voltage command value ($V_{in\_ref}$) for outputting a requested power ($P_{out\_ref}$) or an available output power ($P_{out}$), which is requested from the load, to the load section 7 from the non-contact power feeding section 10, and outputs the same to the inverter 63. The voltage command value corresponds to the switching signal of each of the transistors 63a to 63d.

The position sensor 99 is a sensor for detecting the relative position between the primary winding 101 and the secondary winding, is provided in the vicinity of the primary winding 101, for example, and measures the position of the secondary winding 202 using an electric wave, such as an infrared ray.

Figure 2A:
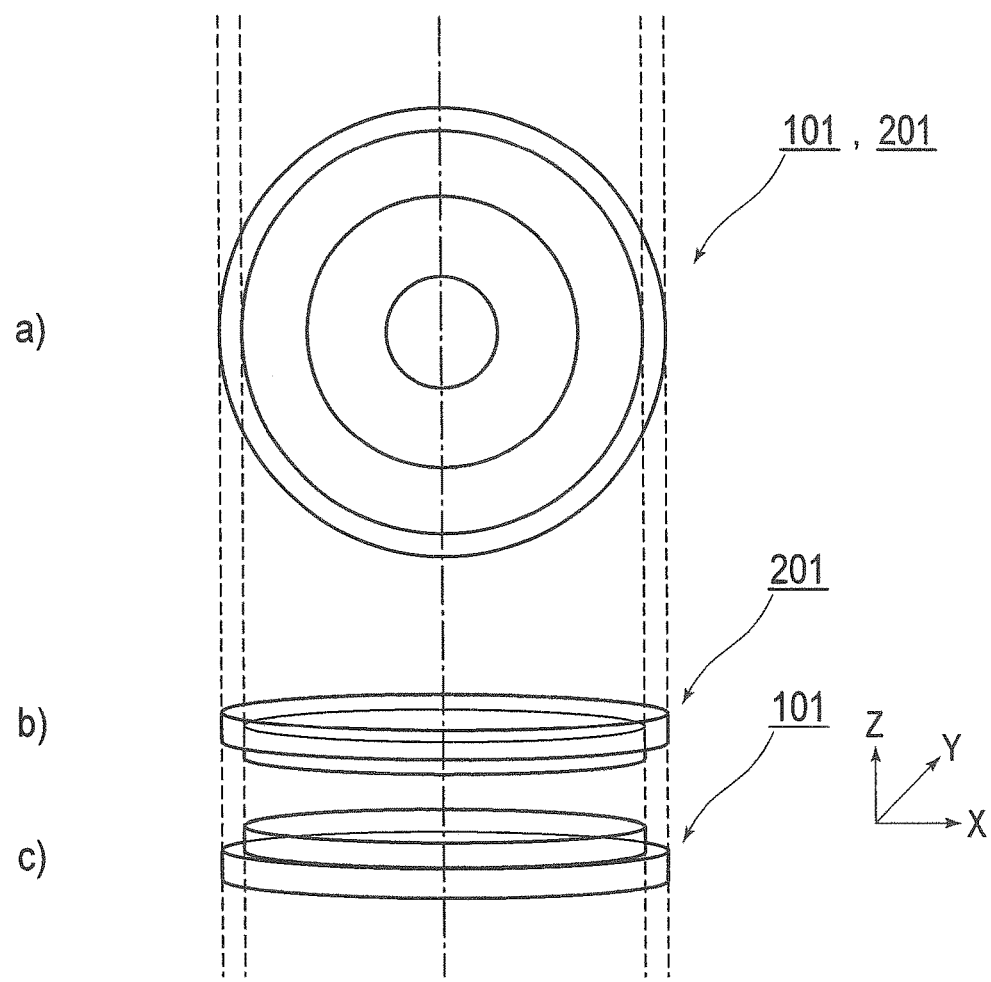
FIG. 2a illustrates a plan view and perspective view of a primary winding and secondary winding of FIG. 1.
Figure 2B:
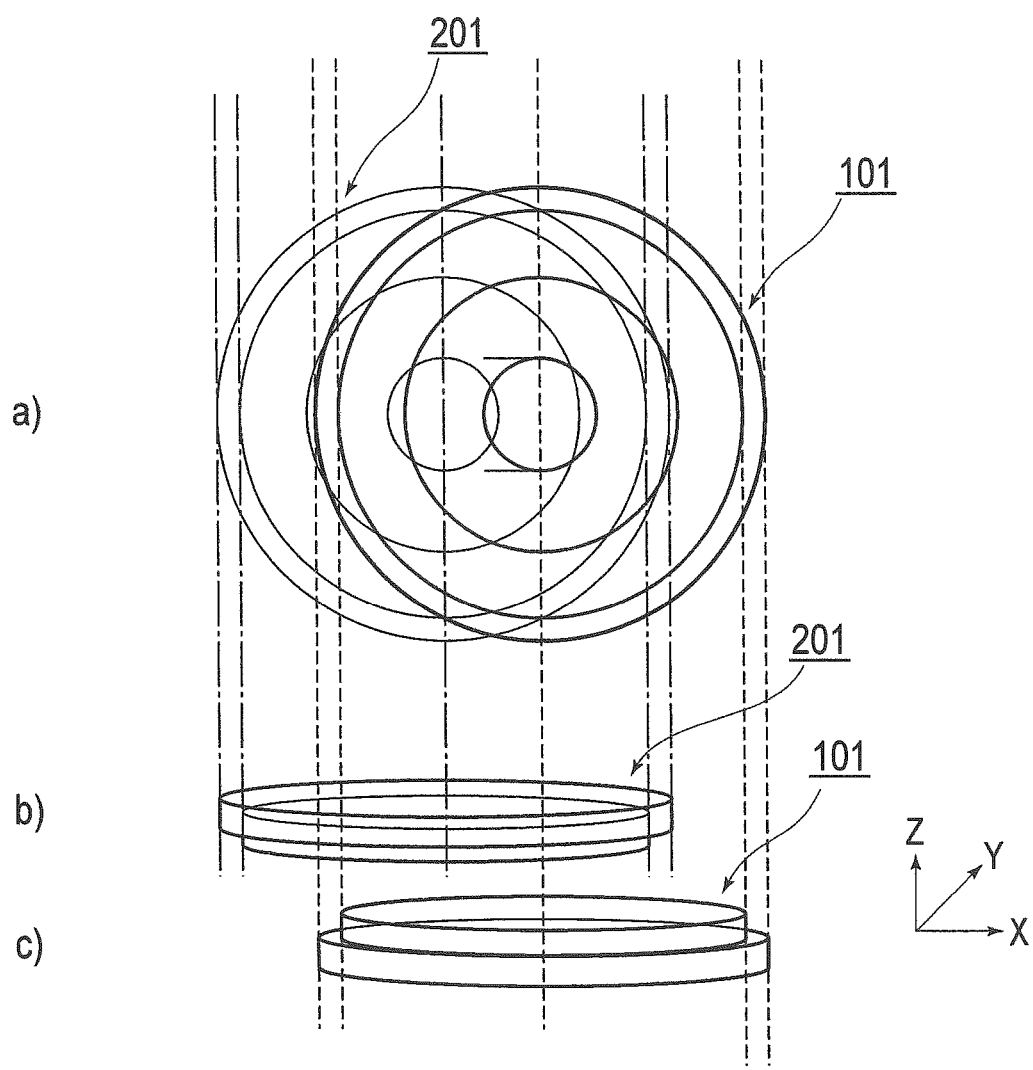
FIG. 2b illustrates a plan view and perspective view of the primary winding and secondary winding of FIG. 1.
Figure 3:
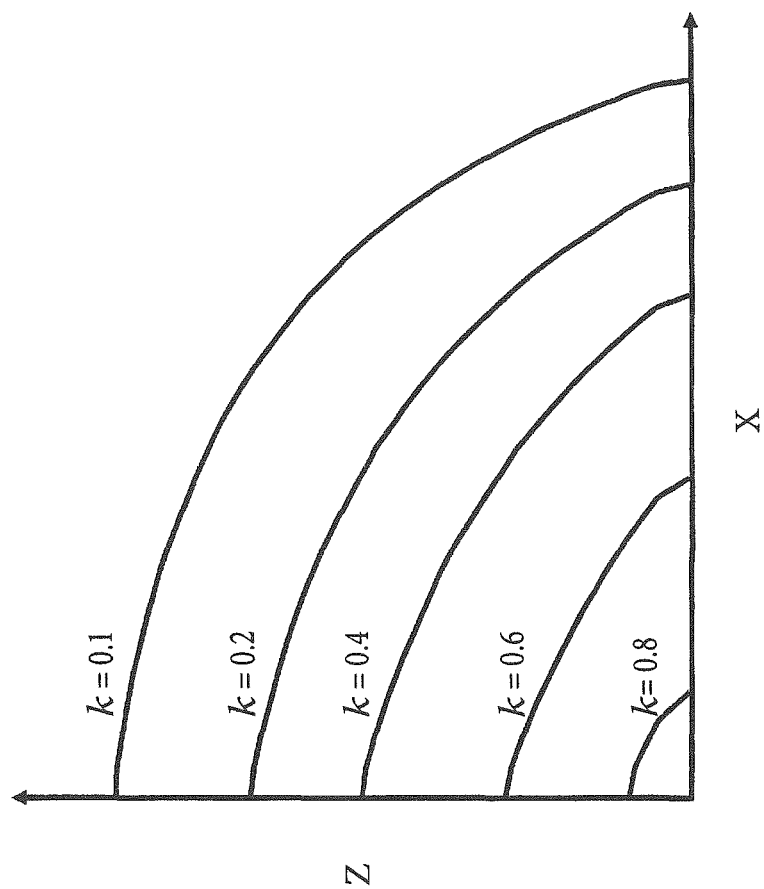
FIG. 3 is a graph illustrating the characteristic of a coupling coefficient with respect to the distance between the primary winding and the secondary winding of FIG. 1.

Next, using FIG. 2 and FIG. 3, the coupling coefficient (k) between the primary winding 101 and the secondary winding 201 in a case where the non-contact power feeding apparatus illustrated in FIG. 1 is provided in a vehicle and at a parking lot is described.

In this example, the load section 7 and the power reception circuit section 200 including the secondary winding 201 are provided in a vehicle, for example, while the high frequency alternating-current power source 6 and the power transmission circuit section 100 including the primary winding 101 are provided, for example, at a parking lot as the ground side. In the case of an electric vehicle, the load 72 corresponds to a rechargeable battery, for example. The secondary winding 201 is provided, for example, on the chassis of a vehicle. Then, the driver of a vehicle parks the vehicle at the relevant parking lot so that the secondary winding 201 is positioned above the primary winding 101, and then an electric power is supplied to the secondary winding 201 from the primary winding 101 to charge the rechargeable battery included in the load 72.

FIG. 2a and FIG. 2b illustrate the plan view and perspective view of the primary winding 101 and the secondary winding 201. In FIG. 2a and FIG. 2b, the X-axis and Y-axis represent the planar direction of the primary winding 101 and secondary winding 201, and the Z-axis represents the height direction. In FIG. 2a and FIG. 2b, a) is the plan view of the primary winding 101 and secondary winding 201, b) is the perspective view of the secondary winding 201, and c) is the perspective view of the primary winding 101. Note that, for purposes of illustration, both the primary winding 101 and the secondary winding 201 are assumed to have an identical circular shape, but in this example do not necessarily need to have a circular shape and furthermore the primary winding 101 and the secondary winding 201 do not need to have an identical shape.

As illustrated in FIG. 2a, a vehicle should be parked at a parking lot so that the secondary winding 201 is aligned with the primary winding 101 in the X-axis and Y-axis direction that are the planar direction. However, depending on the vehicle driver's skill, as illustrated in FIG. 2b, the relative position between the primary winding 101 and the secondary winding 201 may shift from each other in the planar direction. Moreover, because the height of a vehicle differs depending on the type of the vehicle, the heights of the primary winding 101 and the secondary winding 201 differ also depending on the height of a vehicle.

FIG. 3 illustrates the changes in the coupling coefficient with respect to the secondary winding 201 in the X-axis direction (or Y-axis direction) and Z-axis direction illustrated in FIGS. 2a and 2b. FIG. 4 illustrates the change in the coupling coefficient k with respect to the shift of the secondary winding 201 in the Z-axis direction illustrated in FIG. 2. Note that, the horizontal axis L of FIG. 4 is expressed by Mathematical Formula (1) using the coordinate X of the planar direction (X-axis direction) and the coordinate Z of height direction (Z-axis direction) of the secondary winding 202, and is the distance of the secondary winding 202 with respect to the primary winding 101 fixed to the ground.

[Mathematical Formula (1)]

$$L=\sqrt{X^2+Z^2} \tag{1}$$

When the center of the primary winding 1 is aligned with the center of the secondary winding 2 as illustrated in FIG. 2a, there are fewer leakage fluxes between the primary winding 101 and the secondary winding 201, the value of the X-axis of FIG. 3 corresponds to zero, and the coupling state between the primary winding 101 and the secondary winding 201 is strong, and therefore the coupling coefficient k increases. On the other hand, as illustrated in FIG. 2b, in contrast to FIG. 2a, when the positions of the primary winding 1 and the secondary winding 2 shift in the X-axis direction, there are more leakage fluxes and the coupling state between the primary winding 101 and the secondary winding 201 is weak, and therefore as illustrated in FIG. 3, a mutual inductance M or the coupling coefficient k decreases. Moreover, as the shift in the height direction between the primary winding 101 and the secondary winding 201 increases, the mutual inductance M or the coupling coefficient k will decrease as illustrated in FIG. 4.

Figure 5A:
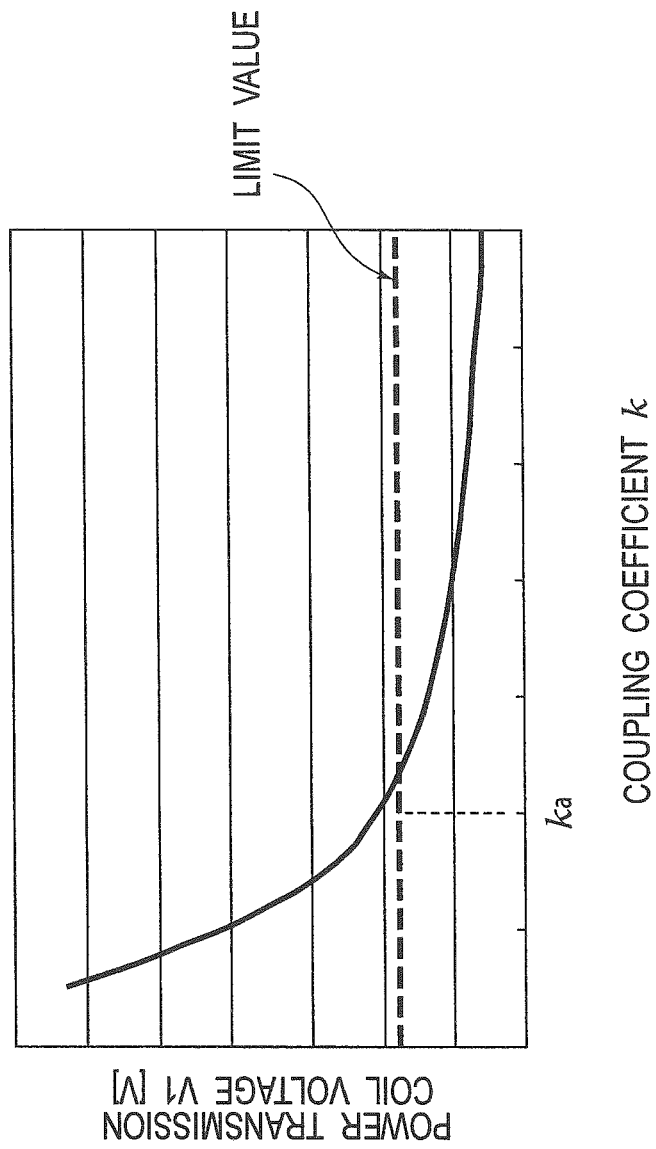
FIG. 5a is a graph illustrating the voltage characteristic of a power transmission coil (primary winding) (V1) with respect to the coupling coefficient (k) in a non-contact power feed section of FIG. 1.
Figure 5B:
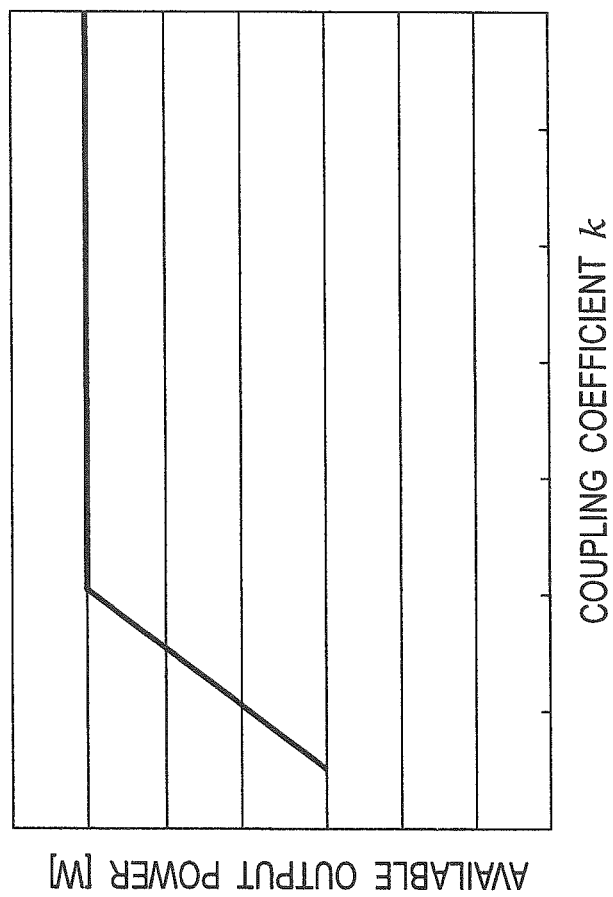
FIG. 5b is a graph illustrating the power characteristic of an available output power ($P_{out}$) with respect to the coupling coefficient (k) in the non-contact power feeding section of FIG. 1.

Next, using FIG. 5a and FIG. 5b, the voltage and available output power ($P_{out}$) of the primary winding 101 with respect to the coupling coefficient (k) are described. FIG. 5a is a graph illustrating the characteristic of the power transmission coil (primary winding) voltage (V1) with respect to the coupling coefficient (k), while FIG. 5b is a graph illustrating the characteristic of the available output power ($P_{out}$) with respect to the coupling coefficient (k). In the case where the electric power ($P_c$) supplied to the load section 7 is set constant, as the coupling coefficient (k) corresponding to the positional relationship of the coil is varied, the voltage of the primary winding 101 decreases with an increase of the coupling coefficient as illustrated in FIG. 5a. A limit value that is the withstand voltage of the primary winding 101 is illustrated in FIG. 5a.

That is, in the case where the coupling coefficient (k) is lower than $k_a$, if a constant electric power ($P_c$) is output to the load section 7, the voltage of the primary winding 101 will exceed the limit value, and therefore in the actual system of this example, the voltage of the primary winding 101 cannot be increased higher than the limit value and thus the available output power ($P_{out}$) results in an electric power lower than the constant electric power ($P_c$).

Next, when the coupling coefficient (k) varies under the condition that the voltage and current applied to the circuit elements, including the primary winding 101, of the non-contact power feeding section 10 are set to the limit values or less, the available output power ($P_{out}$) to the load section 7 is expressed as in FIG. 5b. Even in the case where the coupling coefficient (k) is high, the available output power ($P_{out}$) is restricted by the limit value of each circuit element.

Figure 6B:
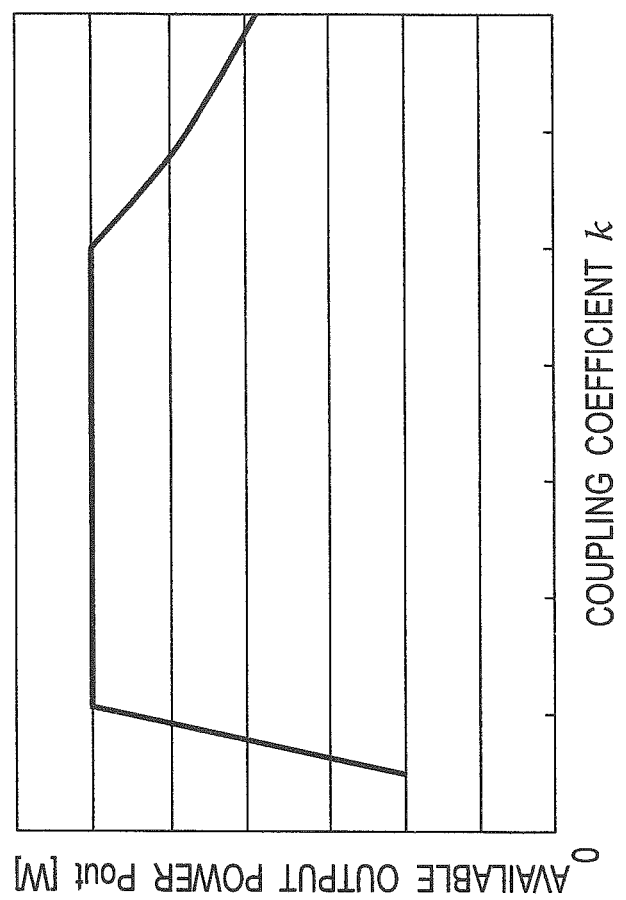
FIG. 6b is a graph illustrating the power characteristic of an available output power ($P_{out}$) with respect to the coupling coefficient (k), in the non-contact power feeding section according to the variant of the present invention.

Next, as a variant of the non-contact power feeding section 10 according to this example, the characteristic of the power source voltage and the characteristic of the available output power with respect to the coupling coefficient (k) in a circuit having capacitors 102 connected in parallel to the primary winding 101 and having capacitors 202 connected in parallel to the secondary winding 201 are described. FIG. 6a is a graph illustrating the voltage characteristic of the input voltage ($V_{in}$), which is supplied from the high frequency alternating-current power source 6 to the primary side of the non-contact power feeding section 10, with respect to the coupling coefficient (k), while FIG. 6b is a graph illustrating the power characteristic of the available output power ($P_{out}$) with respect to the coupling coefficient (k).

As illustrated in FIG. 6a, there exists a limit value of the high frequency alternating-current power source 6 due to the breakdown voltage and the like of each of the transistors 63a to 63d, and therefore the voltage of the high frequency alternating-current power source 6 cannot be increased beyond this limit value. Moreover, as illustrated in FIG. 6b, it can be understood that the available output voltage ($P_{out}$) is limited by not only the coupling coefficient (k) but also by the limit value of the high frequency alternating-current power source 6 or by the limit value of each circuit element of the non-contact power feeding section 10.

Figure 7B:
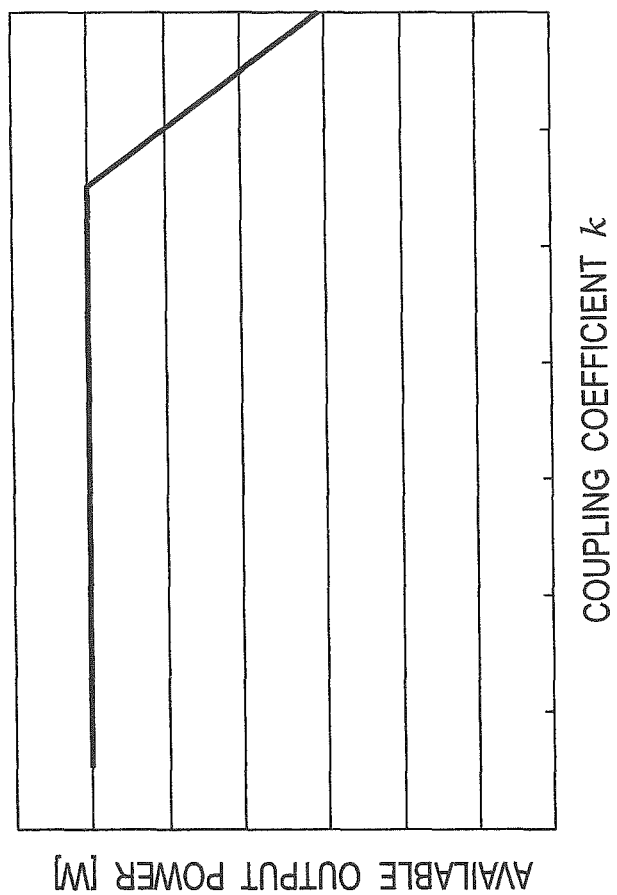
FIG. 7b is a graph illustrating the power characteristic of the available output power ($P_{out}$) with respect to the coupling coefficient (k), in the non-contact power feeding section according to the variant of the present invention.

Moreover, as another variant of the non-contact power feeding section 10 according to this example, the voltage characteristic of the capacitor 202 and the characteristic of the available output power with respect to the coupling coefficient (k) in a circuit having capacitors 102 connected in series to the primary winding 101 and having capacitors 202 connected in parallel to the secondary winding 201 are described. FIG. 7a is a graph illustrating the characteristic of the voltage ($V_c$) of the capacitor 202 with respect to the coupling coefficient (k), while FIG. 7b is a graph illustrating the power characteristic of the available output power ($P_{out}$) with respect to the coupling coefficient (k).

As illustrated in FIG. 7a, there is a limit value of the capacitor 202, and therefore the voltage of the high frequency alternating-current power source 6 cannot be increased beyond this limit value. Moreover, as illustrated in FIG. 7b, the available output voltage ($P_{out}$) varies in accordance with the coupling coefficient (k) but is limited by the limit value of the capacitor 202 or the like.

That is, as illustrated in FIG. 5a to FIG. 7b, the available output power ($P_{out}$) varies in accordance with the coupling coefficient (k) and is limited by the limit value of the high frequency alternating-current power source 6 and the limit value of the non-contact power feeding section 10. In the examples of FIG. 5a to FIG. 7b, the limit values of the high frequency alternating-current power source 6, primary winding 101, and capacitor 202 have been described, but the limit values of other circuit elements also need to be taken into consideration in a similar manner.

Next, it is described how it is possible to calculate the voltage and current of each circuit element of the non-contact power feeding section 10 and the output power to the load section 7 using the circuit parameters of the non-contact power feeding section 10, the drive frequency of the inverter 63, and the coupling coefficient. Note that, in the following Mathematical Formulas, the drive frequency of the inverter 63 and the resonant frequency of the non-contact power feeding section 10 match each other (resonant state).

A ratio (the input impedance seen from the high frequency alternating-current power source 6 side) between a voltage ($V_{in}$: input voltage of the inverter 63) input to the non-contact power feeding section 10 from the high frequency alternating-current power source 6 and a current ($I_{in}$: input current of the inverter 63) is expressed by Mathematical Formula (2) below.

[Mathematical Formula (2)]

$$\frac{V_{in}}{I_{in}} = \frac{\kappa^2 \omega^2 L_1 L_2}{R} \quad (2)$$

Where $\omega$ represents the driving angular frequency of the inverter 63, $L_1$ represents the inductance of the primary winding 101, $L_2$ represents the inductance of the secondary winding 202, and R represents the resistance of the load section 7.

Then, the current ($I_{in}$) flowing to the primary side of the non-contact power feeding section 10 is expressed by Mathematical Formula (3) below.

[Mathematical Formula (3)]

$$|I_{in}| = \frac{R}{\kappa^2 \omega^2 L_1 L_2} |V_{in}| \quad (3)$$

Then, the voltage ($V_{c1}$) of the capacitor 102 and the voltage ($V_{L1}$) of the primary winding 101 are expressed by Mathematical Formula (4) and Mathematical Formula (5), respectively.

[Mathematical Formula (4)]

$$|V_{C1}| = \frac{R}{\kappa^2 \omega^3 L_2 L_2 C_1} |V_{in}| \quad (4)$$

[Mathematical Formula (5)]

$$|V_{L1}| = \left\{ 1 - \frac{R}{\kappa^2 \omega^3 L_1 L_2 C_1} \right\} |V_{in}| \quad (5)$$

Moreover, the current ($I_2$) flowing to the secondary side of the non-contact power feeding section 10, the voltage ($V_{C2}$) of the capacitor 202, and the voltage ($V_{L2}$) of the secondary winding 201 are expressed by Mathematical Formula (6) to Mathematical Formula (8).

[Mathematical Formula (6)]

$$|I_2| = \frac{1}{\kappa \omega \sqrt{L_1 L_2}} |V_{in}| \quad (6)$$

[Mathematical Formula (7)]

$$|V_{C2}| = \frac{1}{\kappa \omega^2 C_2 \sqrt{L_1 L_2}} |V_{in}| \quad (7)$$

[Mathematical Formula (8)]

$$|V_{L2}| = \frac{L_2}{\kappa \sqrt{L_1 L_2}} |V_{in}| \quad (8)$$

Furthermore, the voltage ($V_R$) applied to the load section 7 and the output power ($P_o$) to the load section 7 are expressed by Mathematical Formula (9) and Mathematical Formula (10).

[Mathematical Formula (9)]

$$|V_R| = \frac{R}{\kappa \omega \sqrt{L_1 L_2}} |V_{in}| \quad (9)$$

[Mathematical Formula (10)]

$$|P_o| = \frac{R}{\kappa^2 \omega^2 L_1 L_2} |V_{in}|^2 \quad (10)$$

The circuit parameters of the non-contact power feeding section 10 are determined at the design stage and thus are the known values, and therefore if the coupling coefficient (k) can be estimated, the voltage and current applied to each of the primary winding 101, secondary winding 201, and capacitors 102 and 202 can be calculated from the above-described Mathematical Formulas. Then, the limit value of each of the primary winding 101, secondary winding 201, and capacitors 102 and 202 is also determined in advance. Therefore, the input voltage (VA by which the voltage or current of at least one circuit element among the primary winding 101, secondary winding 201, and capacitors 102 and 202 becomes a limit value, is calculated using Mathematical Formula (4) to Mathematical Formula (8), and the calculated input voltage ($V_{in}$) is substituted into Mathematical Formula (10), so that the available output voltage ($P_{out}$) can be obtained.

That is, in this example, from the relationships expressed by the theoretical formulas of Mathematical Formulas (2) to (10), the available output power ($P_{out}$) can be calculated using the coupling coefficient (k) and each limit value. Note that, the drive frequency of the inverter 63 and the resonant frequency of the non-contact power feeding section 10 are matched in the above-described Mathematical Formulas, but may not to be matched.

Returning to FIG. 1, the control of the controller 20 is described. Upon activation of the non-contact power feeding system of this example, the controller 20 switches the control mode to an estimation mode for estimating the coupling coefficient (k). The position sensor 99 detects the position of the secondary winding 201 with respect to the primary winding 101. The coupling coefficient estimator 21 estimates the coupling coefficient (k) from the detection value of the position sensor 99, and transmits the same to the available output power calculator 22 and the voltage command value calculator 23.

Upon completion of the estimation of the coupling coefficient (k), the controller 20 switches the mode to a calculation mode for calculating a command value and an available output power. In the available output power calculator 22, there is stored in advance a table of the limit value of each circuit element of the non-contact power feeding section 10 and the limit value of the high frequency alternating-current power source 6, the table indicating a relationship between the coupling coefficient (k) and the available output power and corresponding to the above-described Mathematical Formulas. The available output power calculator 22 calculates, with reference to the table, the available output power ($P_{out}$) corresponding to the estimated coupling coefficient (k) and transmits the same to the voltage command value calculator 23.

The voltage command value calculator 23 compares the requested power ($P_{out}$ to the load section 7 with the available output power ($P_{out}$). When the requested power ($P_{out}$ to the load section 7 is larger than the available output power ($P_{out}$), the voltage command value calculator 23 calculates the output voltage ($V_{in}$) of the inverter 63 that is required in outputting the available output power ($P_{out}$), and calculates the command value for outputting the voltage ($V_{in}$) from the inverter 63. The output power of the load section 7 and the command value may be stored in a map in advance, so that the command value may be calculated using this map, or the output power and command value may be calculated using Mathematical Formula (10) based on the available output power ($P_{out}$) and the estimated coupling coefficient.

On the other hand, when the requested power ($P_{out\_ref}$) to the load section 7 is equal to or less than the available output power ($P_{out}$), the voltage command value calculator 23 calculates the output voltage ($V_{in}$) of the inverter 63 that is required in outputting the requested power ($P_{out\_ref}$), and calculates the command value for outputting the voltage ($V_{in}$) from the inverter 63.

Upon completion of the calculation of the available output power ($P_{out}$) and command value, the controller 20 switches the mode to a power mode for supplying an electric power to the load section 7, and transmits a switching signal, which is based on the command value calculated by the voltage command value calculator 23, to the transistors 63a to 63d. Then, the electric power of the three-phase alternating-current power source 64 is transmitted in a non-contact manner by magnetic coupling in the primary winding 101 and secondary winding 201, and is supplied to the load section 7.

Unlike this example, as a method for increasing the voltage command value to the available output power, there may be a method for setting a voltage command value of the inverter 63 first without taking into consideration the coupling state of the coil (without estimating the coupling coefficient (k)), and subsequently, gradually increasing the voltage command value of the inverter 63 so that the voltage and current applied to any circuit element of the non-contact power feeding section 10 will not exceed the limit value, thereby causing the output power to reach a target power (available output power) (comparative example).

Figure 8:
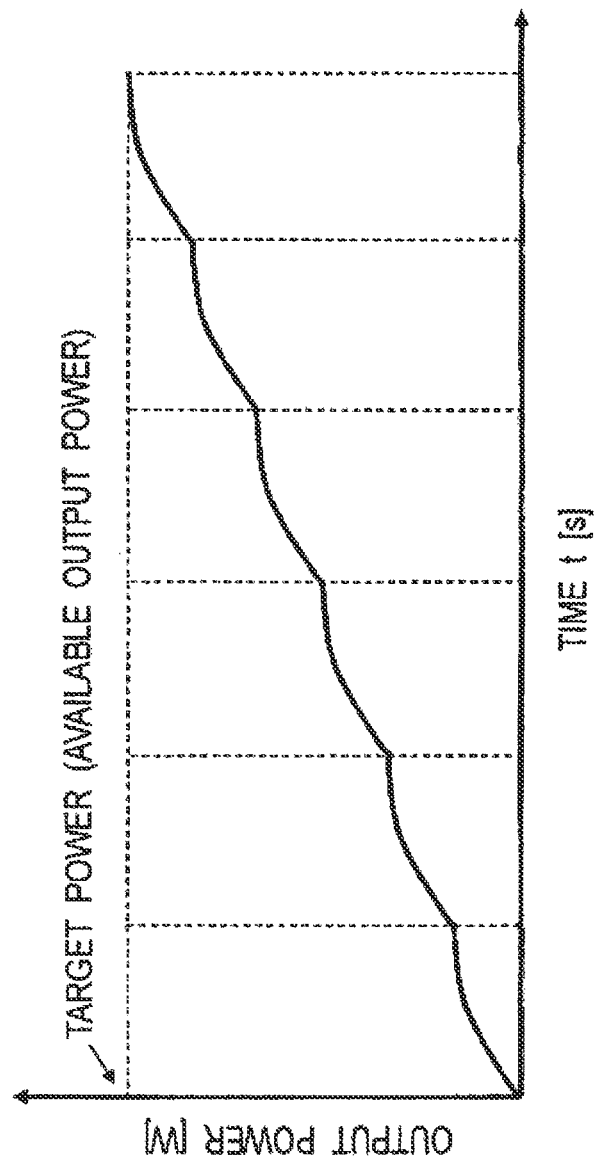
FIG. 8 is a graph illustrating a temporal characteristic of the output power to a load section, in a comparative example.

FIG. 8 is a graph illustrating a temporal characteristic of the output power to the load section 7 when the method of the comparative example is used. As illustrated in FIG. 8, because the voltage command value of the inverter 63 is increased in a stepwise manner, the output power to the load section 7 also increases in a stepwise manner. As the result, in the comparative example, after outputting the command value to the inverter 63, the time for the output power of the load section 7 to reach the target power is long.

In particular, in the case where the primary winding 101 and the secondary winding 201 are shifted from each other, when the voltage ($V_{in}$) of the inverter 63 is set as with the case where the primary winding 101 and the secondary winding 201 are in a state of directly facing each other (in a state where there is no position shift between the coils), the voltage or current applied to each circuit element may exceed the limit value. For this reason, in the above-described method of the comparative example, the voltage command value needs to be increased on the assumption of a position shift between the primary winding 101 and the secondary winding 201, and therefore the amount of increase in the command value has to be further reduced so as not to exceed the limit value and thus the time for the output power to reach a target power is longer.

Moreover, as another method, the breakdown voltage of each circuit element of the non-contact power feeding section 10 might be set larger in advance. However, there is a problem that the cost of the power feeding system increases or that the system is enlarged. Moreover, although it is contemplated that the positional relationship between the primary winding 101 and the secondary winding 201 is limited within the breakdown voltage range of an element, there is a problem that the convenience for users is reduced because the power feedable range narrows.

In this example, as described above, the coupling state between the primary winding 101 and the secondary winding 201 is estimated, and based on the limit values and coupling state of the circuit elements of the non-contact power feeding section 10, the available output power that can be output to the load section 7 is calculated, and thus the available output power ($P_{out}$) is recognized before a command value is input to the inverter 63, and therefore a command value for outputting the available output power ($P_{out}$) to the load can be generated. As the result, because the command value can be immediately increased to control the inverter 63 and the available output power ($P_{out}$) can be output to the load, the time for the output power to reach a target power can be made shorter than the comparative example.

Figure 9:
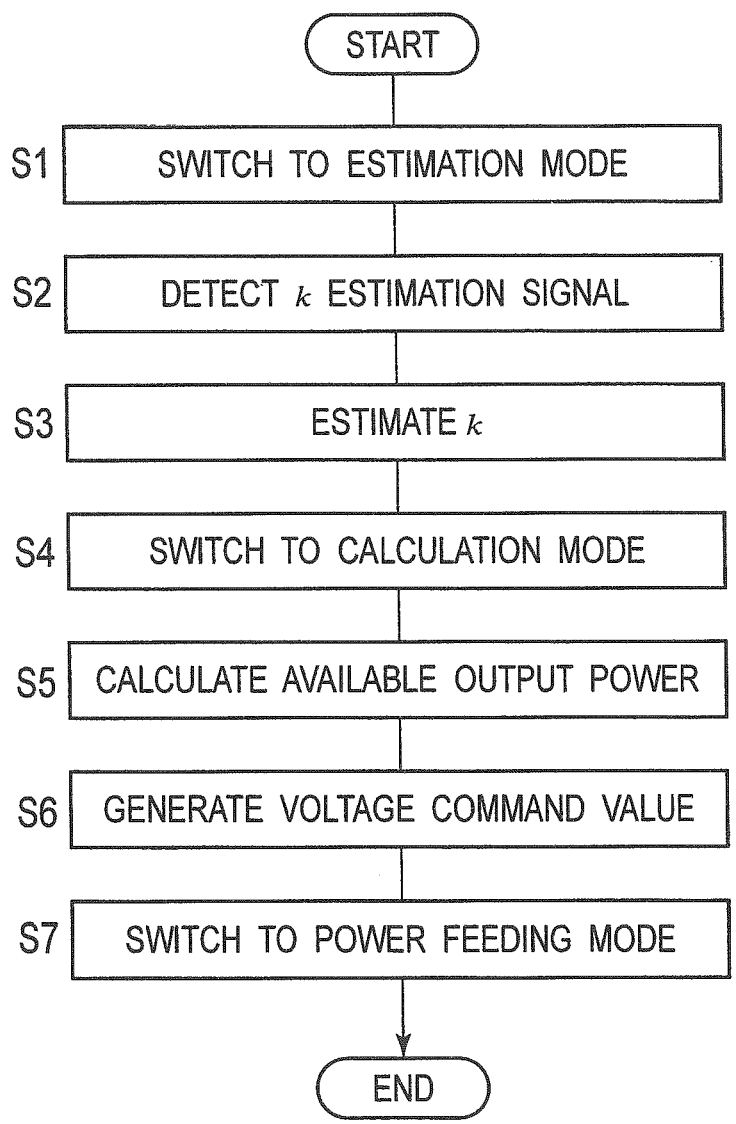
FIG. 9 is a flow chart illustrating the control procedure of a controller of FIG. 1.

The control flow of the controller 20 is described using FIG. 9. FIG. 9 is the flow chart illustrating the control procedure of the controller 20.

In Step S1, the controller 20 sets the control mode to the estimation mode. In Step S2, the coupling coefficient estimator 21 receives a signal required for estimating the coupling coefficient (k) from the position sensor 99. In Step S3, the coupling coefficient estimator 21 estimates the coupling coefficient from the information of the detection value included in the signal detected in Step S2. In Step S4, the controller 20 switches the control mode from the estimation mode to the calculation mode. In Step S5, the available output power calculator 22 calculates an available output power using the coupling coefficient estimated in Step S3. In Step S6, the voltage command value calculator 23 compares the calculated available output power with the requested power ($P_{out}$ and generates a command value of the inverter 63 for attaining a lower electric power. In Step S7, the controller 20 switches the control mode to the power feeding mode, and controls the inverter 63 based on the command value of Step S6.

As described above, the present invention estimates the coupling coefficient (k), and calculates the available output power to the load section 7 based on the limit values and the coupling coefficient of the circuit element of the non-contact power feeding section 10. Thus, at the start of control of the inverter 63, the controller 20 recognizes the available output power, which can be output to the load section 7, while the voltage or current applied to the circuit element does not exceed the limit value, and therefore the control time of the controller 20 until the output power reaches the available output power can be reduced.

Moreover, in this example, as shown in Mathematical Formula (2) to Mathematical Formula (10), from the relationship expressed by the theoretical formula including the inductance of the primary winding 101, the inductance of the secondary winding 201, the drive frequency of the inverter 63, the coupling coefficient, and the voltage and current applied to the circuit element of the non-contact power feeding section 10, the available output power is calculated using the coupling coefficient (k) and the limit value. Thus, in this example, if the coupling coefficient (k) is estimated, the available output power can be calculated, and therefore the available output power can be calculated only with the information on the power transmission side. Then, the information on the receiving side (e.g., the applied voltage and the like of the secondary side circuit during driving of the inverter 63) may not be received on the transmission side, and therefore a time required for signaling on the power transmission side and a time required for signaling on the power reception side can be saved. Moreover, because the available output power can be recognized before actually driving the inverter 63, the control time of the controller 20 until the output power reaches the available output power can be reduced.

Moreover, in this example, a command value for controlling the inverter 63 is calculated based on the available output power calculated by the available output power calculator 22. Thus, the inverter can be driven taking into consideration the limit value of each circuit element.

Figure 10:
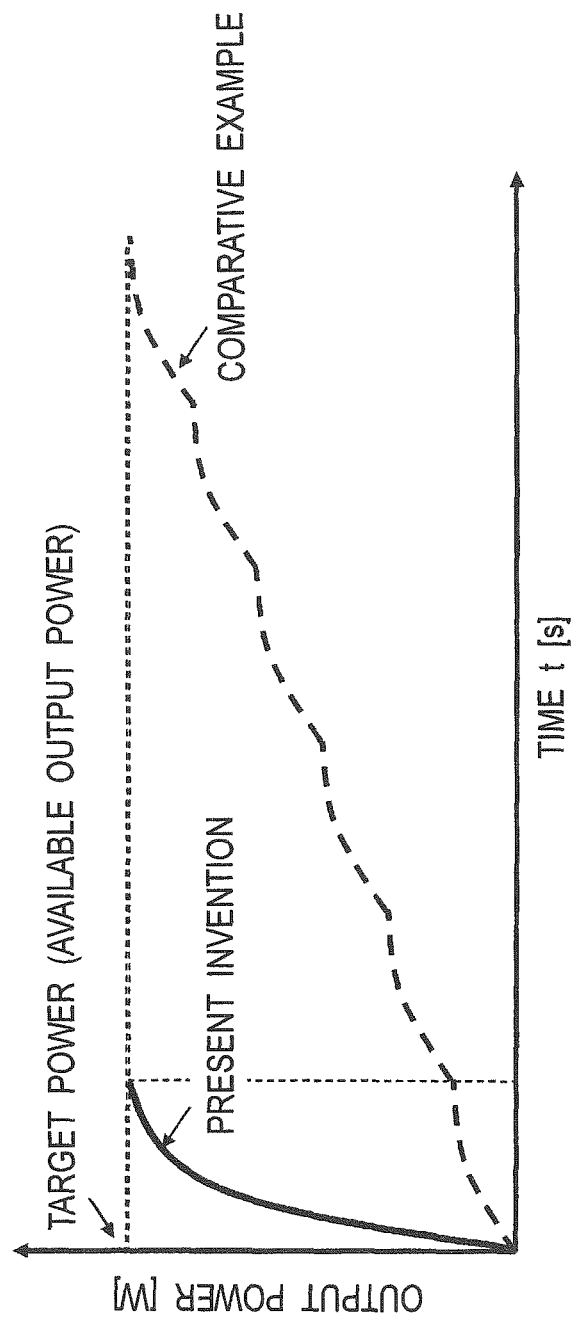
FIG. 10 illustrates a temporal characteristic of the output power in each of the non-contact power feeding apparatuses according to an embodiment and the comparative example.

FIG. 10 illustrates the temporal characteristics of the output power of the comparative example and the present invention. In the comparative example, because the command value of the inverter 63 is increased in a stepwise manner from zero, it takes a long time for the output power to reach a target power (available output power). On the other hand, in the present invention, because a command value for outputting the available output power is calculated before driving of the inverter 63, the command value can be immediately increased. As the result, in the present invention, the rise time of the load power can be reduced.

Moreover, in this example, even if the circuit configuration on the power transmission side and the circuit configuration on the power reception side of the non-contact power feeding section 10 differ from the configuration of the circuit illustrated in FIG. 1, the available output power can be calculated from the estimated coupling coefficient and the limit value. That is, the theoretical formulas expressed by Mathematical Formulas (2) to (10) can be derived in a similar manner from the circuit equation corresponding to a circuit, not limited to the circuit of FIG. 1. Then, the parameter and limit value of each circuit element are the information already known at the design stage. Therefore, the present invention can be implemented even if the non-contact power feeding section 10 has a different circuit configuration.

Moreover, even if the circuit configuration on the power reception side, to which an electric power is fed, is changed, in this example if the information about the limit value of each circuit configuration can be obtained, the electric power can be fed after calculation of the available output power.

Note that, in this example, the position sensor 99 is provided as a sensor for measuring the coupling coefficient (k), but for example with a camera or the like, the relative position of the secondary winding 202 with respect to the primary winding 101 may be detected. Alternatively, a voltage or current sensor may be provided on the primary side or secondary side of the non-contact power feeding section 10 and the coupling coefficient estimator 21 may estimate the coupling coefficient (k) from the sensor value. That is, because there is a correlation between the coupling coefficient (k) and the voltage or current on the primary side or secondary side and the circuit parameters of the non-contact power feeding section 10 are already known at the design stage, the coupling coefficient (k) can be estimated from the detection value of the voltage or current sensor by calculation. Moreover, because it is known that the theoretical formula of the power feeding circuit is established between the input current and input voltage from the inverter 63 to the primary side of the non-contact power feeding section 10, the circuit parameters of the non-contact power feeding section 10, and the coupling coefficient (k), the coupling coefficient estimator 21 may estimate the coupling coefficient (k) using this theoretical formula.

The above-described primary winding 101 corresponds to a "power transmission coil" of the present invention, the secondary winding 201 corresponds to a "power reception coil" of the present invention, the coupling state estimator 21 corresponds to a "coupling state estimator" of the present invention, the available output power calculator 22 corresponds to an "available output power calculator" of the present invention, and the voltage command value calculator 23 corresponds to a "command value generator" of the present invention.

Second Embodiment

Figure 11:
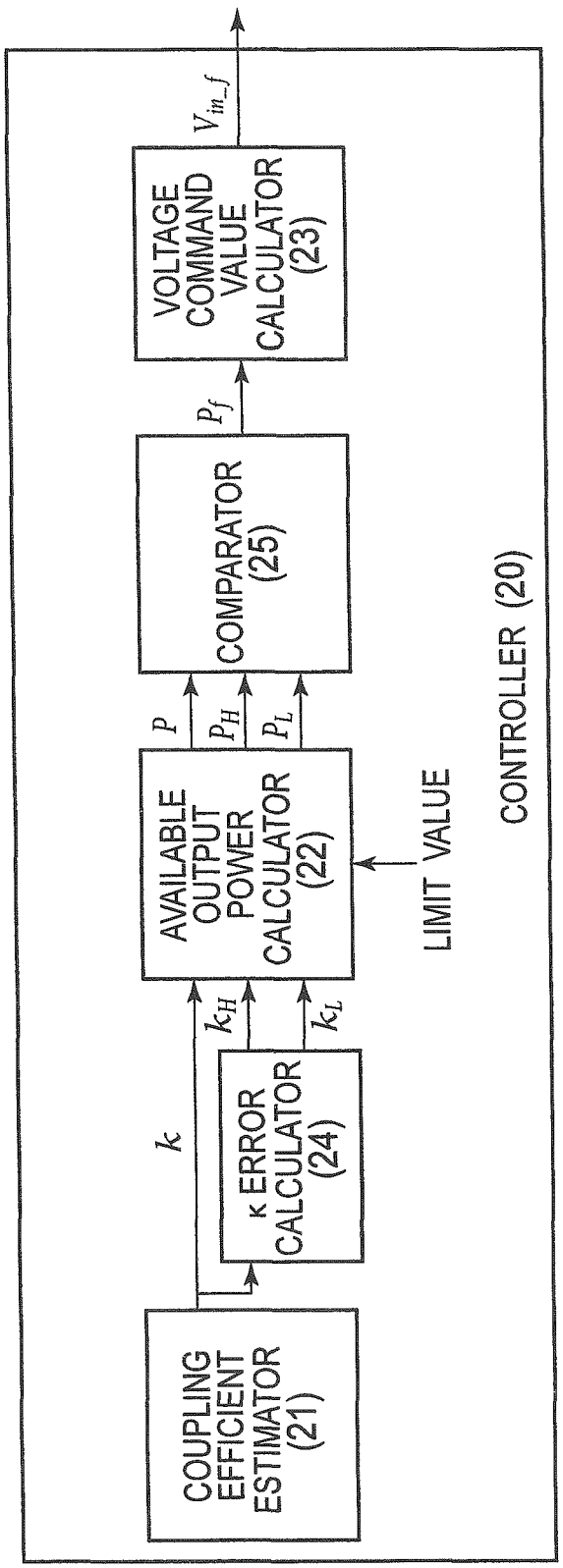
FIG. 11 is the block diagram of a controller of a non-contact power feeding apparatus according to another embodiment of the present invention.

FIG. 11 is the block diagram of a controller of a non-contact power feeding apparatus according to another embodiment of the present invention. This example differs from the above-described first embodiment in that a coupling coefficient (k) error calculator 24 and a comparator 25 are provided. Because the configuration other than this is the same as the above-described first embodiment, the description thereof is incorporated as required.

As illustrated in FIG. 11, the controller 20 includes the coupling coefficient error calculator 24 and the output estimation value comparator 25. The coupling coefficient error calculator 24 calculates, from the coupling coefficient (k) estimated by the coupling coefficient estimator 21, an error range of the coupling coefficient and calculates a lower limit value ($k_L$) and upper limit value ($k_H$) of the error range.

Figure 12:
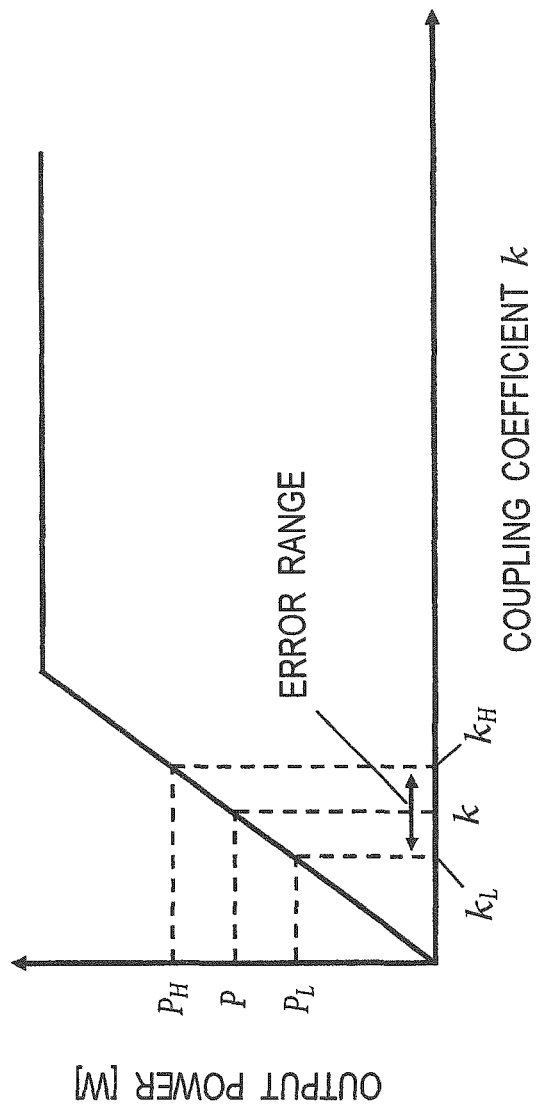
FIG. 12 is a view illustrating an error range of the coupling coefficient of the non-contact power feeding section controlled by the controller of FIG. 11.

Here, the error range of the coupling coefficient is described using FIG. 12. FIG. 12 illustrates the characteristic of the output voltage to the load section 7 with respect to the coupling coefficient. Because the estimation accuracy of the coupling coefficient by the coupling coefficient estimator 21 is affected by the accuracy of the position sensor 99 or an error and the like of the calculation parameter for estimating the coupling coefficient, an estimation error occurs depending on the degree of influence. The estimation error is indicated by a predetermined range (error range) centered on the coupling coefficient estimated by the coupling coefficient estimator 21. Then, the lower limit value of the predetermined range is designated by $k_L$ and the upper limit value is designated by $k_H$.

In the case where the output power of the load section 7 with respect to the coupling coefficient exhibits the characteristic as illustrated in FIG. 12, if the output power with respect to the estimated coupling coefficient (k) is designated by P, then the output power with respect to the lower limit value ($k_L$) of the coupling coefficient corresponds to $P_L$ that is smaller than P, and the output power with respect to the upper limit value ($k_H$) of the coupling coefficient corresponds to $P_H$ that is larger than P. That is, the estimation error of the coupling coefficient k affects also the available output power.

Returning to FIG. 11, the error range of the estimation error in calculation of the error range of the coupling coefficient error calculator 24 is determined in advance at the design stage by the accuracy and the like of the measurement system, and can be specified in a range from −5 to +5%, for example. Therefore, the coupling coefficient error calculator 24 calculates the lower limit value ($k_L$) and upper limit value ($k_H$) of the coupling coefficient from the coupling coefficient estimated by the coupling coefficient estimator 21 and a predetermined error range, and outputs the same to the available output power calculator 22.

The available output power calculator 22 calculates the available output powers ($P_L$, P, $P_H$) corresponding to the coupling coefficient (k) estimated by the coupling coefficient estimator 21 and the lower limit value (10 and upper limit value ($k_H$) of the coupling coefficient, respectively. As the method for calculating the available output power, the method shown in the first embodiment may be used.

The comparator 25 compares the calculated plurality of available output powers to extract the smallest available output power ($P_f$). Among the plurality of available output powers, the severest output power with respect to the limit value of the circuit element of the non-contact power feeding section 10 (the output power at which the voltage or current applied to the circuit element is the lowest) is the smallest available output power, and thus the comparator 25 extracts the smallest available output power.

Then, the voltage command value calculator 23 generates a command value ($V_{in\_f}$) based on the smallest available output power ($P_f$) and outputs the same to the transistors 63a to 63d.

After starting to control the inverter 63 based on the command value ($V_{in\_f}$), the controller 20 increases, while detecting the electric power of the load section 7, the command value ($V_{in\_f}$) in a stepwise manner at a constant rate so that the voltage or current of the circuit element of the non-contact power feeding section 10 will not exceed the limit value, thereby increasing the output power of the load section 7 to the available output power. In the control to increase the command value ($V_{in\_f}$) in a stepwise manner at a constant rate, a method similar to the method of the comparative example of the first embodiment may be used. Moreover, the output power of the load section 7 may be calculated by a detection value of a sensor that may be provided on the output side of the power reception circuit section 200. Moreover, for detecting whether or not the voltage or current of each circuit element of the non-contact power feeding section 10 exceeds the limit value, the voltage or current of each circuit element may be detected with the sensor.

Figure 13:
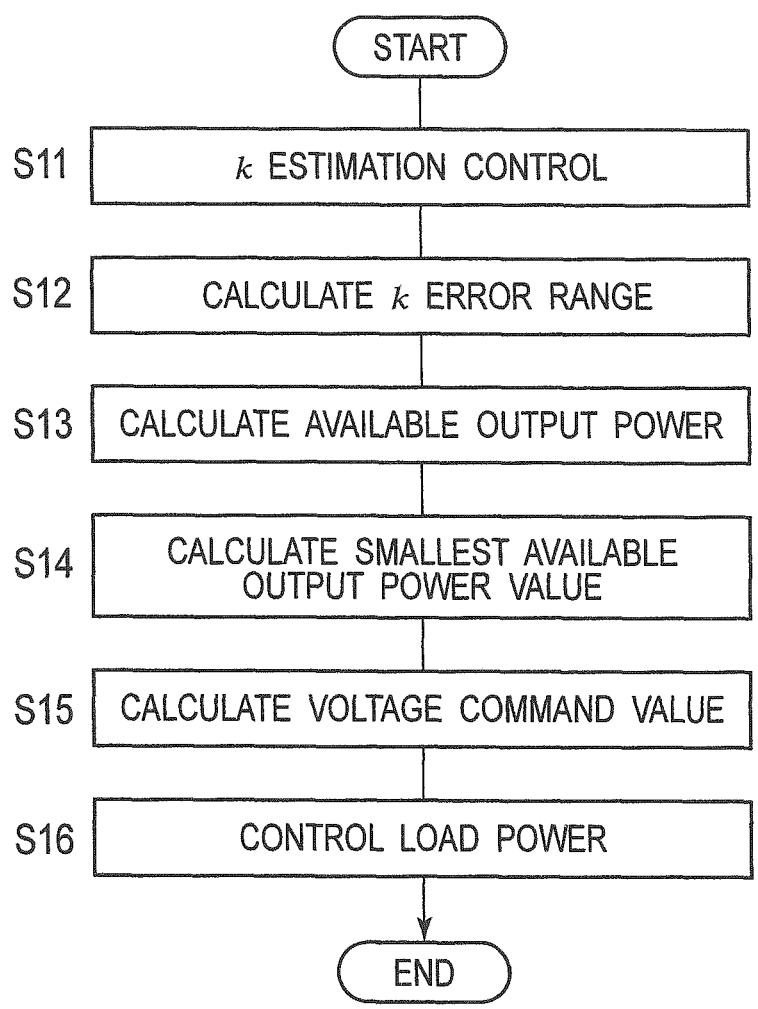
FIG. 13 is a flow chart illustrating the control procedure of the controller of FIG. 11.

Next, the control flow of the controller 20 is described using FIG. 13. FIG. 13 is a flow chart illustrating the control procedure of the controller 20.

In Step S11, the controller 20 performs estimation control for estimating the coupling coefficient (k). The control contents of Step S11 are the same as those of Steps 1 to 3 in FIG. 9. In Step S12, after switching the control mode to the calculation mode, the coupling coefficient error calculator 24 calculates the error range from the coupling coefficient estimated in Step S1. In Step S13, the available output power calculator 22 calculates the available output power while corresponding to the coupling coefficient within the error range calculated in Step S12.

In Step S14, the comparator 25 compares the calculated plurality of available output powers to extract the smallest available output power. In Step S15, the voltage command value calculator 23 generates a command value based on the smallest available output power. After switching to the power feeding mode, in Step S16, the controller 20 increases, while detecting the output voltage to the load section 7, the command value in a stepwise manner so that the voltage or current of the circuit element will not exceed the limit value, thereby increasing the output power of the load section 7 to the available output power.

As described above, the present invention calculates an error range of the coupling coefficient (k), calculates an available output power based on a plurality of coupling states included in the error range, respectively, and generates a command value based on the smallest available output power among the calculated plurality of available output powers. Thus, using the estimation error in the coupling state, the voltage or current of each circuit element can be prevented from exceeding the limit value. That is, in the case where the estimated coupling coefficient differs significantly from the original coupling coefficient due to the estimation error of the coupling coefficient, if the available output power is calculated based on the estimated coupling coefficient and a command value is generated, the voltage or current of each circuit element may exceed the limit value. However, in this example, because the command value is generated taking into consideration the estimation error so that the voltage or current of each circuit element will not exceed the limit value, the possibility of exceeding the limit value can be avoided.

Figure 14:
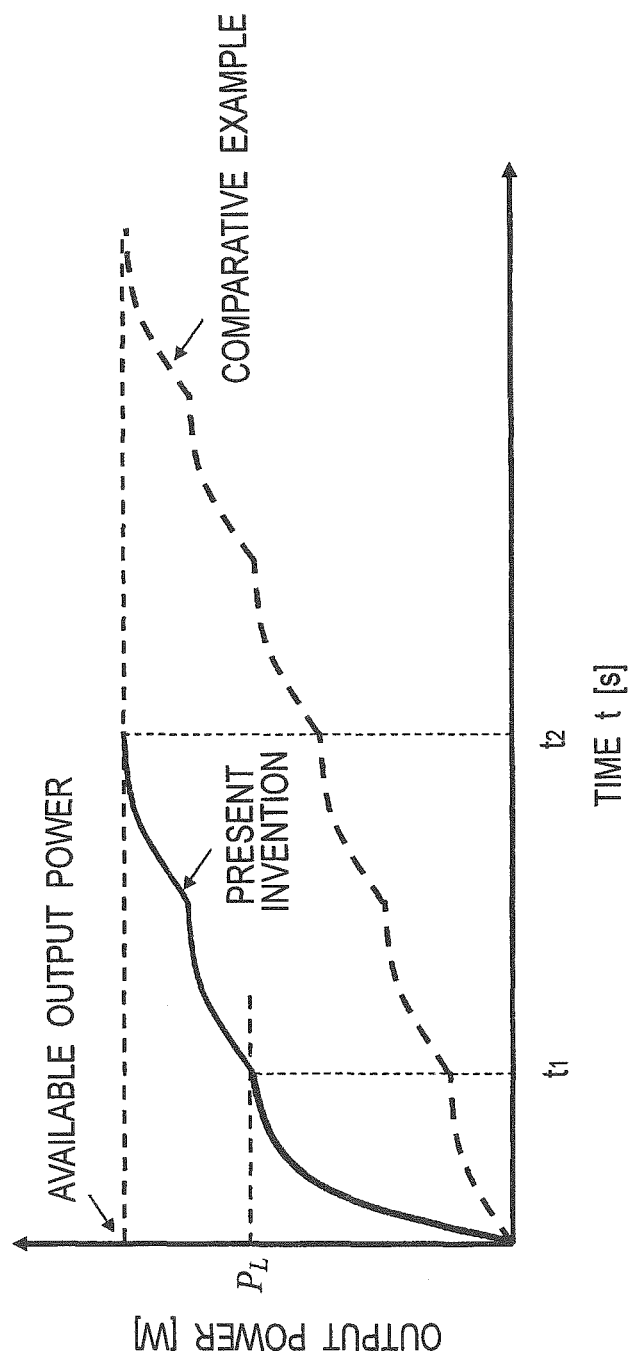
FIG. 14 illustrates a temporal characteristic of the output power in each of the non-contact power feeding apparatuses according to the embodiment and the comparative example.

FIG. 14 illustrates the temporal characteristics of the output power of the comparative example and the present invention. In the comparative example, because the command value of the inverter 63 is increased in a stepwise manner, it takes a long time for the output power to reach a target power (available output power). On the other hand, the present invention calculates a command value for outputting the available output power before driving the inverter 63, and therefore can immediately increase the command value without exceeding the actual available output power (the limit value of each element). Moreover, after immediately increasing the command value, the present invention can increase the output power of the load section 7 to the actual available output power by increasing the command value in a stepwise manner. As the result, the present invention can reduce the rise time of the load power.

The above-described coupling coefficient error calculator 24 corresponds to an "error range calculator" of the present invention.

Third Embodiment

Figure 15:
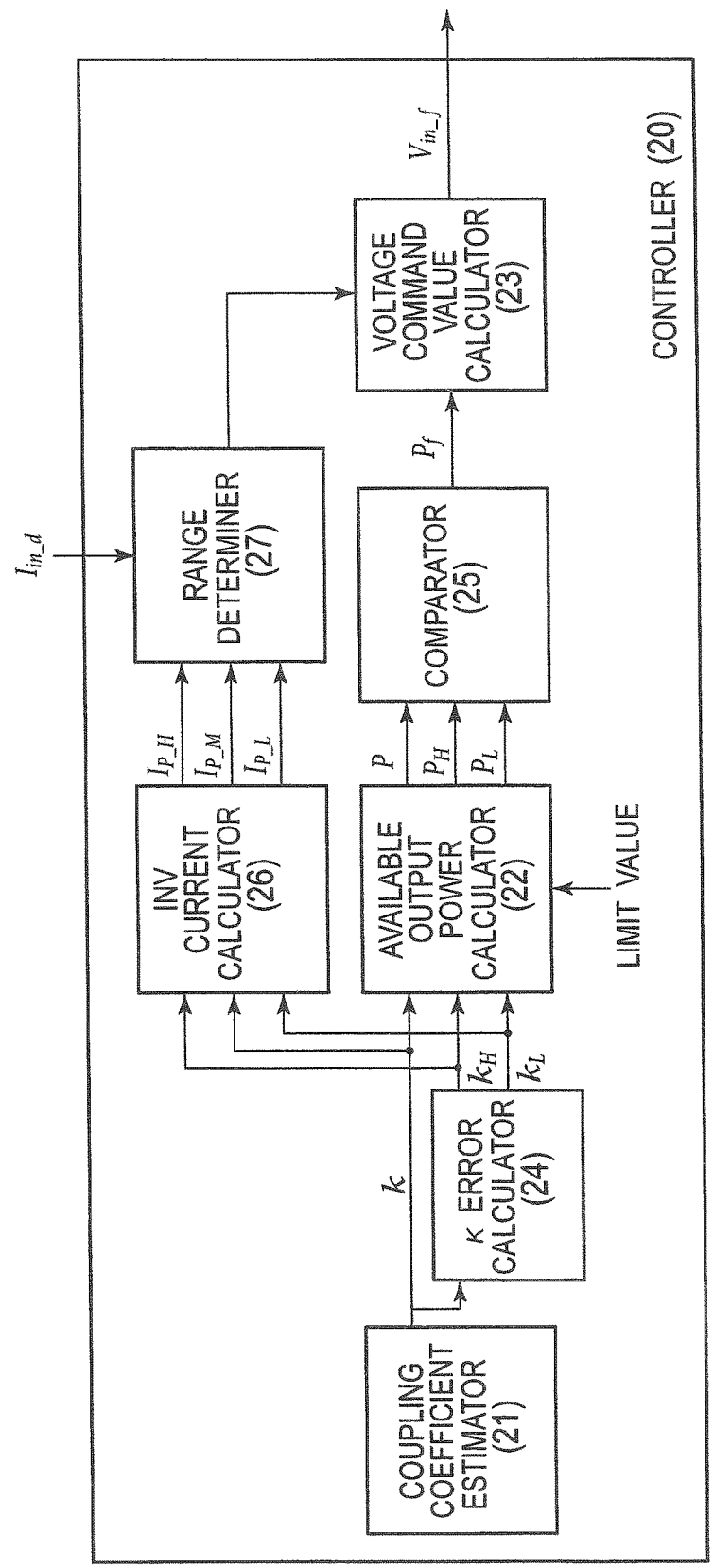
FIG. 15 is the block diagram of a controller of a non-contact power feeding apparatus according to yet another embodiment of the present invention.

FIG. 15 is the block diagram of a controller of a non-contact power feeding apparatus according to yet another embodiment of the present invention. This example differs from the above-described second embodiment in that an inverter (INV) current calculator 26 and a range determiner 27 are provided. Because the configuration other than this is the same as the above-described second embodiment, the description of the first embodiment and second embodiment is incorporated as required.

The controller 20 includes the inverter current calculator 26 and the range determiner 27. The inverter current calculator 26 calculates, from the estimated coupling coefficient (k) estimated by the coupling coefficient estimator 21 and the lower limit value ($k_L$) and the upper limit value ($k_H$) calculated by the coupling coefficient calculator 24, inverter currents corresponding to the respective values. Here, the inverter current is the current output from the inverter 63 to the non-contact power feeding section 10, and is the current ($I_{in}$) flowing to the primary side of the non-contact power feeding section 10.

Based on the detection value of a sensor to detect the inverter current, the range determiner 27 determines which of a lower power range corresponding to a range between the estimated coupling coefficient (k) and the lower limit value ($k_L$) or a higher power range corresponding to a range between the estimated coupling coefficient (k) and the upper limit value ($k_H$) the electric power actually output to the load section belongs to, and transmits the determination result to the voltage command value calculator 23. The sensor to detect the inverter current may be connected between the high-frequency power source 6 and the power transmission circuit section 100.

Figure 16:
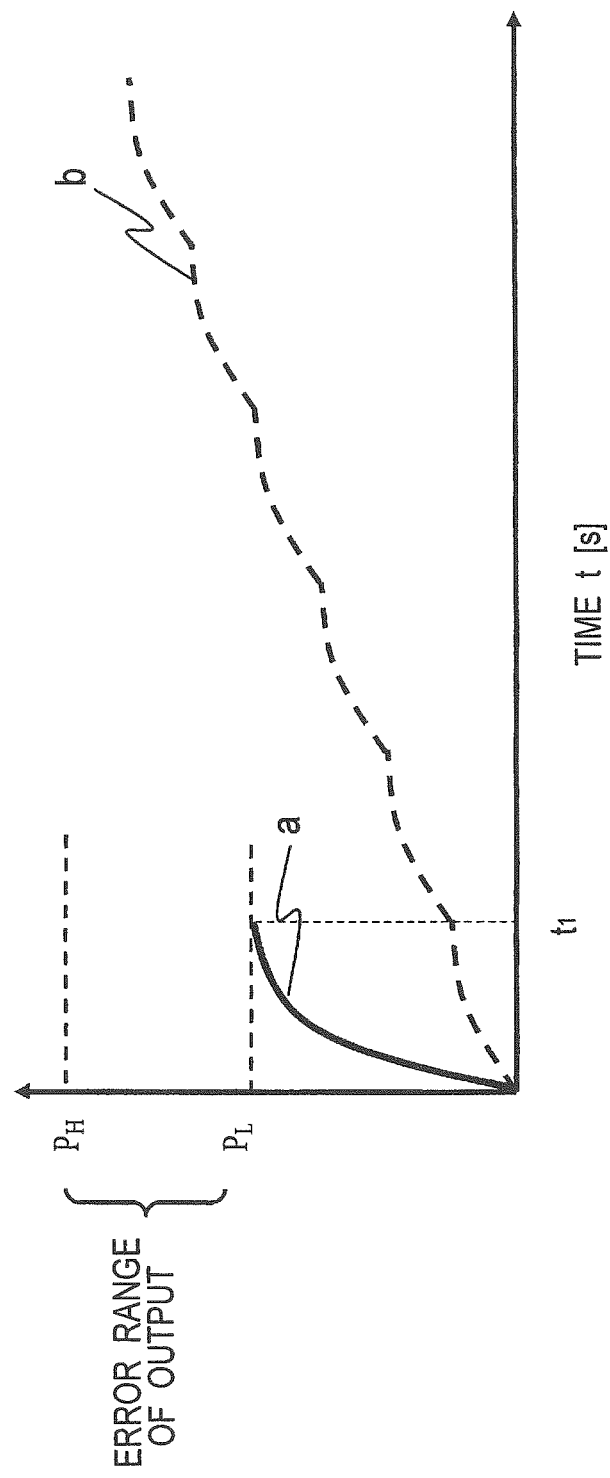
FIG. 16 is a graph illustrating the characteristic of the output power to the load section 7 with respect to time, in the non-contact power feeding apparatus controlled by the controller of FIG. 15.
Figure 17:
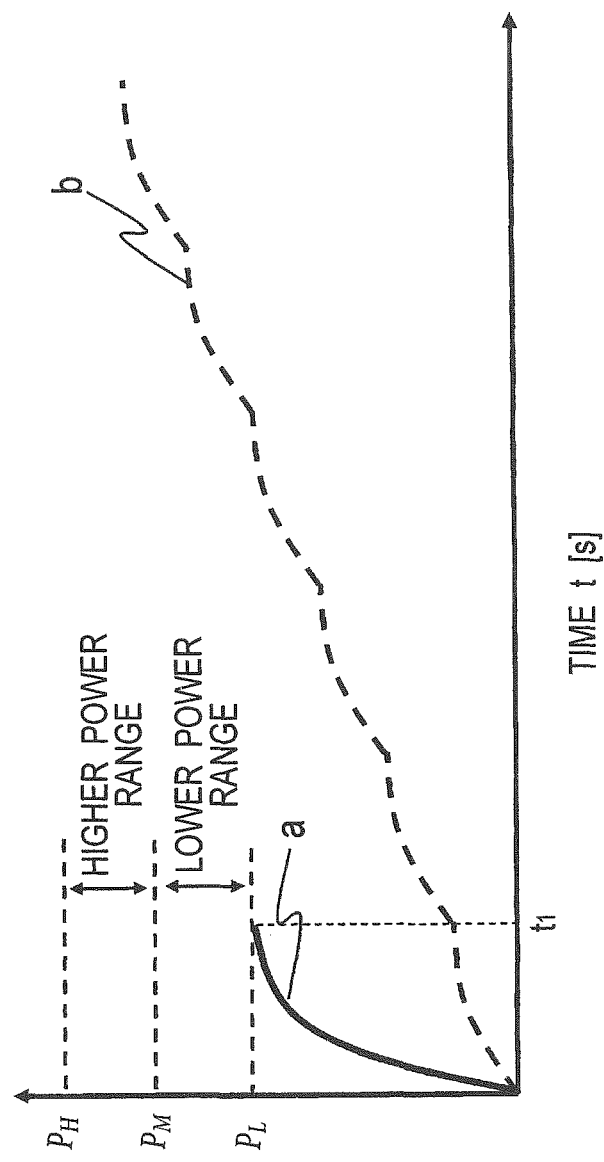
FIG. 17 is a graph illustrating the characteristic of the output power to the load section 7 with respect to time, in the non-contact power feeding apparatus controlled by the controller of FIG. 15.

Here, the relationship between the error range of the estimated coupling coefficient (k) and the electric power actually output to the load section 7 is described as compared with the control of the second embodiment. FIGS. 16 and 17 are the graphs illustrating the characteristic of the output power to the load section 7 with respect to time and are the graphs for illustrating the relationship between the estimation error range and the actual output power. In FIG. 16 and FIG. 17, a graph "a" illustrates the characteristic according to the second embodiment, while a graph "b" illustrates the characteristic according to the above-described comparative example.

In FIGS. 16 and 17, $P_L$ is a calculation value of the available output power that can be output to the load section 7 while suppressing the voltage or current to the circuit element to the limit value or less by using the lower limit value ($k_L$) of the estimation error range and Mathematical Formula (3) to Mathematical Formula (10). $P_H$ is a value calculated based on the upper limit value ($k_H$) of the estimation error range. Note that, depending on the circuit characteristic of the non-contact power feeding section 10, the available output power ($P_L$) corresponding to the lower limit value ($k_L$) is not necessarily smaller than the available output power ($P_H$) corresponding to the upper limit value ($k_H$), but here $P_H > P_L$ for ease of description.

As illustrated in the second embodiment, because the estimated coupling coefficient (k) has an estimation error, the available output power ($P_{out}$) calculated based on the estimated coupling coefficient has an error range corresponding to the estimation error. Then, the error range is within the range between the lower limit value ($P_L$) and the upper limit value ($P_H$). In the method of the second embodiment, because a command value is generated and the inverter is controlled based on the smallest available output power ($P_L$), the output power to the load section 7 rises to $P_L$ at a time point of time $t_1$ (see the graph "a" in FIG. 16).

Assume that the actual available output power (not the estimated value, but the output power to the load section 7 based on the actual coupling coefficient) is equal to the upper limit value ($P_H$), then in the control of the second embodiment, after the time $t_1$, the command value needs to be increased in a stepwise manner to increase the output power to the load section 7 from $P_L$ to $P_H$. Therefore, it takes time for the electric power to rise after the time $t_1$.

The present invention, as illustrated in FIG. 17, divides the error range of the available output power ($P_{out}$) that is a calculation value into a higher power range and a lower power range, and varies the control of the command value of the inverter 63 according to which range the actual available output power belongs to. Hereinafter, a specific control of the controller 20 is illustrated using FIG. 15.

The point that the command value ($V_{in\_f}$) is generated based on the smallest available output power ($P_f$) using the coupling coefficient 21, the available output power calculator 22, the voltage command value calculator 23, the k error calculator 24, and the comparator 25 to control the inverter 63 is the same as that of the control of the second embodiment and therefore the description thereof is omitted.

When the inverter 63 is controlled with the command value ($V_{in\_f}$), an electric power is fed to the non-contact power feeding section 10 from the high frequency alternating-current power source 6, and therefore an inverter current ($I_{in\_d}$) is detected with a non-illustrated sensor and this detection value ($I_{in\_d}$) of the sensor is input to the range determiner 27.

In this example, in order to determine which of the higher power range or the lower power range the actual available output power belongs to, the calculation values ($I_{p\_L}$, $I_p$, $I_{p\_H}$) of the inverter current based on the estimated coupling coefficient is compared with the detection value ($I_{in\_d}$) of the inverter current.

Figure 18:
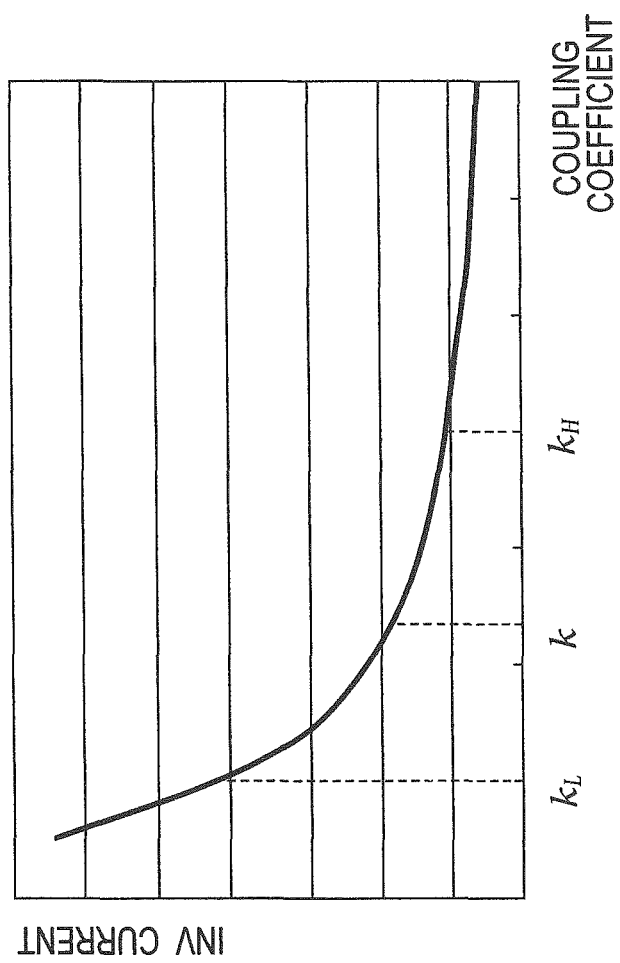
FIG. 18 is a graph illustrating the characteristic of an inverter current with respect to the coupling coefficient, in the non-contact power feeding apparatus controlled by the controller of FIG. 15.

As illustrated in FIG. 18, when the inverter voltage (the output voltage from the inverter 63 to the non-contact power feeding section 10) is fixed, the inverter current varies in accordance with the coupling coefficient. Therefore, the error range of the coupling coefficient can be expressed as a range of the inverter current, and the range of the inverter current is calculated by calculating the respective inverter currents from the lower limit value ($k_L$) of the coupling coefficient and the upper limit value ($k_H$) of the coupling coefficient. Furthermore, from Mathematical Formula (10), the detection value ($I_{in\_d}$) of the inverter current is the current value actually output from the inverter 63 and therefore can be regarded as the actual available output power to the load section 7, from Mathematical Formula (10). That is, in this example, the current range of the inverter corresponding to the error range of the coupling coefficient is calculated from the estimated coupling coefficient and is compared with the detection value of the sensor, thereby determining which of the higher power range or the lower power range the actual electric power that can be output to the load section 7 belongs to.

First, the inverter current calculator 26 calculates the respective inverter currents using the lower limit value ($k_L$) and upper limit value ($k_H$) of the coupling coefficient. The current range between the respective values of the calculated inverter current is the current range of the inverter corresponding to the error range of the coupling coefficient. Moreover, the inverter current calculator 26 calculates the inverter current from the estimated coupling coefficient (k). The inverter current calculated from the coupling coefficient (k) serves as an intermediate value ($I_{p\_M}$) of the inverter current range. Then, the inverter current calculator 26 transmits the calculated upper limit value ($I_{p\_H}$), lower limit value ($I_{p\_L}$), and intermediate value ($I_{p\_M}$) of the inverter current range to the range determiner 27.

The range determiner 27 determines which of a lower current range from the lower limit value ($I_{p\_L}$) to the intermediate value ($I_{p\_M}$) or a higher current range from the intermediate value ($I_{p\_M}$) to the upper limit value ($I_{p\_H}$) the detection value ($I_{in\_d}$) of the sensor belongs to. Then, the range determiner 27 transmits the determination result to the voltage command value calculator 23.

The voltage command value calculator 23 generates, when the detection value ($I_{in\_d}$) of the sensor belongs to the lower current range, a command value based on the available output power ($P_L$) corresponding to the lower limit value of the coupling coefficient and outputs the same to the transistors 63a to 63d. Moreover, the voltage command value calculator 23 generates, when the detection value ($I_{in\_d}$) of the sensor belongs to the higher current range, a command value based on the available output power (P) calculated from the coupling coefficient (k) corresponding to the intermediate value ($I_{p\_M}$) and outputs the same to the transistors 63a to 63d. As this available output power (P), a value calculated by the available output power calculator 22 may be used. Then, after the inverter 63 is controlled with the command value based on the available output power ($P_L$) or with the command value based on the available output power (P) in the voltage command value calculator 23, an electric power is increased while increasing the command value ($V_{in\_f}$) in a stepwise manner at a constant rate with a method similar to the comparative example of the first embodiment.

Figure 19:
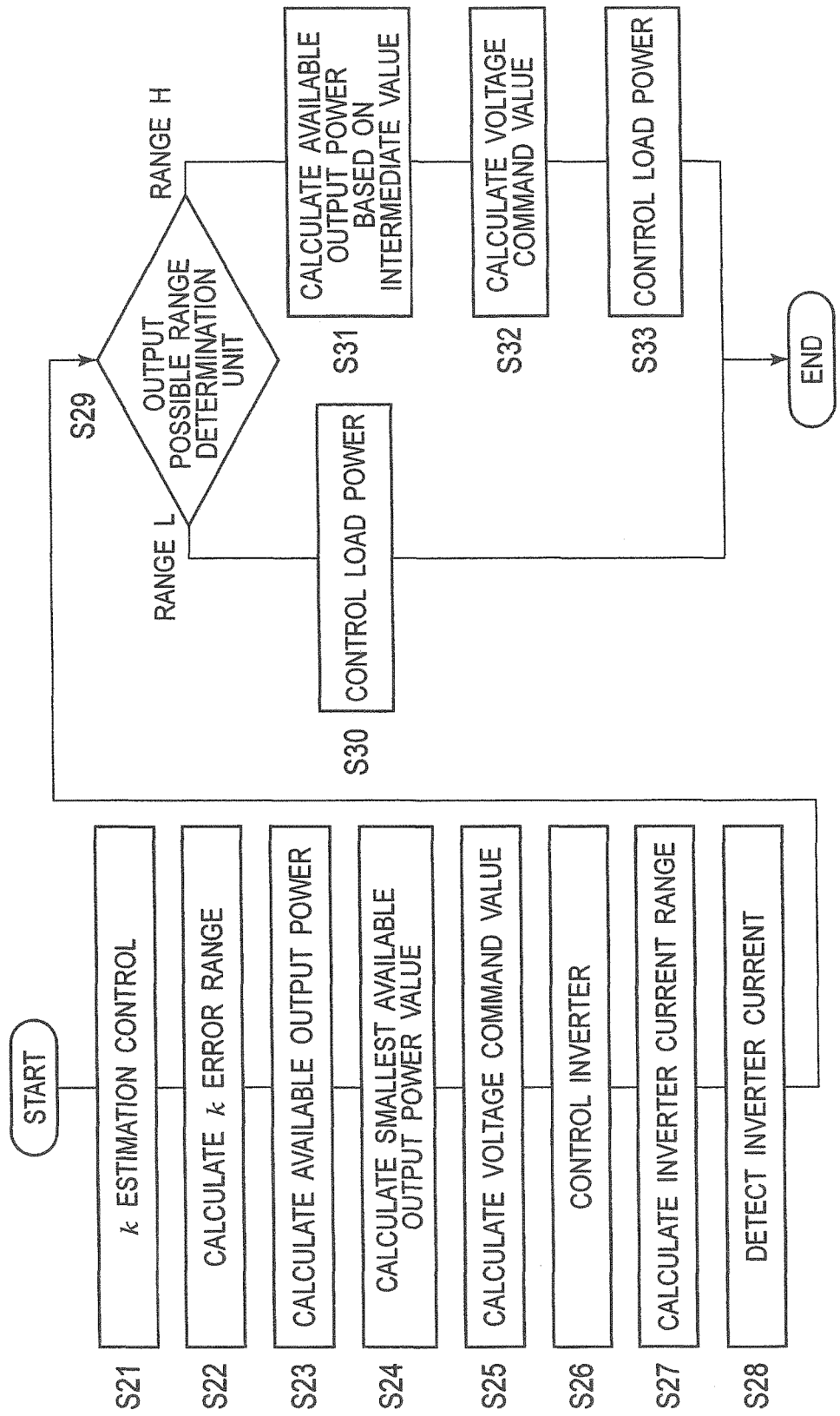
FIG. 19 is a flow chart illustrating the control procedure of the controller of FIG. 15.

Next, the control flow of the controller 20 of this example is illustrated using FIG. 19. FIG. 19 is the flow chart illustrating the control procedure of the controller 20 of this example.

Because the control from Step 21 to Step S25 is the same as the control from Steps 11 to 15 in FIG. 13, the description thereof is omitted. In Step S26, the controller 20 controls, based on the command value generated in Step S25, the inverter 63 to start feeding an electric power. In Step S27, the inverter current calculator 26 calculates the respective inverter currents based on the coupling coefficient (k) and the lower limit value ($k_L$) and upper limit value ($k_H$) of the error range of the coupling coefficient, and calculates the lower current range and the higher current range.

In Step S28, a sensor provided on the output side of the inverter 63 detects the inverter current ($I_{in\_d}$). In Step S29, the range determiner 27 determines which of a lower current range (range L) or a higher current range (range H) the detection value ($I_{in\_d}$) of the sensor belongs to. When the detection value belongs to the lower current range, the voltage command value calculator 23 generates a command value based on the smallest available output power ($P_f$) and outputs the same to the inverter 63. Then, the controller 20 increases, while detecting the output voltage to the load section 7, the command value in a stepwise manner so that the voltage or current of the circuit element will not exceed the limit value, thereby increasing the output power of the load section 7 to the available output power (Step 30). Note that, because the inverter control with the command value based on the available output power ($P_f$) is already performed in Step S26, in Step S30 the inverter 63 may be controlled with a command value increased by one step relative to the command value that is based on the available output power ($P_f$).

On the other hand, when the detection value belongs to the higher current range, in Step S31 the controller 20 calculates an available output power ($P_M$) based on the intermediate value. In Step S32, the voltage command value calculator 23 calculates a command value based on the available output power ($P_M$). In Step S33, the controller 20 increases, while detecting the output voltage to the load section 7, the command value in a stepwise manner so that the voltage or current of the circuit element will not exceed the limit value, thereby increasing the output power of the load section 7 to the available output power (Step 33).

As described above, in the present invention, the actual electric power that can be output to the load section 7 is recognized by the use of the detection value of the sensor, and the estimation error range of the coupling coefficient is divided into a range L from the lower limit value to the intermediate value and a range H from the intermediate value to the upper limit value. Then, the respective ranges are calculated so as to be a range in which the detection value of the sensor is compared to determine which range the detection value of the sensor belongs to. Then, a command value is generated in accordance with the determination result to control the inverter 63. Thus, even when the difference between an available output power based on the estimated coupling coefficient and an actual electric power that can be output to the load section 7 is large due to an error of the coupling coefficient (k), the command value can be corrected so as to reduce this difference, and therefore the rise time of the load power can be reduced.

Moreover, the present invention, when the actual output power to the load section 7 belongs to the range L, generates a command value based on the lowest available output power among the available output powers, which are calculated based on a plurality of coupling coefficients included in the error range of the coupling coefficient, to control the inverter 63. Thus, when the difference between the available output power based on the estimated coupling coefficient and the actual electric power that can be output to the load section 7 is small, the load power can be controlled while generating a command value so that the voltage or current of each circuit element will not exceed the limit value.

Moreover, according to the present invention, when the actual output power to the load section 7 belongs to the range H, a command value is generated based on an available output power corresponding to the intermediate value in the entire range of both the range L and the range H to control the inverter 63. Thus, when the difference between the available output power based on the estimated coupling coefficient and the actual electric power that can be output to the load section 7 is large, the rise time of the load power can be reduced while preventing the voltage or current of each circuit element from exceeding the limit value.

Figure 20:
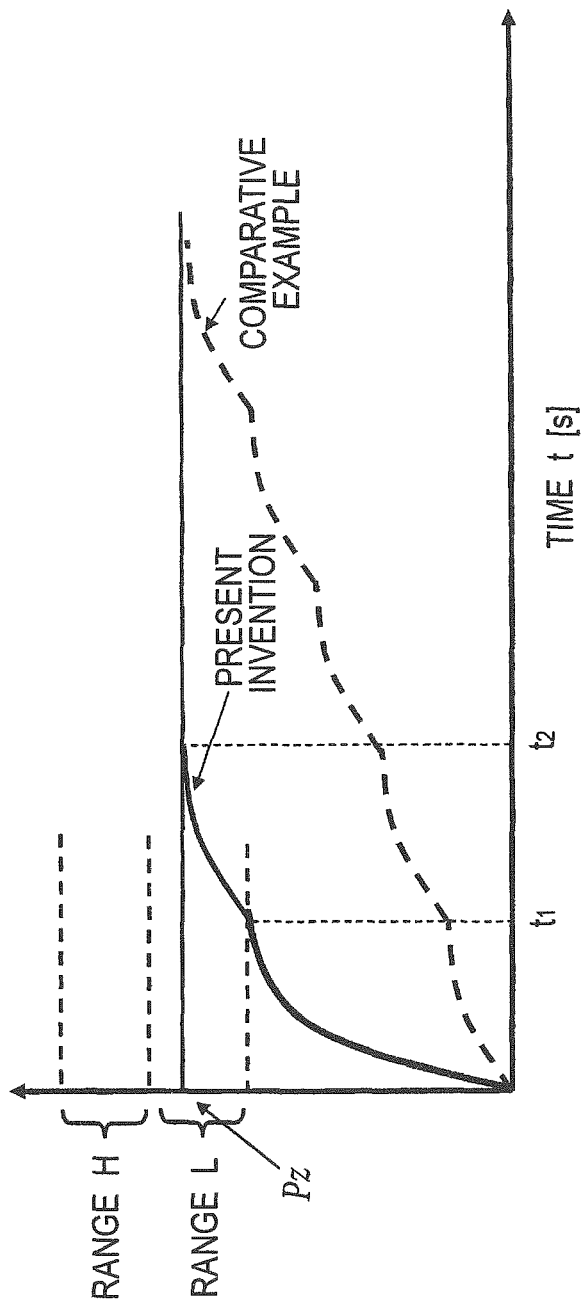
FIG. 20 illustrates a temporal characteristic of the output power in each of the non-contact power feeding apparatuses according to the embodiment and the comparative example.
Figure 21:
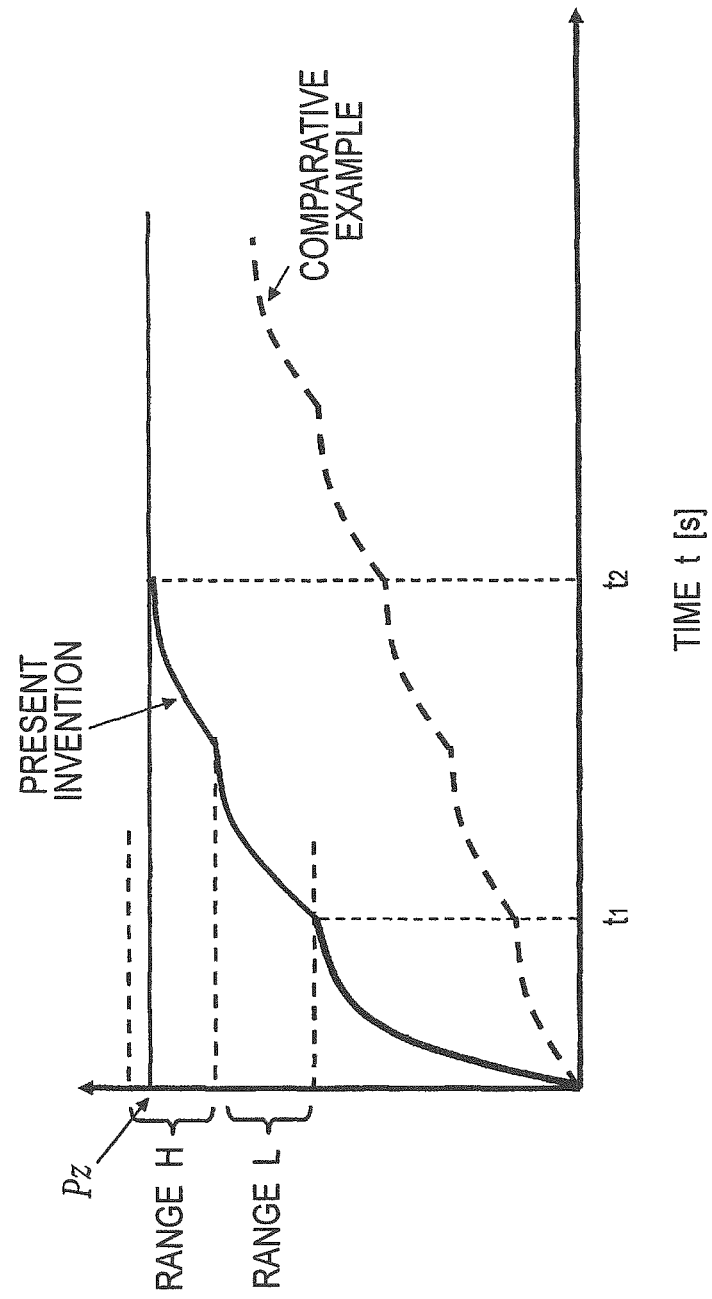
FIG. 21 illustrates a temporal characteristic of the output power in each of the non-contact power feeding apparatuses according to the embodiment and the comparative example.

FIG. 20 and FIG. 21 illustrate the temporal characteristics of the output power in the comparative example and in the present invention. FIG. 20 illustrates the power characteristics when the actual available output power to the load section 7 belongs to the range L, while FIG. 21 illustrates the power characteristics when the actual available output power to the load section 7 belongs to the range H. In FIG. 20 and FIG. 21, the lower limit power value in the range L represents the available output power calculated based on the lower limit value (kL) of the coupling coefficient, the upper limit power value in the range H represents the available output power calculated based on the upper limit value (kH) of the coupling coefficient, and the intermediate power value in the entire range of both the range L and the range H is the available output power calculated based on the coupling coefficient corresponding to the intermediate value in the error range of the coupling coefficient. Moreover, an electric power (Pz) represents the electric power that can be actually output to the load section 7.

As illustrated in FIG. 20, when the actual available output power to the load section 7 belongs to the range L, the rise time of the load power can be reduced as with the invention according to the second embodiment. Moreover, as illustrated in FIG. 21, when the actual available output power to the load section 7 belongs to the range H, the electric power increases with a gradient similar to the gradient in the range L until the time ($t_1$). Then, the range which the load power belongs to is identified at the time ($t_1$), and the command value is increased so as to be able to reduce the rise time of the load power until a time ($t_2$).

Note that, in this example, in order to determine which of the higher power range or the lower power range the actual electric power that can be output to the load section 7 belongs to, the inverter current is used, but the inverter voltage may be also used, or the voltage or current of a circuit element constituting the non-contact power feeding circuit section 10 may be also used as long as the value thereof varies with the coupling coefficient k.

Moreover, as the intermediate value ($I_{p\_M}$) in the inverter current range, the average value of the upper limit value ($I_{p\_H}$) and the lower limit value ($I_{p\_L}$) of the inverter current range may be also used.

The above-described range determiner 27 corresponds to a "determiner" of the present invention.

Fourth Embodiment

Figure 22:
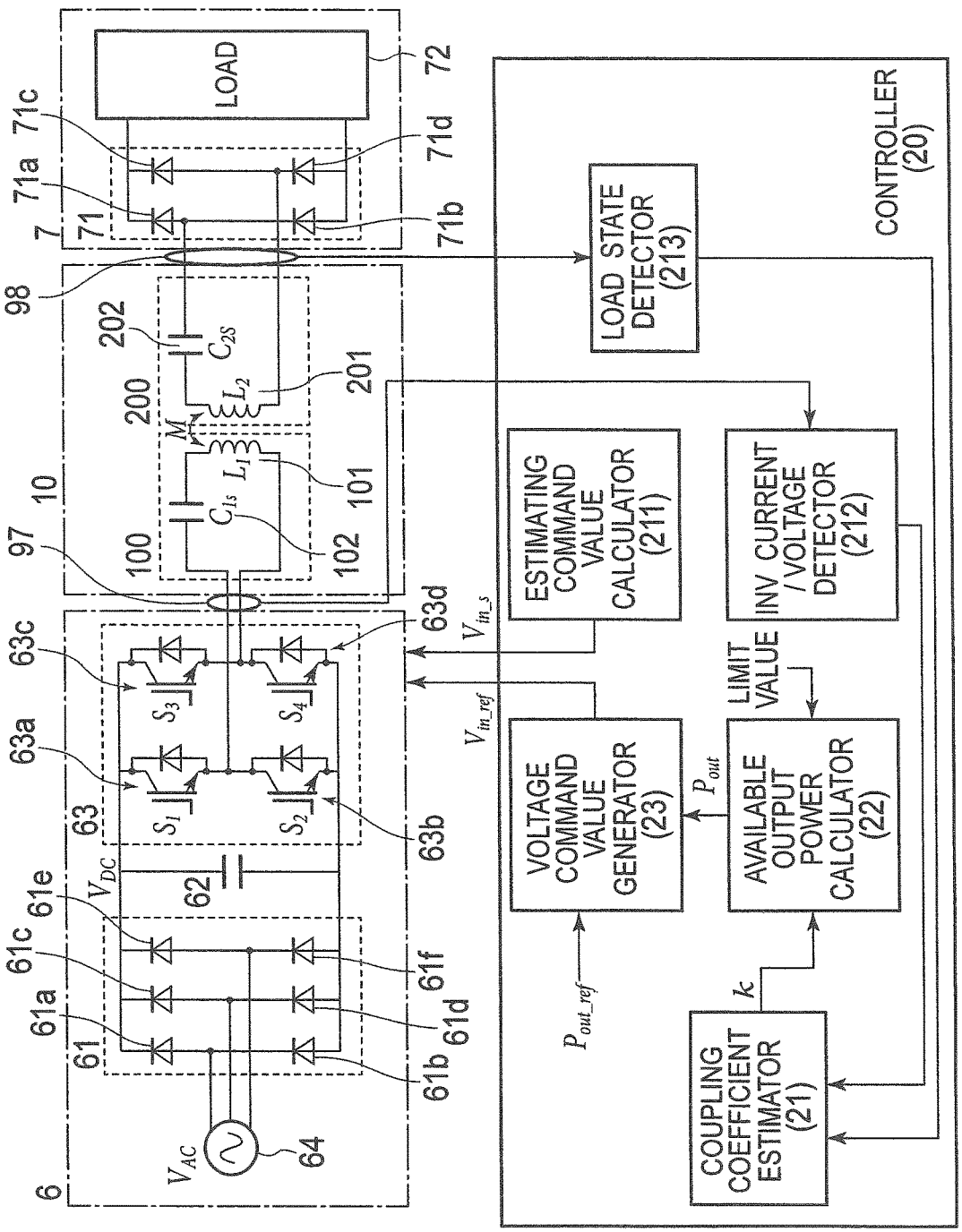
FIG. 22 is the block diagram of a non-contact power feeding apparatus according to yet another embodiment of the present invention.

FIG. 22 is the block diagram of a non-contact power feeding apparatus according to yet another embodiment of the present invention. This example differs from the above-described first embodiment in the estimation control of the coupling coefficient. Because the configuration other than this is the same as the above-described first embodiment, the description of the first to third embodiments is incorporated as required.

The controller 20 includes an estimating-command value calculator 211, an inverter current/voltage detector 212, and a load state detector 213. A sensor 97 for detecting the output voltage and output current of the inverter 63 is connected between the high frequency alternating-current power source section 6 and the non-contact power feeding section 10. A sensor 98 for detecting the state of the load section 7 is connected between the load section 7 and the output side of the non-contact power feeding section 10.

The coupling coefficient estimator 21 estimates, in the state where the drive frequency of the inverter 63 and the resonant frequency of the non-contact power feeding section 10 are matched, the coupling coefficient based on the input voltage and input current of the inverter 63 detected by the inverter current/voltage detector 212 and on the resistance of the load section 7.

Here, an input impedance ($Z_{in}$) of the non-contact power feeding section 10 seen from the high frequency alternating-current power source section 6 is described. From the circuit equation, the input impedance can be expressed by the drive frequency, output voltage, and output current of the inverter 63, the coil inductance and the capacitor capacitance in the non-contact power feeding section 10, the resistance of the load section 7, and the coupling coefficient k, as shown in Mathematical Formula (11) below.

[Mathematical Formula (11)]

$$Z_{in} = F(f, V_{in}, I_{in}, C, L, R, \kappa) \tag{11}$$

As shown in Mathematical Formula 11, if the drive frequency and the circuit parameters of the non-contact power feeding section 10 are already known, the coupling coefficient k can be estimated from the output voltage and output current of the inverter 63. Furthermore, under the condition that the resonant frequency of the non-contact power feeding section 10 matches the drive frequency of the inverter 63, the imaginary part of the input impedance can be neglected and the estimate equation of the coupling coefficient of Mathematical Formula (11) can be simplified.

Next, using FIG. 23, the circuit condition is described, where the resonant frequency of the resonant circuit on the power transmission side of the non-contact power feeding section 10, the resonant frequency of the resonant circuit on the power reception side of the non-contact power feeding section 10, and the drive frequency of the inverter 63 match with each other. FIG. 23 is a view for illustrating the relationship between the typical circuit configuration and resonance condition of the non-contact power feeding section 10.

As the resonant circuit of the non-contact power feeding section 10, four patterns of circuits (circuit patterns (a) to (d) of FIG. 23) can be contemplated as follows: a capacitor is connected in series to the primary winding (Lp) 101; a capacitor is connected in parallel with the primary winding (Lp) 101; a capacitor is connected in series to the secondary winding (Ls) 201; and a capacitor is connected in parallel with the secondary winding (Ls) 201. In these four patterns of circuits, the matching between the drive frequency of the inverter 63 and the resonant frequency is determined by the design conditions of the coil inductance and the capacitor capacitance. However, depending on a circuit, other conditions other than the inductance and the capacitance may be included in the design conditions.

Specifically, in the pattern illustrated in (a) as the design condition of the resonant frequency of the resonant circuit on the primary side, the coupling coefficient corresponds to the other condition, while as the design condition of the resonant frequency of the resonant circuit on the secondary side, the resistance of the load corresponds to the other condition. In the pattern illustrated in (b), as the design condition of the resonant frequency of the resonant circuit on the primary side, the coupling coefficient corresponds to the other condition. In the pattern illustrated in (c), as the design condition of the resonant frequency of the resonant circuit on the secondary side, the resistance of the load corresponds to the other condition. In the pattern illustrated in (d), there is no other condition.

That is, when the capacitor is connected in series to the coil, there is no other resonance condition other than the inductance and the capacitance. When the capacitor is connected in parallel with the coil on the secondary side, the resonance conditions on the secondary side include the resistance condition of the load in addition to the inductance and the capacitance. When the capacitor is connected in parallel with the coil on the primary side, the resonance conditions on the primary side include the condition of the coupling coefficient in addition to the inductance and the capacitance.

Hereinafter, in this example, the control is described for estimating the coupling coefficient in the circuit configuration of the pattern (d) in which there is no other resonance condition other than the inductance and the capacitance.

The relational expression between the output voltage and output current of the inverter 63 and the coupling coefficient (k) when the drive frequency of the inverter 63, the resonant frequency of the power transmission circuit section 100, and the resonant frequency of the power reception circuit section 200 are matched is expressed by Mathematical Formula (12).

[Mathematical Formula (12)]

$$\kappa = \frac{1}{\omega} \sqrt{\frac{RV_{in}}{L_1 L_2 I_{in}}} \tag{12}$$

The relational expression between the input voltage and input current of the inverter 63 and the coupling coefficient (k) when the drive frequency of the inverter 63 and the resonant frequency of the power reception circuit section 200 are matched is expressed by Mathematical Formula (13).

[Mathematical Formula (13)]

$$\kappa = \frac{1}{\omega} \sqrt{\frac{R}{L_1 L_2} \left\{ \left(\frac{V_{in}}{I_{in}}\right)^2 - \left(\frac{L_1 C_1 \omega^2 - 1}{C_1 \omega}\right)^2 \right\}^{\frac{1}{4}}} \tag{13}$$

As shown in Mathematical Formulas (12) and (13), when the resonant frequency and the drive frequency are matched, the coupling coefficient (k) can be estimated by detecting the input voltage and input current of the inverter 63. Moreover, when the resistance of the load section 7 varies with the state of the load, the coupling coefficient (k) can be estimated after detecting the resistance of the load as the information about the load.

Returning to FIG. 22, the control of the controller 20 is described. Because the control other than the estimation control of the coupling coefficient is the same as the content described in the first embodiment, the description thereof is omitted. Moreover, the resonant frequency (at least either one of the resonant frequency on the primary side or the resonant frequency on the secondary side) of the non-contact power feeding section 7 and the drive frequency of the inverter 63 are matched.

First, the controller 20 detects, upon activation of the non-contact power feeding system of this example, the resistance value of the load section 7 from a detection value of the sensor 98 by means of the load state detector 213, and transmits the same to the coupling coefficient estimator 21. The controller 20 transmits a command value ($V_{in\_s}$) for estimation for estimating the coupling coefficient to the inverter 63. The command value ($V_{in\_s}$) for estimation is not based on a requested power from the load section 7, but is a predetermined value. The command value ($V_{in\_s}$) for estimation may be a value sufficient for being able to detect at least the input current and input voltage of the inverter 63.

While the inverter 63 is being driven with the command value ($V_{in\_s}$) for estimation, the inverter current/voltage detector 212 detects the input voltage and input current of the inverter 63 from the detection value of the sensor 97. Moreover, the load state detector 213 detects the resistance value of the load section 7 from the detection value of the sensor 98. Then, the inverter current/voltage detector 212 transmits the input voltage and input current of the inverter 63 to the coupling coefficient estimator 21, and the load state detector 213 transmits the resistance value of the load section 7 to the coupling coefficient estimator 21.

From the relationship of the theoretical formulas expressed by Mathematical Formula (12) or Mathematical Formula (13) including the inductance of the primary winding 101, the inductance of the secondary winding 202, the input voltage and input current of the inverter 63, the resistance value of the load section 7, and the drive frequency (drive angular frequency) of the inverter 63, the coupling coefficient estimator 21 estimates the coupling coefficient (k) by using the detected input voltage and input current of the inverter 63 and the detected resistance value of the load section 7. Then, the coupling coefficient estimator 21 outputs the estimated coupling coefficient to the available output power calculator 22, and the controller 20 controls the inverter 63 based on this coupling coefficient.

Figure 24:
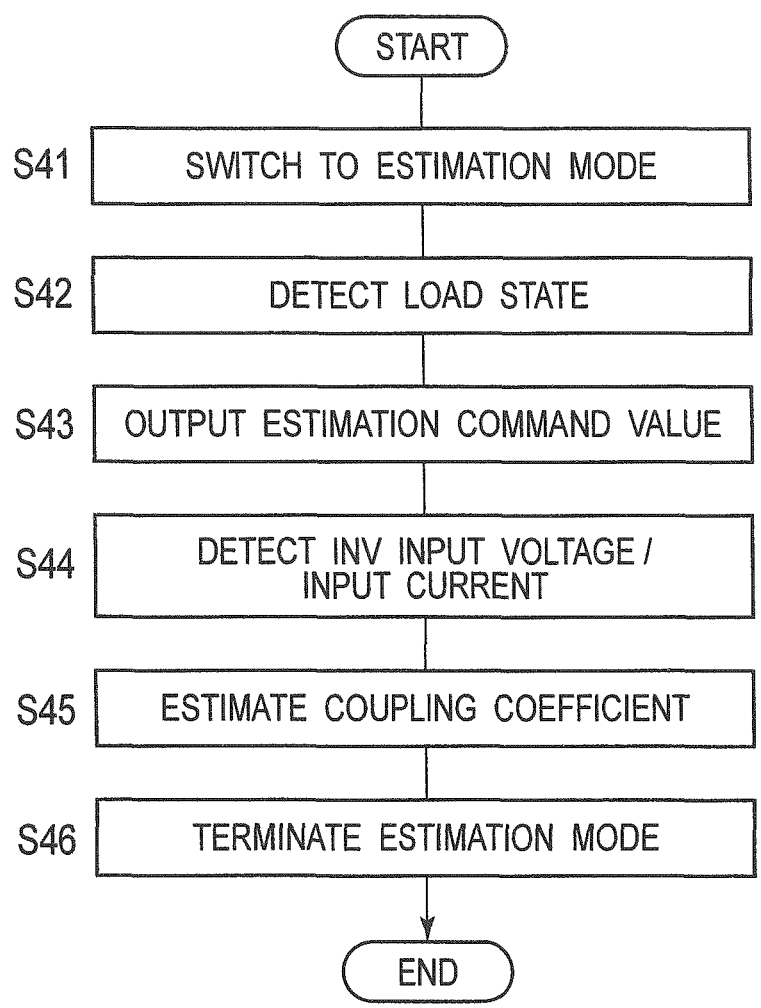
FIG. 24 is a flow chart illustrating the control procedure of a controller of FIG. 22.

Next, the control flow of the controller 20 of this example is described using FIG. 24. FIG. 24 is the flow chart illustrating the control procedure of the estimation mode for estimating the coupling coefficient among the controls of the controller 20 of this example.

In Step S41, the controller 20 switches the control mode to the estimation mode, and then in Step S42, the load state detector 21 detects the state of the load and detects the resistance of the load. In Step S43, the estimating-command value calculator 211 outputs a command value for estimation to the inverter 63. In Step S44, the inverter current/voltage detector 212 detects the input voltage and input current of the inverter 63. In Step S45, the coupling coefficient estimator 21 estimates the coupling coefficient based on the resistance of the load section 7 of Step S42 and the input voltage and input current of Step S44. Then, in Step S46, the controller 20 terminates the estimation mode.

As described above, the present invention, in the state where the drive frequency of the inverter 63 and the resonant frequency of the non-contact power feeding section 10 are matched, estimates the coupling coefficient from a relationship derived from the input impedance of the non-contact power feeding section 10 by using the input current and input voltage of the inverter 63 and the resistance value of the resistor section 7. Thus, in this example, the coupling coefficient can be estimated using the information on the power transmission side. Moreover, because the number of dimensions of the input impedance can be reduced, the number of parameters required for calculation can be reduced and the estimation accuracy can be improved.

Note that, in this example, not limited to the circuit in which the capacitors are connected in series to the primary winding 101 and the secondary winding 201, respectively, a circuit may be used, which does not have other condition other than the conditions of the inductance of the primary winding 101 and the secondary winding 201 and the capacitance of the capacitor as the condition for matching the drive frequency and the resonant frequency. Even with such a circuit, the coupling coefficient can be estimated in a manner similar to the above-described one.

The above-described inverter current/voltage detector 212 corresponds to a "detector" of the present invention.

Fifth Embodiment

Figure 25:
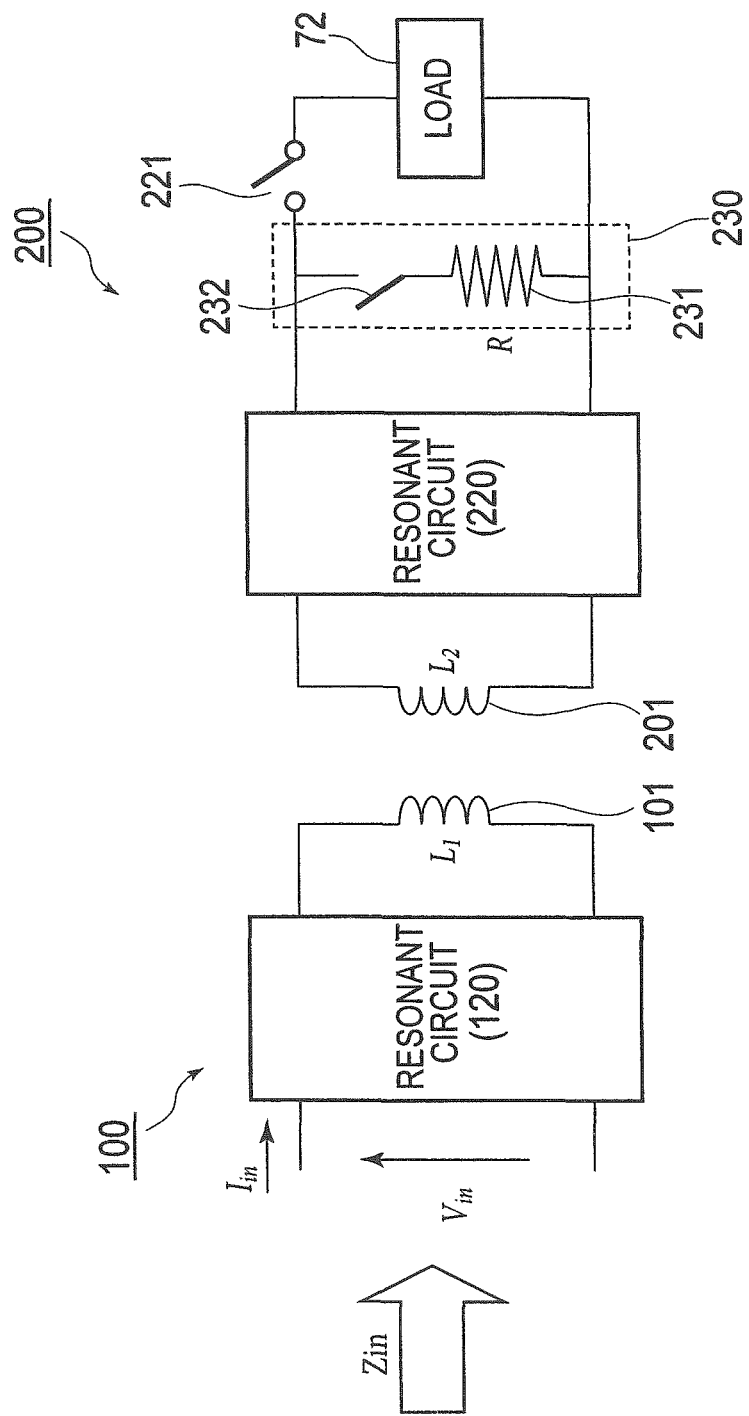
FIG. 25 is the circuit diagram of a non-contact power feeding section of a non-contact power feeding apparatus according to yet another embodiment of the present invention and a load.

FIG. 25 is the circuit diagram of a non-contact power feeding section of a non-contact power feeding apparatus according to yet another embodiment of the present invention and a load. This example differs from the above-described first embodiment in that a resistance for setting the resonant frequency is connected. Because the configuration other than this is the same as the above-described first embodiment, the description of the first to fourth embodiments is incorporated as required.

The power transmission circuit section 100 includes the primary winding 101 and a resonant circuit 120. The power reception circuit section 200 includes the secondary winding 201, a resonant circuit 220, and an adjustment circuit 230. The resonant circuit 120 is the resonant circuit on the power transmission side, while the resonant circuit 220 is the resonant circuit on the power reception side. The adjustment circuit 230 is the circuit section for matching the resonant frequency on the power reception side with the resonant frequency of the inverter 63, and includes a resistor (R) 231 and a switch 232 connected in series. The adjustment circuit 230 is connected between the resonant circuit 220 and the load 72. The resistor 231 is the resistor for matching the resonant frequency on the power reception side with the resonant frequency of the inverter 63. The switch 231 is the switch for switching ON and OFF between the resistor 231 and the secondary coil 201 as well as the resonant circuit 220. That is, when a switch 221 is turned on, the secondary winding 201 and the resonant circuit 220 as well as the resistor 231 are electrically conducted to each other.

The switch 221 is connected between the load 72 and the power reception circuit section 200, and is the switch for switching ON and OFF between the load 72 and the power reception circuit section 200. When the switch 221 is turned on, an electric power received at the power reception circuit section 200 can be supplied to the load 72, while when the switch 221 is turned off, the power reception circuit section 200 and the load 72 are electrically isolated from each other. Note that, in FIG. 25, $V_{in}$ and $I_{in}$ are the input voltage and input current to the non-contact power feeding section 10 from the inverter 63, respectively. Then, $Z_{in}$ is the input impedance seen from the input side of the non-contact power feeding section 10. Note that the illustration of the rectifier 71 is omitted.

As illustrated in FIG. 23 of the fourth embodiment, in the circuit configurations belonging to the patterns (a) and (c), the resistance of the load is included as the resonant conditions on the secondary side. Therefore, in this example, in order to satisfy this common condition, the resistor 231 is connected separately. The switch 232 is connected in order to avoid the power consumption in a resistor 231 while feeding an electric power to the load 72.

Moreover, in order to satisfy the pattern (a) or (c) of FIG. 23, the resonant circuit 220 includes the capacitor ($C_2$) connected in parallel to the secondary winding 201 and the resonant circuit 120 includes the capacitor ($C_1$) connected in series to or in parallel with the primary winding 101. A resistance value (R) of the resistor 231 is the value determined at the design stage, and is set to a resistance value for matching at least either one of the resonant frequency of the resonant circuit on the power transmission side or the resonant frequency of the resonant circuit on the power reception side with the drive frequency of the inverter 63.

In the case where the resonant circuit 120 on the power transmission side includes the series capacitor ($C_1$), when the resonant frequency on the power transmission side, the resonant frequency on the power reception side, and the drive frequency of the inverter 63 are matched, the relational expression between the output voltage and output current of the inverter 63 and the coupling coefficient (k) is expressed by Mathematical Formula (14).

[Mathematical Formula (14)]

$$\kappa = \sqrt{\frac{R\omega}{L_1 L_2 \omega^3 (C_2^2 R^2 \omega^2 + 1)} \frac{V_{in}}{I_{in}}} \quad (14)$$

Note that Mathematical Formula (14) is a Mathematical Formula derived from the input impedance (Zin) by the circuit equation as with Mathematical Formula (11).

In the case where the resonant circuit 120 on the power transmission side includes the series capacitor ($C_1$), when the resonant frequency only on the power reception side and the drive frequency of the inverter 63 are matched, the relational expression between the output voltage and output current of the inverter 63 and the coupling coefficient (k) is expressed by Mathematical Formula (15).

[Mathematical Formula (15)]

$$\kappa = \frac{\{C_1^2 R^2 \omega^2 V_{in}^2 - (C_1 L_1 \omega^2 - 1)^2 R^2 I_{in}^2\}^{\frac{1}{4}}}{\{L_1 L_2 C_1 \omega^3 (C_2^2 R^2 \omega^2 + 1) I_{in}\}^{\frac{1}{2}}} \quad (15)$$

In the case where the resonant circuit 120 on the power transmission side includes the parallel capacitor ($C_1$), when the resonant frequency only on the power reception side and the drive frequency of the inverter 63 are matched, the relational expression between the output voltage and output current of inverter 63 and the coupling coefficient (k) is expressed by Mathematical Formula (16).

[Mathematical Formula (16)]

$$\kappa = \frac{1}{\omega}\sqrt{\frac{RZ_r}{L_1 L_2 (C_2^2 R^2 \omega^2 + 1)}} \quad (16)$$

As shown in Mathematical Formulas (14) to (16), the coupling coefficient (k) can be estimated by using the resistor 231 and matching the resonant frequency of the resonant circuit of the non-contact power feeding section 10 with the drive frequency of the inverter 63.

Figure 26:
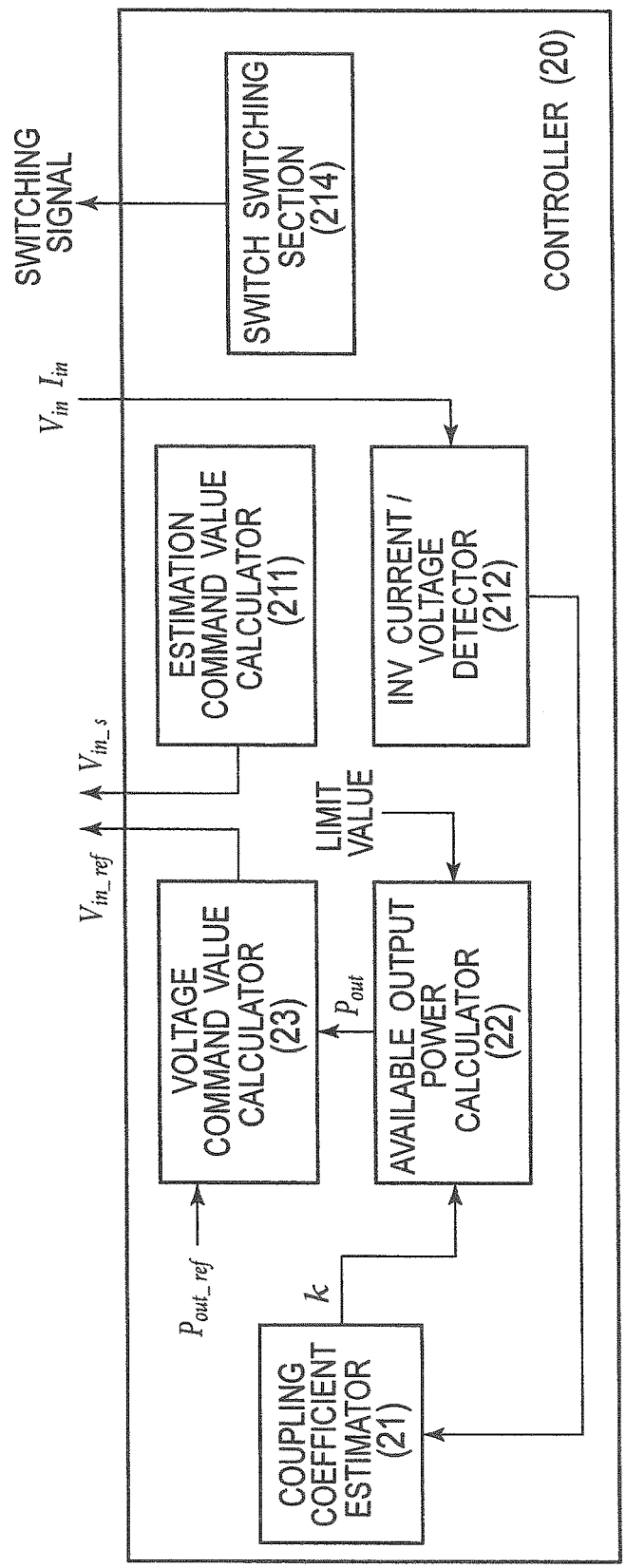
FIG. 26 is the block diagram of a controller of the non-contact power feeding apparatus having the circuit of FIG. 25.

Next, the control configuration of the controller 20 and the control content for estimating the coupling coefficient (k) are described using FIG. 26. FIG. 26 is the block diagram of the controller 20.

As illustrated in FIG. 26, the controller 20 includes the estimating-command value calculator 211, the inverter current/voltage detector 212, and a switch switching section 214. The switch switching section 214 is the controller to control the switches 221 and 232. In the estimation mode for estimating the coupling coefficient (k), the switch switching section 214 turns on the switch 232 and turns off the switch 221. On the other hand, in the power feeding mode for feeding an electric power to the load 72, the switch switching section 214 turns off the switch 232 and turns on the switch 221.

In the state where the switch 232 is turned on and the switch 221 is turned off by the switch switching section 214, the estimating-command value calculator 211 outputs an estimating command value ($V_{in\_s}$) to the inverter 63, thereby driving the inverter 63. The inverter current/voltage detector 212 detects the input voltage ($V_{in}$) and input current ($I_{in}$) to the non-contact power feeding section 10 from the inverter 63 that is being driven with the estimating-command value ($V_{in\_s}$).

From the relationship of the theoretical formulas expressed by Mathematical Formula (14), Mathematical Formula (15), or Mathematical Formula (16) including the inductance of the primary winding 101, the inductance of the secondary winding 202, the input voltage and input current of the inverter 63, the resistance value (R) of the resistor 231, and the drive frequency (drive angular frequency) of the inverter 63, the coupling coefficient estimator 21 estimates the coupling coefficient (k) by using the detected input voltage and input current of the inverter 63. Then, the coupling coefficient estimator 21 outputs the estimated coupling coefficient to the available output power calculator 22, and the controller 20 controls the inverter 63 based on this coupling coefficient.

Figure 27:
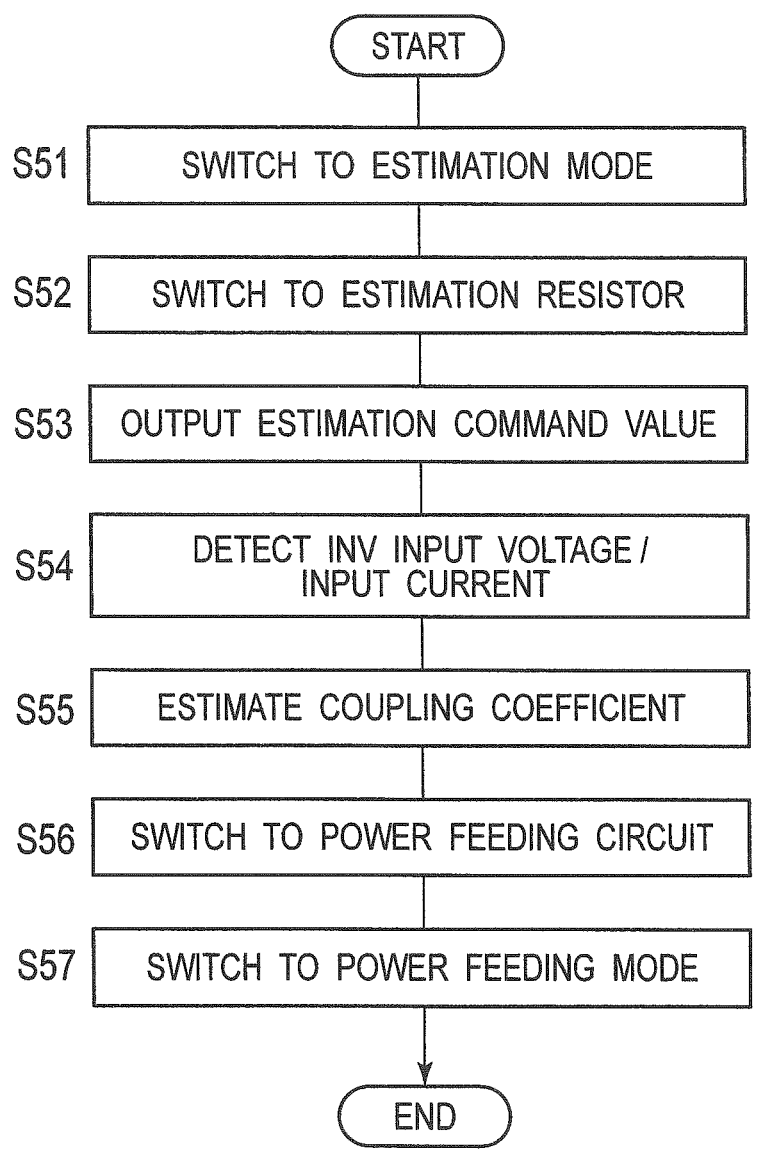
FIG. 27 is a flow chart illustrating the control procedure of the controller of FIG. 26.

Next, the control flow of the controller 20 of this example is illustrated using FIG. 27. FIG. 27 is the flow chart illustrating the control procedure of the controller 20 of this example.

In Step S51, the controller 20 switches the control mode to the estimation mode. In Step S52, the switch switching section 214 turns on the switch 232 to switch to the coupling-coefficient estimating resistor 231. In Step S53, the estimating-command value calculator 211 outputs a command value for estimation to the inverter 63. In Step S54, the inverter current/voltage detector 212 detects the input voltage and input current of the inverter 63. In Step S55, the coupling coefficient estimator 21 estimates the coupling coefficient based on the input voltage and input current of Step S54. In Step S56, the switch switching section 214 turns off the switch 232 and turns off the switch 221 to switch to the power feeding circuit. In Step S57, the controller 20 switches the control mode to the power feeding mode.

As described above, the non-contact power feeding apparatus of the present invention includes: the resistor 231 for matching the resonant frequency of the resonant circuit on the power reception side with the drive frequency of the inverter 63; and the switch 232 for switching to the resistor 231, wherein the switch 231 is turned on to estimate the coupling coefficient. Thus, even with the circuit in which the conditions for matching the drive frequency with the resonant frequency include the condition of the resistor, both the frequencies can be matched and the coupling coefficient can be estimated. Moreover, in this example, the coupling coefficient can be estimated using the information on the power transmission side. Moreover, because the number of dimensions of the input impedance can be reduced, the number of parameters required for calculation can be reduced and the estimation accuracy can be improved.

Note that, this example is not limited to the circuit having the capacitor connected in parallel to the secondary winding 201, but a circuit may be used, which has the condition of a resistor other than the conditions of the inductance of the primary winding 101 and the secondary winding 201 and the capacitance of the capacitor as the condition for matching the drive frequency and the resonant frequency. Even with such a circuit, the coupling coefficient can be estimated in a manner similar to the above-described one.

The above-described switch 232 corresponds to a "switch unit" of the present invention.

Sixth Embodiment

Figure 28:
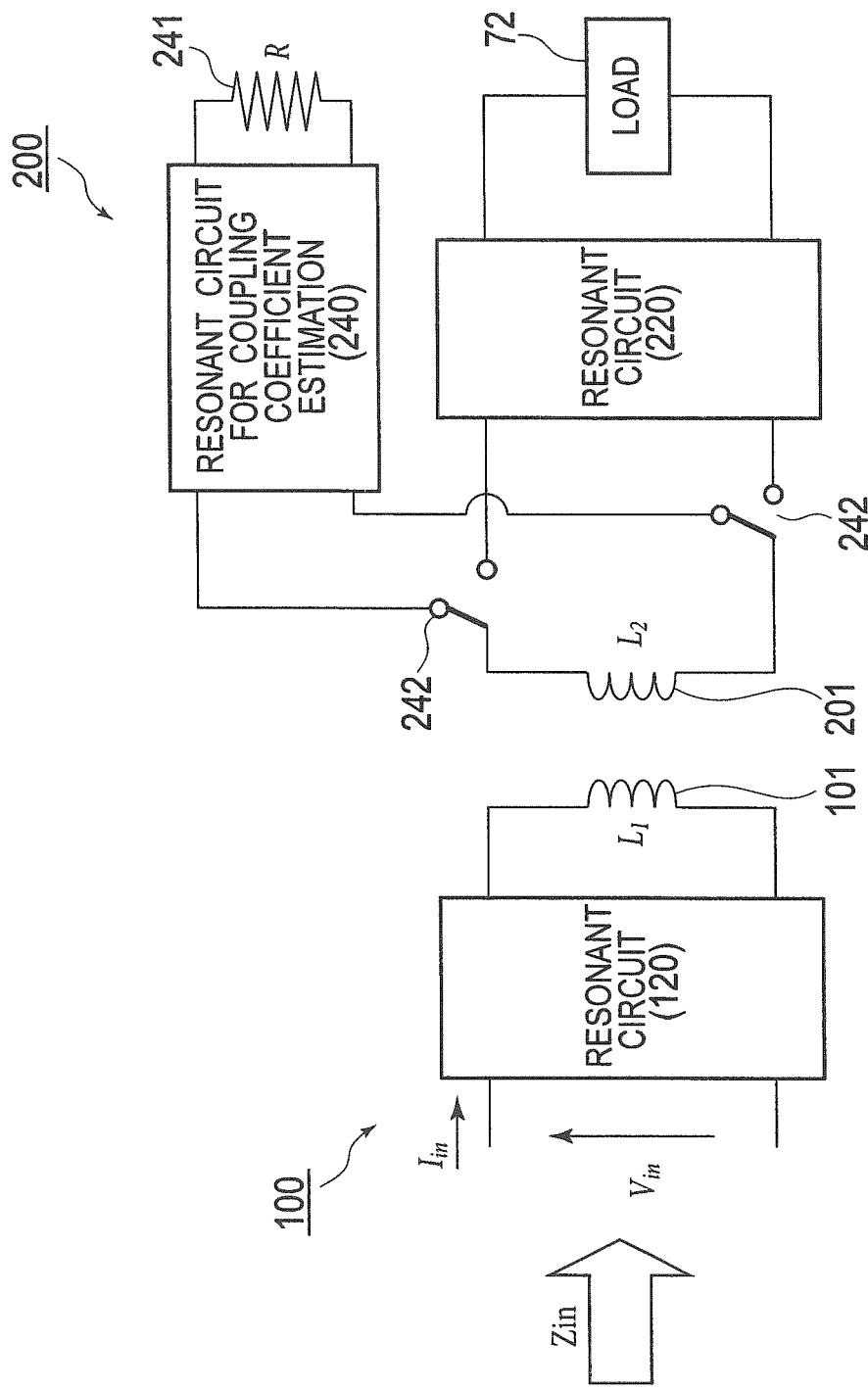
FIG. 28 is the circuit diagram of a non-contact power feeding section of a non-contact power feeding apparatus according to yet another embodiment of the present invention and a load.

FIG. 28 is the circuit diagram of a non-contact power feeding section of a non-contact power feeding apparatus according to yet another embodiment of the present invention and the load. This example differs from the above-described fifth embodiment in that a resonant circuit for estimating the coupling coefficient is included. Because the configuration other than this is the same as the above-described first embodiment, the description of the first to fifth embodiments is incorporated as required.

The power reception circuit section 200 includes the secondary winding 201, the resonant circuit 220, a coupling coefficient-estimating resonant circuit 240, a resistor 241, and a switch 242. The resonant circuit 220 may be any circuit as long as it is suitable for feeding an electric power to the load 72. The coupling coefficient-estimating resonant circuit 240 is the resonant circuit for estimating the coupling coefficient, and for example the circuit on the secondary side of the circuit illustrated in FIG. 23 is applied thereto. In this example, the circuit on the secondary side of the pattern (a) or the pattern (c) is applied.

The resistor 241 is the resistor for matching the resonant frequency of the secondary resonant circuit, which is formed in estimating the coupling coefficient, with the drive frequency of the inverter 63. Note that, when the circuit of the pattern (d) of FIG. 23, for example, is applied to the coupling coefficient-estimating resonant circuit 240, the frequency adjustment using the resistor 241 does not need to be made.

The switch 242 is the switch for switching between the circuit for estimation and the circuit for power feeding, and is connected between the secondary winding 201 and the coupling coefficient-estimating resonant circuit 240 and between the secondary winding 201 and the resonant circuit 220, respectively. The switch 242 is switched under control of the switch switching section 214 of the controller 20.

Next, the estimation control of the coupling coefficient (k) by the controller 20 is described. The control configuration is the same as the configuration illustrated in FIG. 26.

After switching the control mode to the estimation mode to estimate the coupling coefficient, the controller 20 switches the switch 242 by means of the switch section 214 so as to electrically conduct between the secondary winding 201 and the coupling coefficient-estimating resonant circuit 240. The estimating-command value calculator 211 outputs the estimating-command value ($V_{in\_s}$), and the inverter current/voltage detector 212 detects the input voltage ($V_{in}$) and input current ($I_{in}$) to the non-contact power feeding section 10 from the inverter 63. The coupling coefficient estimator 21 estimates the coupling coefficient based on the input voltage ($V_{in}$) and the input current ($I_{in}$). Then, the controller 20 switches the switch 242 by means of the switch switching section 214 so as to electrically conduct between the secondary winding 201 and the load 72, and switches the control mode to the power feeding mode.

As described above, the non-contact power feeding apparatus of the present invention includes: the coupling coefficient-estimating resonant circuit 240 for matching the resonant frequency of the power reception circuit section 200 with the drive frequency of the inverter 63; and the switch 242, wherein the switch 242 is turned on to estimate the coupling coefficient. Thus, even with a circuit whose resonant frequency does not match the drive frequency (e.g., a circuit having two resonance points and making the impedance characteristic broader, or a circuit that does not actively utilize resonance), the drive frequency and the resonant frequency can be matched using the coupling coefficient-estimating resonant circuit 240 and the coupling coefficient can be estimated. Moreover, in this example, the coupling coefficient can be estimated using the information on the power transmission side. Moreover, because the number of dimensions of the input impedance can be reduced, the number of parameters required for calculation can be reduced and the estimation accuracy can be improved.

The above-described coupling coefficient-estimating resonant circuit 240 corresponds to a "resonant circuit" of the present invention and the above-described switch 242 corresponds to the "switch unit" of the present invention.

Seventh Embodiment

Figure 29:
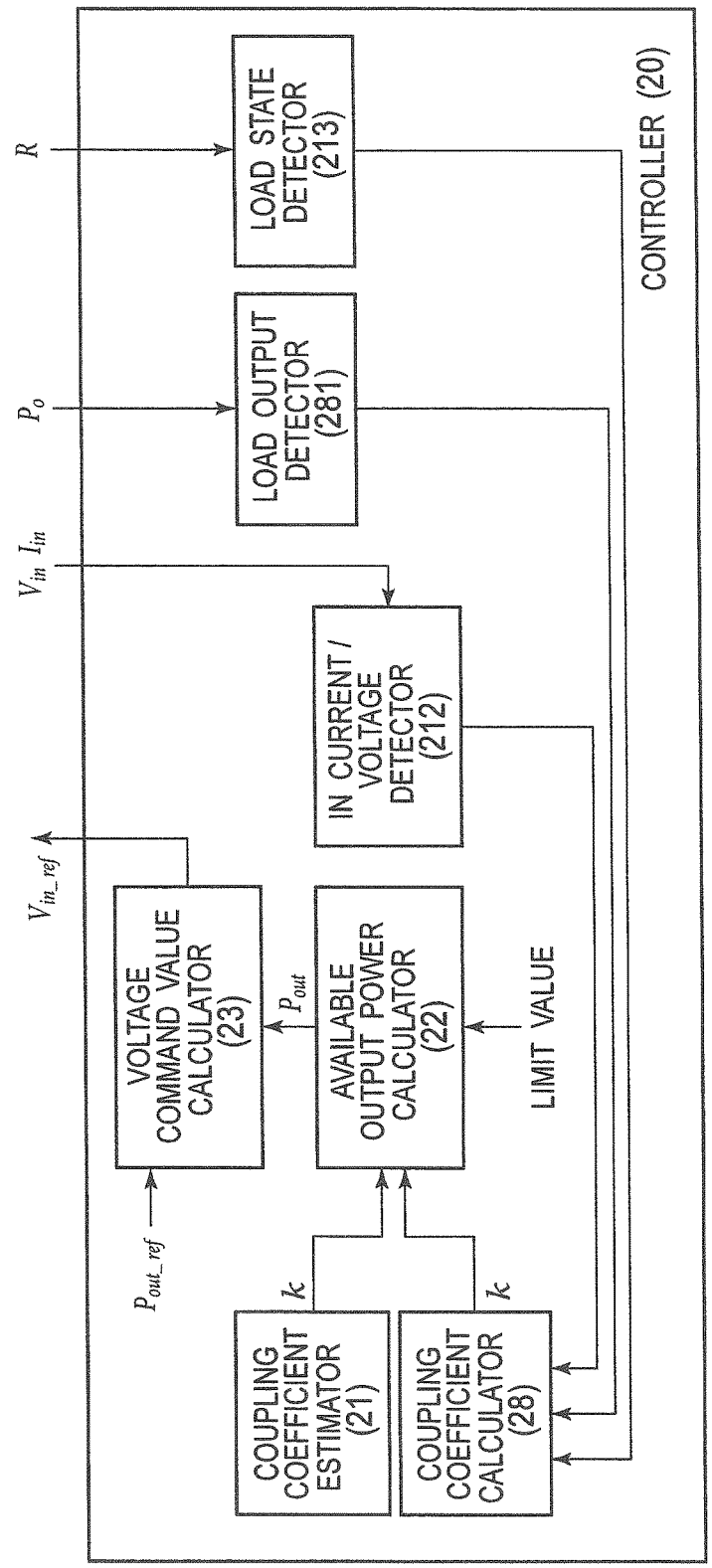
FIG. 29 is the block diagram of a controller of the non-contact power feeding apparatus having the circuit of FIG. 28.

FIG. 29 is the block diagram of a controller of a non-contact power feeding apparatus according to yet another embodiment of the present invention. This example differs from the above-described fourth embodiment in that a load output detector 281 and a coupling coefficient calculator 28 are provided in order to calculate the coupling coefficient (k) using the information on the power reception side. Because the configuration other than this is the same as the above-described fourth embodiment, the description of the first to sixth embodiments is incorporated as required.

As illustrated in FIG. 29, the controller 20 includes the load output detector 281. The load output detector 281 detects an electric power ($P_o$) output to the load section 72 from the power reception circuit section 200. A load power detector 215 detects the output power ($P_o$) from the detection value of the sensor 98. The coupling coefficient calculator 28 calculates the coupling coefficient based on the resistance of the load section 7 detected by the load state detector 213, the output power ($P_o$) detected by the load output detector 281, and the input voltage and current ($V_{in}$, $I_{in}$) of the inverter 63.

Here, the relationship between the output power ($P_o$) and the coupling coefficient is described. The coupling coefficient (k) derived from Mathematical Formula (10) of the first embodiment is expressed by Mathematical Formula (17) below.

[Mathematical Formula (17)]

$$\kappa = \frac{|V_{in}|}{\omega} \sqrt{\frac{R}{L_1 L_2 |P_o|}} \quad (17)$$

That is, as shown in Mathematical Formula (17), a certain relational expression is established between the coupling coefficient (k) and the output power ($P_o$) to the load section 7.

In the first to sixth embodiments, because the coupling coefficient estimated by the coupling coefficient estimator 21 is estimated without using the information on the power reception side, there is no need to communicate with the power reception side and thus the calculation speed can be increased. On the other hand, the coupling coefficient might contain an estimation error because the amount of information used in estimating the coupling coefficient is small. Therefore, in this example, after the coupling coefficient is estimated under the estimation control of the coupling coefficient according to the first to sixth embodiments and a command value is generated and the inverter 63 is driven (after the time ($t_1$) of FIG. 14), the output power to the load section 7 is detected and the coupling coefficient is calculated.

Hereinafter, the control of the controller 20 of this example is described. Note that, the following control is the same as the control according to the first embodiment and thus the description thereof is omitted: before driving the inverter 63, the coupling coefficient is estimated; the available output power is calculated based on the estimated coupling coefficient and the limit value of the circuit element of the non-contact power feeding section 10; and the command value is calculated.

After calculating the command value, the controller 20 drives the inverter 63 with the relevant command value. Then, during driving of the inverter 63, the controller 20 detects the input voltage and current ($V_{in}$, $I_{in}$) of the inverter 63 by means of the inverter current/voltage detector 212, detects the resistance of the load section 7 with the load state detector 213, and detects the output power ($P_o$) with the load output detector 281. Then, the controller 20 outputs the respective detection values to the coupling coefficient calculator 28.

The coupling coefficient calculator 28 calculates, from the relational expression expressed by the theoretical formula of Mathematical Formula (17), the coupling coefficient (k) using the detection value of each of the inverter current/voltage detector 212, the load state detector 213, and the load output detector 281, and outputs the same to the available output power calculator 22.

From the coupling coefficient calculated by the coupling coefficient calculator 28, the available output power calculator 22 calculates an available output power that can be output to the load section 7 while suppressing the voltage or current of the circuit element of the non-contact power feeding section 10 to the limit value or less. The voltage command value calculator 23 generates a command value based on this available output power and outputs the same to the inverter 63, thereby driving the inverter 63. When the electric power detected by the load output detector 281 is lower than the available output power calculated by the available output power calculator 22, the voltage command value calculator 23 updates the command value so that the output power to the load section 7 increases.

Figure 30:
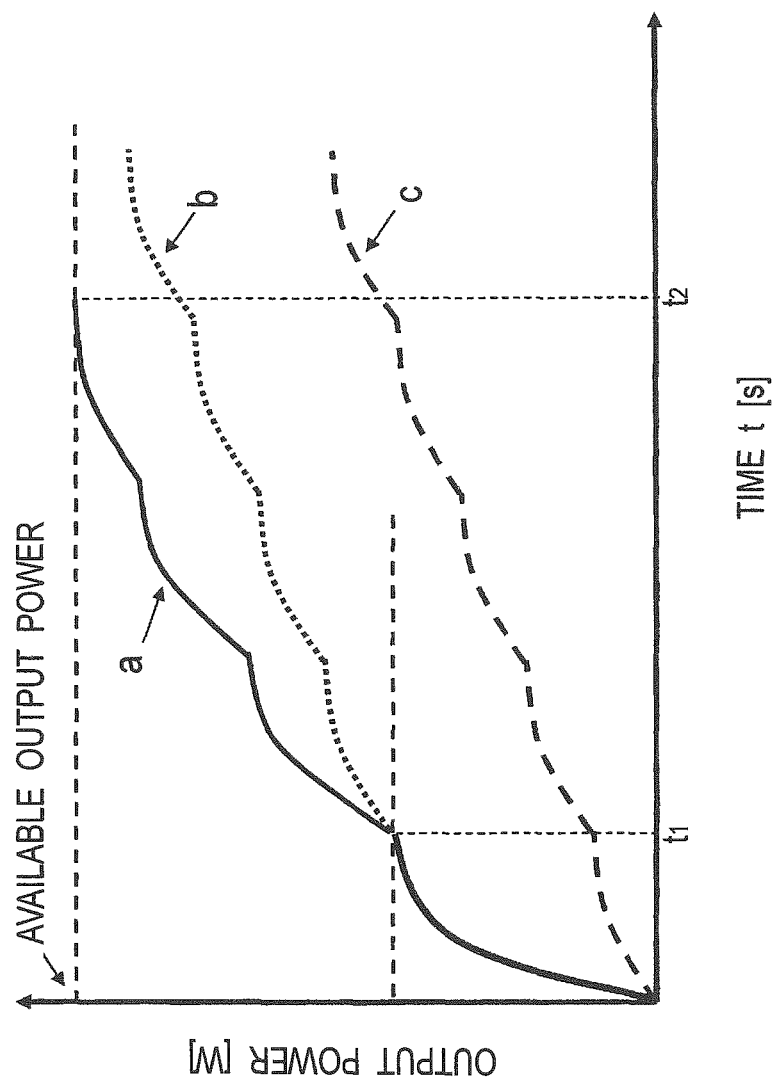
FIG. 30 illustrates a temporal characteristic of the output power in each of the non-contact power feeding apparatuses according to the embodiment and the comparative example.

FIG. 30 illustrates the temporal characteristic of the output power of each of the invention according to this embodiment (hereinafter, referred to as the seventh invention), the invention according to the second embodiment (hereinafter, referred to as the second invention), and the comparative example. In FIG. 30, the graph "a" represents the characteristic of the seventh invention, the graph "b" represents the characteristic of the second invention, and the graph "c" represents the characteristic of the comparative example. Until the time ($t_1$), the inverter is controlled with the command value based on the estimated coupling coefficient. In the seventh invention, after the time ($t_1$), the inverter is controlled with the command value based on the calculated coupling coefficient. Then, the time ($t_2$) represents the time point when the output power to the load section 7 reaches the actual available output power (when the voltage or current of a circuit element reaches a limit value or when the output power reaches the requested power).

The coupling coefficient calculated by the coupling coefficient calculator 28 is the value that is calculated using the information on the power reception side and therefore the calculation accuracy thereof is higher than the coupling coefficient estimated by the coupling coefficient estimator 21. Then, after the time ($t_1$), the output power is calculated based on the coupling coefficient of high calculation accuracy and then a command value is generated. Therefore, in the seventh invention, an increase width of the command value can be increased as compared with the conventional control for increasing the command value in a stepwise manner (the control of the comparative example and the control of the second invention after the time ($t_1$)). Therefore, in the seventh invention, until the time ($t_1$), the electric power can be raised higher than the comparative example, and furthermore, after the time ($t_1$), the electric power can be raised quicker than the second invention.

As described above, in this example, the available output power to the load section 7 is calculated based on the coupling coefficient estimated by the coupling coefficient estimator 21, the command value is generated from this available output power, thereby controlling the inverter 63. Then, during driving of the inverter, the electric power supplied to the load section 7 is detected and the coupling coefficient is calculated based on the detected supply power. Then, the available output power is calculated based on the calculated coupling coefficient, and a command value is generated from this available output power, thereby controlling the inverter 63. That is, in this example, the inverter 63 is controlled with the command value generated based on the estimation coupling coefficient, and then the inverter 63 is controlled with the command value generated based on the calculation coupling coefficient. Thus, a more precise available-output power can be calculated, and therefore the rise time of the load power can be reduced.

Moreover, as illustrated in FIG. 30, after the time ($t_1$), in the second invention, the command value is increased at a predetermined cycle using only the information on the power transmission side, while in the seventh invention, the command value is increased at a predetermined cycle using also the information on the power reception side. Therefore, after the time ($t_1$), the amount of change in the command value (the amount of change in the command value per cycle) according to the seventh invention can be set larger than the amount of change in the command value according to the second invention.

Note that, the circuit configuration of the non-contact power feeding section 10 of this example is not limited to the configuration in which capacitors are connected in series to the primary winding 101 and to the secondary winding 201, respectively, but other circuit configuration may be employed. Moreover, in this example, the electric power to the load section 7 is detected and the coupling coefficient is calculated, but the output voltage and output current to the load section 7 and the voltage or current applied to a circuit element of the power reception circuit section 200 may be detected, and based on the detection values the coupling coefficient may be calculated using the relationship expressed by the theoretical formulas of Mathematical Formula (6) to Mathematical Formula (9). Moreover, in order to increase the calculation accuracy of the coupling coefficient, another method, such as a method for measuring multiple times and taking the average value thereof, may be used.

The above-described load power detector 281 corresponds to a "first detector" of the present invention, and the coupling coefficient calculator 28 corresponds to a "coupling state calculator" of the present invention.

Eighth Embodiment

Figure 31:
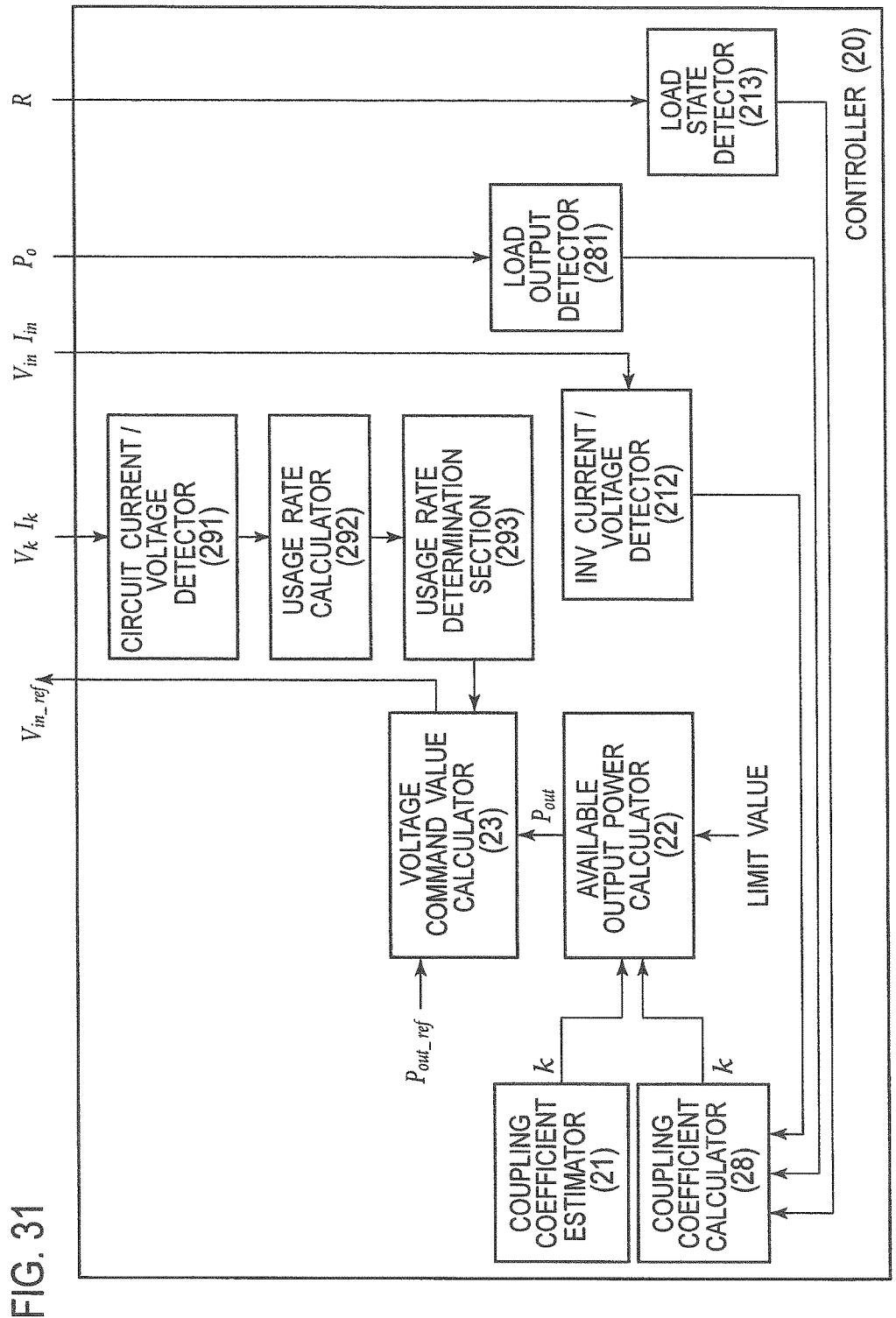
FIG. 31 is the block diagram of a controller of a non-contact power feeding apparatus according to yet another embodiment of the present invention.

FIG. 31 is the block diagram of a controller of a non-contact power feeding apparatus according to yet another embodiment of the present invention. This example differs from the above-described seventh embodiment in that a circuit current/voltage detector 291, a usage rate calculator 292, and a usage rate determination section 293 are provided. Because the configuration other than this is the same as the above-described seventh embodiment, the description of the first to seventh embodiments is incorporated as required.

The controller 20 includes the circuit current/voltage detector 291, the usage rate calculator 292, and the usage rate determination section 293. The circuit current/voltage detector 291 is the controller configured to detect a current ($I_k$) and voltage ($V_k$) applied to a circuit element of the non-contact power feeding section 10. The current and voltage applied to each circuit element may be detected by means of a sensor that may be provided in the primary winding 101, the capacitor 102, or the like. Alternatively, the current and voltage applied to each circuit element may be detected by calculation from the detection value of a sensor provided in a circuit on the power transmission side or from the detection value of a sensor provided on the power reception side. For example, in the circuit illustrated in FIG. 22, if the input voltage and input current to the power transmission circuit section 100 is detected by calculation from the detection value of the sensor 97, the voltage or current applied to each of the primary winding 101 and the capacitor 102 can be detected by calculation because the inductance of the primary winding 101 and the capacitance of the capacitor 102 are the known information.

The usage rate calculator 292 calculates the usage rate based on the current ($I_k$) and voltage ($V_k$) detected by the circuit current/voltage detector 291. The usage rate is expressed by Mathematical Formula (18) below.

[Mathematical Formula (18)]

$$\text{usage rate [\%]} = 100 - \{(\text{limit value}) - (\text{detection value})\}/(\text{limit value}) \quad (18)$$

That is, the usage rate indicates the ratio of the applied voltage or applied current relative to the limit value of each circuit element. Then, when the usage rate becomes 100%, the current or voltage reaches the limit value. Note that, the limit value is expressed by the withstand voltage, the limit current capacity, or the like depending on a circuit element, but the limit value may be translated into a limiting current value or the like so as to be a comparison target for the detection value, as required.

The usage rate calculator 292 calculates the usage rate for each circuit element constituting the non-contact power feeding section 10, and transmits the same to the usage rate determination section 293. The usage rate determination section 293 compares the calculated usage rate with a predetermined limit usage rate, determines whether or not any one of the respective usage rates of the circuit elements exceeds the limit usage rate, and transmits the determination result to the voltage command value calculator 23. The limit usage rate is a value, which is set in advance, for protecting a circuit element or for maintaining the power-feeding performance of the non-contact power feeding apparatus of this example.

The voltage command value calculator 23 generates a command value from the available output power based on the coupling coefficient calculated by the coupling coefficient calculator 28. When all the usage rates of the circuit elements are lower than the limit usage rates, the voltage command value calculator 23 updates the command value, which is generated by the available output power calculator 22, so as to raise the output to the load section 7, and outputs the updated command value to the inverter 63.

When all the usage rates of the circuit elements are lower than the limit usage rates, the calculation of the coupling coefficient by the coupling coefficient calculator 28, the calculation of the available output power by the available output power calculator 22, and the generation of the command value by the voltage command value calculator 23 are performed periodically and the voltage command value calculator 23 continues to update the command value. Therefore, the output power to the load section 7 will rise.

On the other hand, when any one of the respective usage rates of the circuit elements exceeds a limit usage rate, the voltage command value calculator 23 controls the inverter 63 while maintaining the command value without updating the command value. Thus, the output power to the load section 7 is maintained.

As a specific example, the above-described control is described using FIG. 32. FIG. 32 is a table illustrating the relationship between the applied voltage and current to the primary winding 101, and the applied voltage and current to the capacitor 102, and a limit value, a detection value, and a usage rate. Where the limit usage rate is assumed to be 80%. Note that, the limit usage rate can be arbitrarily set, and may be set to a range from 80 to 90%, for example.

In the example of FIG. 32, all of the usage rate based on the voltage applied to the coil (primary winding 101), the usage rate based on the voltage applied to the capacitor 102, and the usage rates based on the current of the capacitor 102 are lower than the limit usage rate. However, the usage rate based on the current of the coil is 83% and exceeds the limit usage rate. Therefore, the voltage command value calculator 23 terminates the updating of the command value. Thus, the output power to the load section 7 is maintained. Moreover, because the usage rate of the coil is maintained at a higher level, the power feeding efficiency can be also maintained at a higher level.

Figure 33:
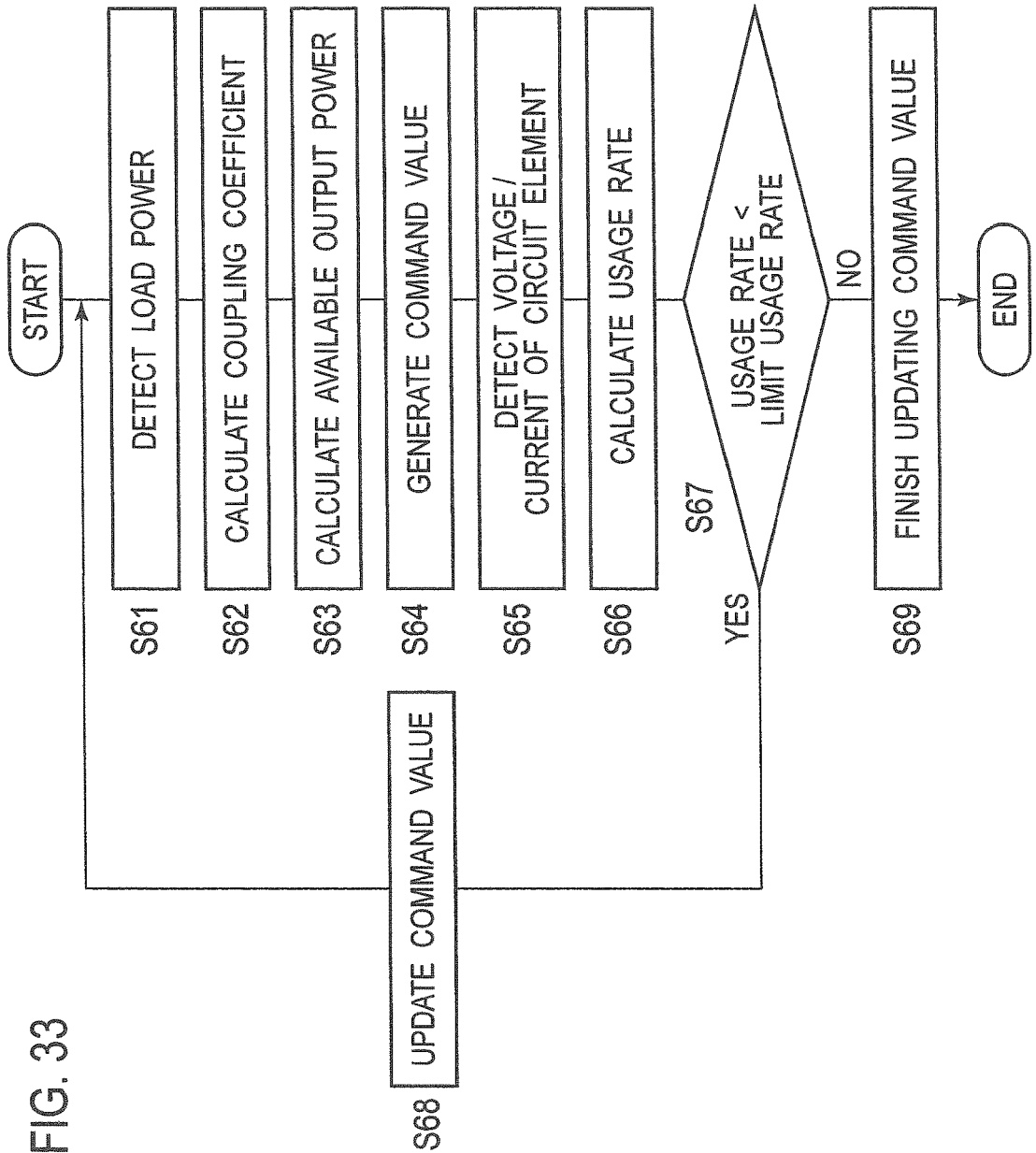
FIG. 33 is a flow chart illustrating the control procedure of the controller of FIG. 31.

Next, the control flow of the controller 20 of this example is described using FIG. 33. Note that, because the estimation control of the coupling coefficient and the control of the inverter 63 based on the estimation coupling coefficient are the same as those of the first embodiment, the description thereof is omitted. FIG. 33 is the flow chart illustrating the control procedure of the controller 20 of this example.

In Step S61, during driving of the inverter 63 the load power detector 281 detects the load power. In Step S62, the coupling coefficient calculator 28 calculates a coupling coefficient. In Step S63, the available output power calculator 22 calculates the available output power based on the calculated coupling coefficient. In Step S64, the voltage command value calculator 23 generates a command value. In Step S65, the circuit current/voltage detector 291 detects the voltage or current of each circuit element. In Step S66, the usage rate calculator 292 calculates the usage rates of the respective circuit elements.

In Step S67, the usage rate determination section 293 determines whether or not any one of the usage rates of the respective circuit elements exceeds the limit usage rate. When the usage rates of all the circuit elements are lower than the limit usage rate, the flow returns to Step S68. In Step S68, the voltage command value calculator 23 updates the command value, outputs the updated command value to the inverter 63, and the flow returns to Step S61.

On the other hand, when any one of the usage rates of the respective circuit elements becomes equal to or greater than the limit usage rate, in Step S69, the voltage command value calculator 23 terminates the updating of the command value.

Figure 34:
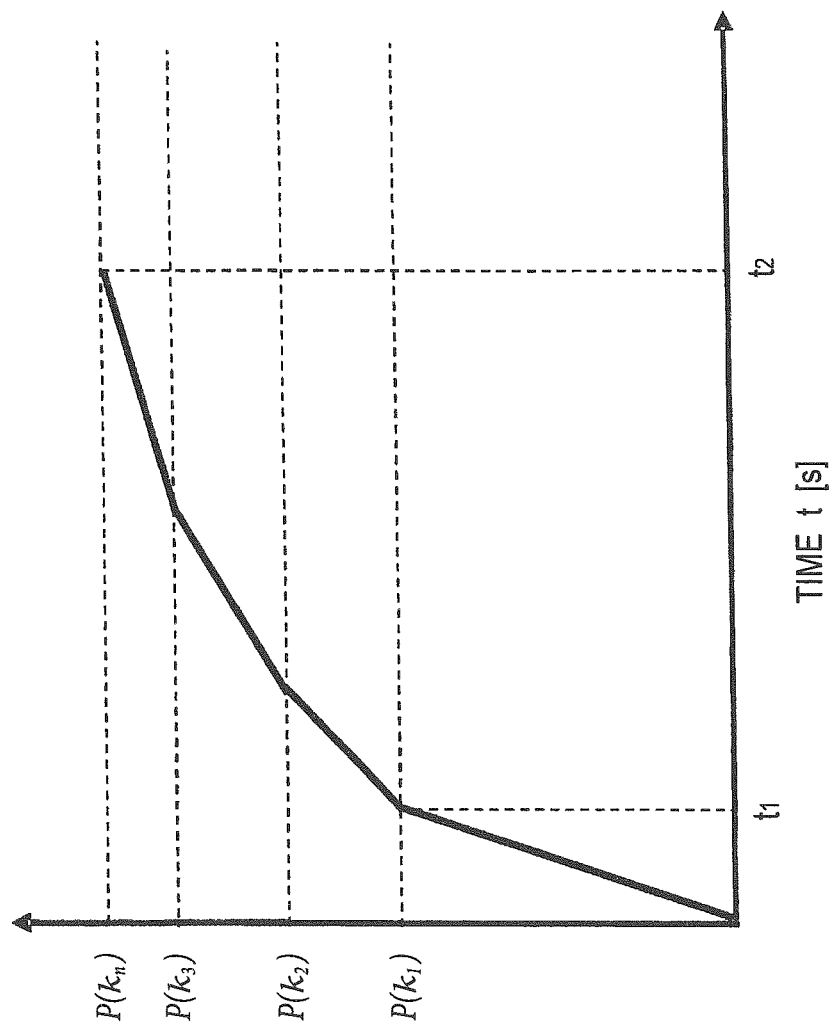
FIG. 34 illustrates a temporal characteristic of the output power in the non-contact power feeding apparatus according to the embodiment.

FIG. 34 illustrates the temporal characteristic of the output power to the load section 72. Until the time ($t_1$), the inverter is controlled with the command value based on the estimated coupling coefficient. After the time ($t_1$), the inverter is controlled with a command value based on the calculated coupling coefficient. The time ($t_2$) represents a time point when any one of the usage rates of the respective circuit elements exceeds a limit usage rate. Moreover, an under-suffix "n" in $K_n$ represents the number of updates of the command value. As illustrated in FIG. 34, the command value rises in a stepwise manner after the time ($t_1$).

As described above, in the present invention, the command value of the inverter 63 is controlled depending on the usage rate of each circuit element of the non-contact power feeding section 10. Thus, the circuit element can be reliably protected while reducing the power feeding time for the system to reach a steady state, thereby enabling a stable power control.

Moreover, in a variant of the present invention, a second limit usage rate is stored as a predetermined limit usage rate in the usage rate determination section 293, and the controller 20 controls the inverter 63 by using the usage rate calculated by the usage rate calculator 292 and the second limit usage rate. As described above, when the limit usage rate set for protection or the like of the circuit element is referred to as a first limit usage rate, the second limit usage rate is a usage rate that is higher than the first limit usage rate taking into consideration an error of the first limit usage rate due to a measurement error of the circuit current/voltage detector 291, a variation of a sensor, the temperature range of the above-described circuit element, or degradation of the above-described circuit element.

The usage rate determination section 293 compares the usage rate calculated by the usage rate calculator 292 with the second limit usage rate to determine whether or not the usage rate becomes equal to or greater than the second limit usage rate, and transmits the determination result to the voltage command value calculator 23.

When the usage rate is less than the second limit usage rate, the usage rate calculator 292 continues to calculate the usage rate and the usage rate determination section 293 continues to compare the usage rate with the second limit usage rate. Moreover, the voltage command value calculator 23 updates the command value, which is generated by the available output power calculator 22, so as to raise the output to the load section 7, and outputs the updated command value to the inverter 63.

On the other hand, when the usage rate becomes equal to or greater than the second limit usage rate, the usage rate calculator 292 finishes calculating the usage rate and the usage rate determination section 293 finishes comparing the usage rate with the second limit usage rate. The voltage command value calculator 23 outputs the command value to the inverter 63 while keeping the command value prior to be updated without updating the command value that is generated by the available output power calculator 22. Thus, the inverter 63 is controlled with a command value that is immediately before the usage rate becomes equal to or greater than the second limit usage rate.

The above-described circuit current/voltage detector 212 corresponds to a "second detector" of the present invention, and the usage rate calculator 292 corresponds to a "usage rate calculator" of the present invention.

Ninth Embodiment

Figure 35:
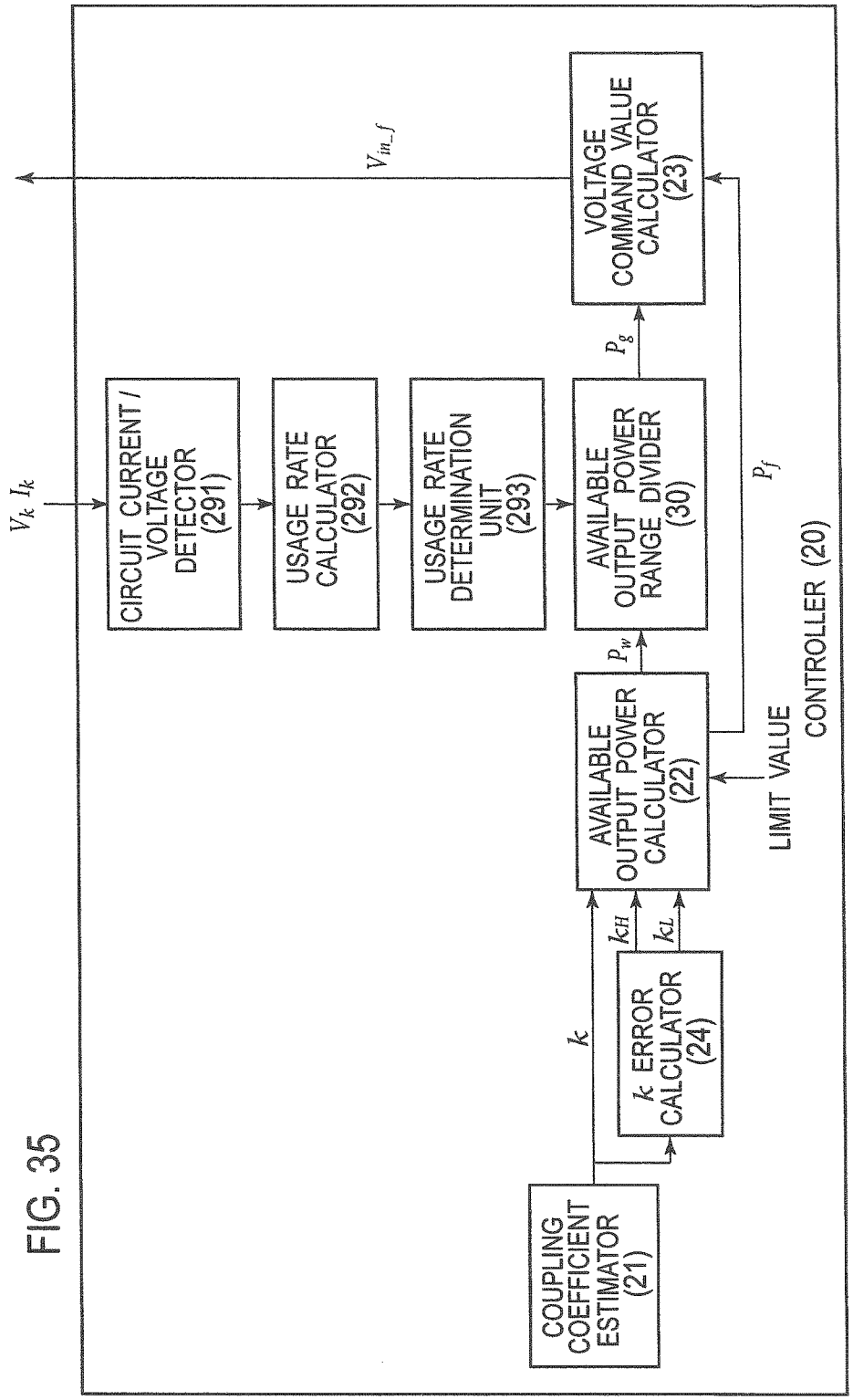
FIG. 35 is the block diagram of a controller of a non-contact power feeding apparatus according to yet another embodiment of the present invention.

FIG. 35 is the block diagram of a controller of a non-contact power feeding apparatus according to yet another embodiment of the present invention. This example differs from the above-described second embodiment in that a circuit current/voltage detector 291, a usage rate calculator 292, a usage rate determination section 293, and an available output power range divider 30 are provided. Because the configuration other than this is the same as the above-described third embodiment, the description of the first to eighth embodiments is incorporated as required.

The controller 20 includes the circuit current/voltage detector 291, the usage rate calculator 292, the usage rate determination section 293, and the available output power range divider 30. Because the configuration of each of the circuit current/voltage detector 291, the usage rate calculator 292, and the usage rate determination section 293 is the same as the configuration according to the eighth embodiment, the description thereof is omitted.

The available output power calculator 22 calculates the available output powers ($P_L$, P, $P_H$) corresponding to the coupling coefficient estimated by the coupling coefficient estimator 21 and the lower limit value ($k_L$) and upper limit value ($k_H$) of the estimated coupling coefficient, respectively, and calculates an available output power range, in which among a plurality of available output powers ($P_L$, P, $P_H$) the lowest available output power is set to the lower limit value and the highest available output power is set to the upper limit value. The estimation of the coupling coefficient by the coupling coefficient estimator 21 contains an error. Therefore, the available output power range calculated based on the estimated coupling coefficient will also have a width corresponding to the error range. That is, the available output power calculator 22 calculates an available output power range ($P_w$) corresponding to the error range of the estimated coupling coefficient.

The available output power range divider 30 divides the available output power range ($P_w$) calculated by the available output power calculator 22 into a plurality of available output power ranges. The number of divided available output power ranges may be set in advance, and for example the number of divided available output power ranges may be set in accordance with the estimation accuracy of the coupling coefficient estimator 21. The available output power range divider 30 extracts, in accordance with the result of the usage rate determination section 293, an available output power range in order from the smaller available output power range among a plurality of divided available output power ranges, and outputs the available output power of the upper limit value of the extracted available output power range to the voltage command value calculator 23. Then, the voltage command value calculator 23 generates a command value based on the available output power output from the available output power range divider 30, and outputs the same to the inverter 63.

Figure 36:
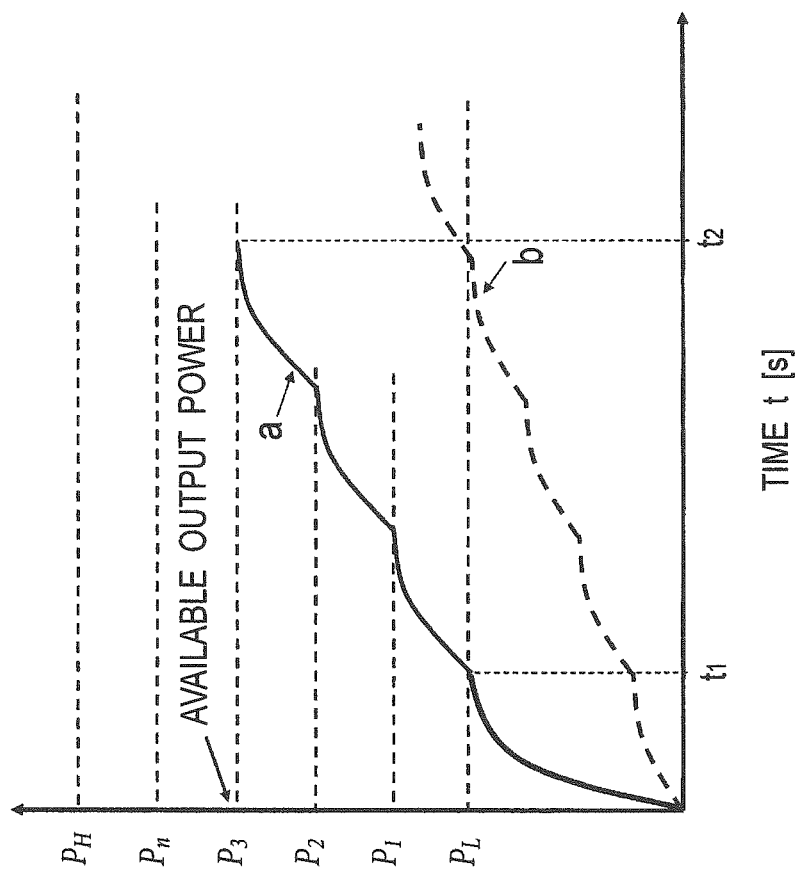
FIG. 36 illustrates the temporal characteristic of the output power in each of the non-contact power feeding apparatuses according to the embodiment and the comparative example.

The control of the controller 20 of this example is described using FIG. 36. FIG. 36 illustrates the temporal characteristics of the output power to the load section 72. Until the time ($t_1$), the inverter 63 is controlled based on the available output power ($P_f$) calculated by the available output power calculator 22. After the time ($t_1$), the inverter 63 is controlled based on the available output power ($P_g$) calculated by the available output power range divider 30. The graph "a" illustrates the characteristic in the present invention, and the graph "b" illustrates the characteristic in the comparative example.

Once the non-contact power feeding apparatus is driven, the coupling coefficient estimator 21 estimates a coupling coefficient, and the available output power calculator 22 calculates an available output power range and outputs the same to the available output power range divider 30, as described above. Moreover, the available output power calculator 22 calculates the available output powers ($P_L$, P, $P_H$) corresponding to the coupling coefficient (k) and the lower limit value ($k_L$) and upper limit value ($k_H$) of the coupling coefficient, respectively, and outputs the smallest available output power ($P_f$) to the voltage command value calculator. The voltage command value calculator 23 generates a command value based on the available output power ($P_f$), and outputs the same to the inverter 63 (at the time $t_1$ of FIG. 36). Thus, the inverter 63 is driven.

Once the inverter 63 is driven, the usage rate can be detected whereby the controller 20 calculates the usage rate by means of the circuit current/voltage detector 291 and the usage rate calculator 292. Then, the controller 20 determines, by means of the usage rate determination section 293, whether or not the usage rate exceeds a predetermined limit usage rate, and transmits the determination result to the available output power range divider 30.

When the available output power range divider 30 extracts, after the inverter 63 is driven, a range for the first time from among a plurality of divided available output power ranges, it extracts the smallest available output power range. In other words, the available output power range divider 30 extracts the smallest available output power range as a range of the initial value among a plurality of divided available output power ranges. In the range illustrated in FIG. 36, this corresponds to the range from an available output power $P_L$ to an available output power $P_1$. Then, the available output power range divider 30 outputs the available output power ($P_1$), which is the upper limit value of the extracted available output power range, to the voltage command value calculator 23.

In the example illustrated in FIG. 36, because the usage rate does not exceed the limit usage rate when the inverter 63 is controlled based on the available output power ($P_1$), the available output power range divider 30 extracts the second smallest available output power range ($P_1$ to $P_2$) among a plurality of divided available output power ranges. Then, the available output power range divider 30 outputs the available output power ($P_2$) to the voltage command value calculator 23. Eventually, the available output power range divider 30 outputs an available output power ($P_3$) to the voltage command value calculator 23. When the inverter 63 is controlled, the usage rate exceeds the limit usage rate and the controller 20 controls the inverter 63 while maintaining the command value.

Figure 37:
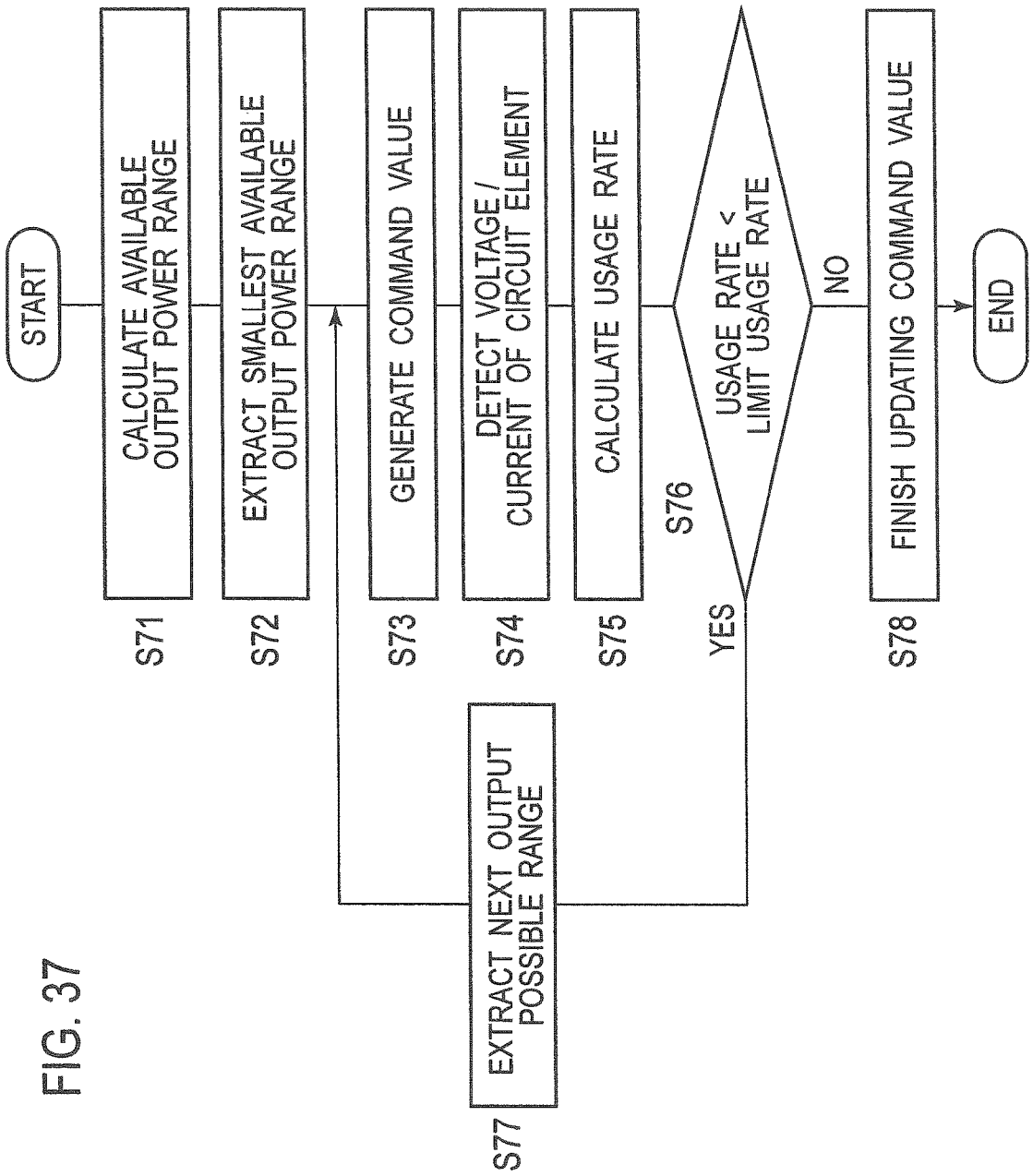
FIG. 37 is a flow chart illustrating the control procedure of the controller of FIG. 35.

Next, the control flow of the controller 20 of this example is described using FIG. 37. Note that, because the control after estimating the coupling coefficient and calculating the error of the coupling coefficient until the inverter 63 is driven with a command value based on the available output power ($P_f$) is the same as the control from Step 11 to Step 16 in FIG. 13, the description thereof is omitted.

After driving the inverter 63, the available output power calculator 22 calculates an available output power range in Step S71. In Step S72, the available output power range divider 30 divides the available output power range and extracts the smallest available output power range among a plurality of divided available output power ranges. In Step S73, the voltage command value calculator 23 generates a command value based on the available output power corresponding to the upper limit value of the smallest available output power range, and outputs the same to the inverter 63. Thus, the output power of the inverter 63 rises.

In Step S74, the circuit current/voltage detector 291 detects the voltage or current of each circuit element. In Step S75, the usage rate calculator 292 calculates the usage rates of the respective circuit elements.

In Step S76, the usage rate determination section 293 determines whether or not any one of the usage rates of the respective circuit elements exceeds the limit usage rate. When the usage rates of all the circuit elements are lower than the limit usage rate, the flow returns to Step S77. In Step S77, the available output power range divider 30 extracts the next largest available output power range with respect to the available output power range when a command value is generated in Step S73, and the flow returns to Step S73. Thus, in the control process of Step S73 after going through Step 77, a command value is generated so that the output power to the load section 7 rises.

Returning to Step 76, when any one of the usage rates of the respective circuit elements becomes equal to or greater than the limit usage rate, the updating of the command value is terminated in Step S78.

As described above, in this example, an available output power range corresponding to an error range in the coupling state is calculated, this available output power range is divided, and a command value is generated, in order from the smaller available output power range among a plurality of divided available output power ranges, based on an available output power included in the available output power range, and is output to the inverter 63. Thus, the rising time of the output power to the load section 7 can be shortened as compared with the control in which the command value is gradually increased like in the comparative example.

Note that, in this example, the available output power range calculator 30 outputs the available output power of the upper limit value of the extracted available output power range to the voltage command value calculator 23, but if an available output power is within the extracted available output power range, any value other than the upper limit value may be used.

Moreover, in this example, an available output power range is calculated based on the error range of the estimation coupling coefficient and the inverter is controlled, but the available output power range may be calculated based on an error range of the coupling coefficient calculated by the coupling coefficient calculator 28 according to the seventh embodiment and eighth embodiment and the control similar to the above-described control may be performed.

The above-described available output power range divider 30 corresponds to a "divider" of the present invention.

REFERENCE SIGNS LIST

6 high frequency alternating-current power source
61 rectifier
61a-61f diode
62 smoothing capacitor
63 voltage type inverter
63a-63d transistor
64 three-phase alternating-current power source
7 load section
71 rectifier
71a-71d diode
72 load
10 non-contact power feeding section
100 power transmission circuit section
101 primary winding
102 capacitor
120 resonant circuit
200 power reception circuit section
201 secondary winding
202 capacitor
220 resonant circuit
221 switch
230 adjustment circuit
231 resistor
232 switch
20 controller
21 coupling coefficient estimator
211 estimating-command value calculator
212 inverter (NV) current/voltage detector
213 load state detector
214 switch switching section
22 available output power calculator
23 voltage command value calculator
24 coupling coefficient (k) error calculator
25 comparator
26 inverter (INV) current calculator
27 range determiner
28 coupling coefficient calculator
281 load output detector
29 usage rate calculator
291 circuit current/voltage detector
292 usage rate calculator
30 available output power range divider
97, 98 sensor
99 position sensor

The invention claimed is:

1. A non-contact power feeding apparatus which transmits, by at least magnetic coupling, an electric power in a non-contact gunner to a power reception coil from a power transmission coil electrically connected to an alternating-current power source and which outputs an electric power to a load electrically connected to the power reception coil, the non-contact power feeding apparatus comprising:
a coupling coefficient estimator configured to estimate a coupling coefficient between the power transmission coil and the power reception coil; and
an available output power calculator configured to calculate an available output power that can be output to the load, based on a limit value of a circuit element of a power feeding circuit including the power transmission coil and the power reception coil and on the coupling coefficient.

2. The non-contact power feeding apparatus according to claim 1, wherein from a relationship expressed by a theoretical formula including an inductance of the power transmission coil, an inductance of the power reception coil, a drive frequency of the alternating-current power source, the coupling coefficient, and a current or voltage of the circuit element, the available output power calculator calculates the available output power using the coupling coefficient estimated by the coupling coefficient estimator and the limit value.

3. The non-contact power feeding apparatus according to claim 1, further comprising:
a command value generator configured to generate a command value of a power converter for outputting the available output power to the load, based on the available output power,
wherein the power converter is provided in the alternating-current power source, and converts an input electric power and outputs the converted electric power to the power transmission coil.

4. The non-contact power feeding apparatus according to claim 3, further comprising:
an error range calculator configured to calculate an error range in the coupling coefficient, due to an estimation error of the coupling coefficient estimator,
wherein the available output power calculator calculates the available output powers based on a plurality of coupling coefficients included in the error range, respectively, and
wherein the command value generator generates the command value based on a smallest available output power among the calculated plurality of available output powers.

5. The non-contact power feeding apparatus according to claim 3, further comprising:
an error range calculator configured to calculate an error range in the coupling coefficient, due to an estimation error of the coupling coefficient estimator;
a sensor that detects a voltage or current of the power feeding circuit; and
a determiner configured to determine, based on a detection value of the sensor, which of a first range corresponding to a range between an intermediate value in the error range and a lower limit value in the error range or a second range corresponding to a range between the intermediate value and an upper limit value in the error range an actual electric power that can be output to the load belongs to,
wherein the command value generator generates the command value in accordance with a determination result of the determiner.

6. The non-contact power feeding apparatus according to claim 5, wherein when the actual electric power that can be output to the load belongs to the first range, the command value generator generates the command value based on a smallest available output power among the calculated plurality of available output powers.

7. The non-contact power feeding apparatus according to claim 5, wherein when the actual electric power that can be output to the load belongs to the second range, the command value generator generates the command value based on the available output power calculated from a coupling coefficient of the intermediate value.

8. The non-contact power feeding apparatus according to claim 3, further comprising:
   a detector configured to detect an input voltage and input current to the power feeding circuit from the power converter,
   wherein the command value generator generates an estimation command value that is the command value for estimating the coupling coefficient, and outputs the same to the power converter, and
   wherein the coupling coefficient estimator estimates, in a state where a drive frequency of the power converter and a resonant frequency of the power feeding circuit are matched, the coupling coefficient based on the input voltage of the power converter being driven with the estimation command value, the input current of the power converter being driven with the estimation command value, and a resistance of the load.

9. The non-contact power feeding apparatus according to claim 8, wherein from a relationship expressed by a theoretical formula including an inductance of the power transmission coil, an inductance of the power reception coil, the input voltage, the input current, a resistance value of the load, and the drive frequency of the power converter, the coupling coefficient estimator estimates the coupling coefficient using an input voltage of the power converter being driven with the estimation command value and an input current of the power converter being driven with the estimation command value.

10. The non-contact power feeding apparatus according to claim 8, further comprising:
   an adjustment circuit including a resistor for matching a resonant frequency of a resonant circuit on a secondary side of the power feeding circuit with the drive frequency and a switch unit configured to switch ON and OFF between the resistor and the power reception coil,
   wherein the coupling coefficient estimator estimates the coupling coefficient, in an ON-state of the switch unit.

11. The non-contact power feeding apparatus according to claim 8, further comprising:
   a resonant circuit for matching a resonant frequency on a secondary side of the power feeding circuit with the drive frequency; and
   a switch unit configured to switch ON and OFF between the resonant circuit and the power reception coil,
   wherein the coupling coefficient estimator estimates the coupling coefficient, in an ON-state of the switch unit.

12. The non-contact power feeding apparatus according to claim 3, further comprising:
   a first detector configured to detect a voltage, current, or power of a circuit on a power reception side in the power feeding circuit; and
   a coupling coefficient calculator configured to calculate the coupling coefficient based on a detection value of the first detector,
   wherein the available output power calculator calculates a first available output power that can be output to the load, based on a coupling coefficient estimated by the coupling coefficient estimator, and calculates a second available output power that can be output to the load, based on a coupling coefficient calculated by the coupling coefficient calculator, and
   wherein the command value generator generates a first command value based on the first available output power to control the power converter, and then generates a second command value based on the second available output power to control the power converter.

13. The non-contact power feeding apparatus according to claim 12, wherein:
   the coupling coefficient estimator estimates the coupling coefficient based on detection information of a detection value of a sensor provided on a power transmission side, and
   the command value generator increases the first command value and the second command value at a predetermined cycle, and an amount of change in the second command value per the cycle is larger than an amount of change in the first command value per the cycle.

14. The non-contact power feeding apparatus according to claim 12, wherein the command value generator increases the second command value in a stepwise manner.

15. The non-contact power feeding apparatus according to claim 12, further comprising:
   a second detector configured to detect a voltage or current of the circuit element; and
   a usage rate calculator configured to calculate a usage rate expressed by a ratio of a detection value of the second detector relative to the limit value,
   wherein the command value generator keeps the command value, when the usage rate becomes equal to or greater than a first limit value that is set in order to maintain a power-feeding performance of the non-contact power feeding apparatus or in order to protect the circuit element.

16. The non-contact power feeding apparatus according to claim 12, further comprising:
   a second detector configured to detect a voltage or current of the circuit element; and
   a usage rate calculator configured to calculate a usage rate expressed by a ratio of a detection value of the second detector relative to the limit value,
   wherein the command value generator keeps, when the usage rate becomes equal to or greater than a second limit value that is set in accordance with a detection error f the second detector or a variation in manufacturing the circuit element, a command value that is generated before the usage rate reaches the second limit value.

17. The non-contact power feeding apparatus according to claim 3, further comprising:
   an error range calculator configured to calculate an error range in the coupling coefficient, due to an estimation error of the coupling coefficient estimator; and
   a divider configured to divide an available output power range into a plurality of available output power ranges,
   wherein the available output power calculator calculates the available output powers based on a plurality of coupling coefficients included in the error range, respectively, thereby calculating the available output power range corresponding to the error range, and
   wherein the command value generator generates, in order from a smaller available output power range among the plurality of available output power ranges divided by the divider, the command value based on the available output power included in the available output power range, and outputs the command value to the power converter.

18. A non-contact power feeding method for transmitting, by at least magnetic coupling, an electric power in a non-contact manner to a power reception coil from a power transmission coil electrically connected to an alternating-current power source and for outputting an electric power to a load electrically connected to the power reception coil, the method comprising:

estimating a coupling coefficient between the power transmission coil and the power reception coil; and calculating an available output power that can be output to the load, based on a limit value of a circuit element of a power feeding circuit including the power transmission coil and the power reception coil and on the coupling coefficient.

* * * * *